(12) United States Patent
Konaka

(10) Patent No.: US 7,677,100 B2
(45) Date of Patent: Mar. 16, 2010

(54) COMPOSITE SENSOR AND ACCELERATION SENSOR

(75) Inventor: Yoshihiro Konaka, Sagamihara (JP)

(73) Assignee: Murata Manufacturing Co., Ltd, Kyoto (JP)

( * ) Notice: Subject to any disclaimer, the term of this patent is extended or adjusted under 35 U.S.C. 154(b) by 19 days.

(21) Appl. No.: 12/201,125

(22) Filed: Aug. 29, 2008

(65) Prior Publication Data

US 2009/0071247 A1    Mar. 19, 2009

Related U.S. Application Data

(63) Continuation of application No. PCT/JP2007/068174, filed on Sep. 19, 2007.

(51) Int. Cl.
*G01P 9/04* (2006.01)
*G01C 19/56* (2006.01)

(52) U.S. Cl. ............... 73/504.14; 73/504.12; 73/510

(58) Field of Classification Search .............. 73/504.14, 73/504.12, 504.04, 504.15, 504.16, 514.32, 73/510, 511

See application file for complete search history.

(56) References Cited

U.S. PATENT DOCUMENTS

| | | | |
|---|---|---|---|
| 5,996,409 A * | 12/1999 | Funk et al. ............... | 73/504.04 |
| 6,658,937 B2 * | 12/2003 | Ao et al. .................. | 73/504.14 |
| 6,742,390 B2 | 6/2004 | Mochida et al. | |
| 2002/0051258 A1 | 5/2002 | Tamura | |
| 2004/0069062 A1 | 4/2004 | Cho | |
| 2005/0217377 A1 | 10/2005 | Ao | |

FOREIGN PATENT DOCUMENTS

| | | |
|---|---|---|
| JP | 11-064370 A | 3/1999 |
| JP | 2000-028365 A | 1/2000 |
| JP | 2006-105698 A | 4/2006 |

OTHER PUBLICATIONS

Official Communication issued in International Patent Application No. PCT/JP2007/068174, mailed on Dec. 18, 2007.

* cited by examiner

*Primary Examiner*—Helen C. Kwok
(74) *Attorney, Agent, or Firm*—Keating & Bennett, LLP

(57) ABSTRACT

In an acceleration sensor, a first vibrator is arranged on a surface of a substrate such that the vibrator can vibrate in an X-axis direction. An angular-velocity-detecting vibrator is arranged inside the first vibrator such that the vibrator can be displaced in a Y-axis direction. A vibration generating unit and a vibration monitor unit are provided between the substrate and the first vibrator. An angular-velocity-detecting displacement detecting unit is provided between the substrate and the angular-velocity-detecting vibrator. A second vibrator is provided outside the first vibrator such that the vibrator can be displaced in the Y-axis direction. An acceleration-detecting displacement detecting unit is provided between the first and second vibrators. An angular velocity detecting circuit detects angular velocity by performing synchronous detection on a displacement detection signal from the displacement detecting unit using a monitor signal from the vibration monitor unit. On the other hand, an acceleration detecting circuit detects acceleration by performing synchronous detection on a displacement detection signal from the displacement detecting unit using a monitor signal from the vibration monitor unit.

11 Claims, 22 Drawing Sheets

COMPOSITE SENSOR AND ACCELERATION SENSOR

BACKGROUND OF THE INVENTION

1. Field of the Invention

The present invention relates to a composite sensor and an acceleration sensor arranged to detect angular velocity and acceleration, for example.

2. Description of the Related Art

A composite sensor to detect angular velocity and acceleration by using a vibrator is known (e.g., see Japanese Unexamined Patent Application Publication No. 2006-105698 and Japanese Unexamined Patent Application Publication No. 2004-163376). Such a composite sensor includes a vibrator supported by a supporting beam such that the vibrator can be displaced in two axial directions that are substantially perpendicular to each other (e.g., X-axis direction and Y-axis direction) and a displacement detector to detect displacement in the Y-axis direction in a state in which the vibrator vibrates in the X-axis direction. When angular velocity acts on the composite sensor, a Coriolis force generated by the angular velocity acts in the Y-axis direction on the vibrator vibrating in the X-axis direction. This Coriolis force is generated at the same frequency as the vibration frequency of the vibrator, and thus, the composite sensor performs synchronous detection on a detection signal detected by the displacement detector at the vibration frequency so as to detect angular velocity. On the other hand, when acceleration acts on the composite sensor, the vibrator is displaced in the Y-axis direction, for example, due to the acceleration. Accordingly, the composite sensor detects displacement of the vibrator using the displacement detector so as to detect acceleration.

In the known composite sensor, both angular velocity and acceleration are detected using a common vibrator. Therefore, if the vibrator and the supporting beam are designed to detect angular velocity, the rigidity of the supporting beam is excessively high to accurately detect acceleration. As a result, the displacement of the vibrator caused by acceleration cannot be sufficiently ensured, and detection sensitivity for acceleration disadvantageously decreases. On the other hand, if the vibrator and the supporting beam are designed to detect acceleration, the rigidity of the supporting beam is excessively low. As a result, an acceleration detection signal is mixed with an angular velocity detection signal, such that detection accuracy for angular velocity disadvantageously degrades.

SUMMARY OF THE INVENTION

To overcome the problems described above, preferred embodiments of the present invention provide a composite sensor and an acceleration sensor capable of detecting acceleration with high sensitivity.

A composite sensor according to a preferred embodiment of the present invention includes a substrate, first supporting units provided on the substrate, a first vibrator facing the substrate with a gap therebetween, first supporting beams that connect the first vibrator to the first supporting units and that support the first vibrator such that the first vibrator can vibrate in an X-axis direction among three axial directions including X, Y, and Z axes that are substantially perpendicular to each other, an angular-velocity-detecting vibrator, angular-velocity-detecting supporting beams that connect the angular-velocity-detecting vibrator to the first vibrator and that support the angular-velocity-detecting vibrator such that the angular-velocity-detecting vibrator can be displaced in the Y-axis direction or the Z-axis direction, a vibration generator to enable the first vibrator to vibrate in the X-axis direction, an angular-velocity-detecting displacement detector to detect the amount of displacement when the angular-velocity-detecting vibrator is displaced in the Y-axis direction or the Z-axis direction in a state in which the first vibrator is vibrating in the X-axis direction, second supporting units provided on the substrate, a second vibrator facing the substrate with a gap therebetween, second supporting beams that connect the second vibrator to the second supporting units and that support the second vibrator such that the second vibrator can be displaced in the X-axis direction or the Y-axis direction, an acceleration-detecting displacement detector that is provided between the first and second vibrators and that detects the amount of displacement when the second vibrator is displaced in the X-axis direction or the Y-axis direction, a vibration monitor to monitor displacement of the first vibrator when the first vibrator vibrates in the X-axis direction, and an acceleration detector to detect acceleration that acts on the second vibrator by performing synchronous detection on a displacement detection signal from the acceleration-detecting displacement detector using a monitor signal from the vibration monitor.

With this configuration, the vibration generator allows the first vibrator to vibrate in the X-axis direction. If an angular velocity about the Z axis or the Y axis acts in this state, a Coriolis force acts on the angular-velocity-detecting vibrator, so that the angular-velocity-detecting vibrator is displaced in the Y-axis direction or the Z-axis direction substantially perpendicular to the X-axis direction. Thus, by detecting the amount of displacement when the angular-velocity-detecting vibrator is displaced in the Y-axis direction or the Z-axis direction using the angular-velocity-detecting displacement detector, the angular velocity that acts on the angular-velocity-detecting vibrator can be detected.

On the other hand, if acceleration acts in the X-axis direction or the Y-axis direction, the second vibrator is displaced in the X-axis direction or the Y-axis direction due to the acceleration. At this time, the acceleration-detecting displacement detector detects the amount of displacement when the second vibrator is displaced in the X-axis direction or the Y-axis direction with respect to the first vibrator. The vibration monitor monitors displacement of the first vibrator when the first vibrator vibrates in the X-axis direction. Thus, the acceleration detector can detect the acceleration that acts on the second vibrator by performing synchronous detection on a displacement detection signal from the acceleration-detecting displacement detector using a monitor signal from the vibration monitor.

The second vibrator is preferably provided separately from the first vibrator and the angular-velocity-detecting vibrator, and the second vibrator is supported by the second supporting beams. With this configuration, the second vibrator and the second supporting beams can be designed independently of the first vibrator, the angular-velocity-detecting vibrator, the first supporting beams, and the angular-velocity-detecting supporting beams. As a result, the first vibrator, the angular-velocity-detecting vibrator, the first supporting beams, and the angular-velocity-detecting supporting beams can have a mass and a rigidity that is suitable to detect angular velocity, and the second vibrator and the second supporting beams can have a mass and a rigidity suitable to detect acceleration. Accordingly, both the angular velocity and acceleration can be detected with high sensitivity.

Furthermore, the acceleration detector preferably performs synchronous detection on a displacement detection signal from the acceleration-detecting displacement detector using a monitor signal from the vibration monitor. With this configuration, a signal of a frequency component that is different from the vibration frequency of the first vibrator can be removed. Thus, external electrical noise and other interference can be easily removed, and the detection accuracy of acceleration can be improved as compared to a case in which acceleration is detected when the first vibrator is stopped.

According to another preferred embodiment of the present invention, third supporting units are provided on the substrate and a third vibrator facing the substrate with a gap therebetween is provided. Third supporting beams are provided between the third vibrator and the third supporting units, the third supporting beams supporting the third vibrator such that the third vibrator can be displaced in a different direction from a direction in which the second vibrator can be displaced among the X-axis direction and the Y-axis direction. Another acceleration-detecting displacement detector to detect the amount of displacement when the third vibrator is displaced in the Y-axis direction or the X-axis direction is provided between the first and third vibrators. In addition, another acceleration detector is provided. The other acceleration detector detects acceleration that acts on the third vibrator by performing synchronous detection on a displacement detection signal from the other acceleration-detecting displacement detector using a monitor signal from the vibration monitor.

With this configuration, acceleration in the X-axis direction can be detected using the second vibrator and the acceleration-detector, and acceleration in the Y-axis direction can be detected using the third vibrator and the other acceleration-detector. In this manner, acceleration in the two axial directions substantially perpendicular to each other can be detected at the same time.

The composite sensor according to another preferred embodiment of the present invention includes a plurality of first vibrators arranged in the Y-axis direction. The first supporting beams connect the plurality of first vibrators to each other. The vibration generator allows the first vibrators adjacent to each other to vibrate in opposite phases to each other.

With this configuration, the two first vibrators adjacent to each other in the Y-axis direction vibrate in opposite phases to each other. At this time, when an angular-velocity-detecting vibrator is provided to each of the two first vibrators, these two angular-velocity-detecting vibrators are displaced in opposite directions to each other due to a Coriolis force when angular velocity occurs, and are displaced in the same direction due to an inertial force when acceleration occurs. Thus, by performing subtraction on the amounts of displacement of the two angular-velocity-detecting vibrators, a component of displacement in the same direction in the amounts of displacement (acceleration component) are offset and removed, so that angular velocity can be detected separately from acceleration.

The composite sensor according to another preferred embodiment of the present invention includes two second vibrators arranged to be displaced in opposite directions to each other with respect to the first vibrator when acceleration occurs. The composite sensor includes two acceleration-detecting displacement detectors corresponding to the two second vibrators. The acceleration detector detects acceleration using a difference between displacement detection signals from the two acceleration-detecting displacement detectors.

When the second vibrators are arranged such that they can be displaced in the Y-axis direction, the two second vibrators are preferably disposed on both sides of the first vibrator in the Y-axis direction, for example. Accordingly, the two second vibrators are displaced in directions opposite to each other with respect to the first vibrator when acceleration acts thereon. At this time, the two acceleration-detecting displacement detectors detect the amount of displacement of the two second vibrators displaced in opposite directions to each other. Thus, the detection sensitivity of the acceleration detected by the acceleration detector can be approximately doubled, for example, by using a difference between the displacement detection signals from the two acceleration-detecting displacement detectors.

When the second vibrators are arranged such that they can be displaced in the X-axis direction, the two second vibrators are preferably disposed on both sides of the first vibrator in the X-axis direction. Accordingly, the two second vibrators are displaced in opposite directions to each other with respect to the first vibrator when acceleration acts thereon.

Preferably, the acceleration-detecting displacement detector includes a pair of electrode portions that are provided between the first and second vibrators and that face each other, for example, the capacitance between the electrode portions changing in accordance with displacement of the first and second vibrators. The pair of electrode portions are preferably mutually staggered in the X-axis direction so that the electrode portions partially face each other in a neutral state in which the first vibrator stops.

With this configuration, when the first vibrator is displaced to one side of the X-axis direction, the area at which the pair of electrode portions face each other increases. On the other hand, when the first vibrator is displaced to the other side of the X-axis direction, the area at which the pair of electrode portions face each other decreases. Thus, since the area at which the pair of electrode portions face each other changes in synchronization with the vibration cycle of the first vibrator, the capacitance between the electrode portions can be synchronized to the vibration cycle of the first vibrator.

Preferably, the acceleration-detecting displacement detector includes a pair of first electrode portions and a pair of second electrode portions that are provided between the first and second vibrators and that face each other, the capacitance between the first electrode portions and the capacitance between the second electrode portions changing in accordance with displacement of the first and second vibrators. In the pair of first electrode portions and the pair of second electrode portions, increases and decreases in capacitance preferably change in opposite directions to each other when the first vibrator is displaced, and increases and decreases in capacitance preferably change in opposite directions to each other when the second vibrator is displaced.

With this configuration, when the first vibrator is displaced, the capacitance of the second electrode portions decreases when the capacitance of the first electrode portions increases, and the capacitance of the second electrode portions increases when the capacitance of the first electrode portions decreases. Thus, when the first vibrator vibrates in the X-axis direction, the capacitance of the first electrode portions and the capacitance of the second electrode portions change in opposite phases to each other. Therefore, when the first vibrator vibrates, changes in the capacitance of the first electrode portions can be canceled by changes in the capacitance of the second electrode portions in the sum of the capacitance of the first electrode portions and the capacitance of the second electrode portions.

On the other hand, when the second vibrator is displaced, the capacitance of the second electrode portions decreases when the capacitance of the first electrode portions increases, and the capacitance of the second electrode portions increases when the capacitance of the first electrode portions decreases. At this time, acceleration is detected in a state in which the first vibrator is vibrating, so that the capacitance of the first electrode portions and the capacitance of the second electrode portions change in opposite phases to each other. As a result, when the second vibrator is displaced due to acceleration in a state in which the first vibrator is vibrating, the sum of the capacitance of the first electrode portions and the capacitance of the second electrode portions has a value according to the difference between the capacitance of the first electrode portions and the capacitance of the second electrode portions and changes in accordance with the vibration cycle of the first vibrator. At this time, the sum of the capacitance of the first electrode portions and the capacitance of the second electrode portions changes with twice the amplitude as compared to a case in which only one of the first electrode portions and the second electrode portions is provided, so that the detection sensitivity of acceleration is improved.

A composite sensor according to another preferred embodiment of the present invention includes a substrate, first supporting units provided on the substrate, a first vibrator facing the substrate with a gap therebetween, first supporting beams that connect the first vibrator to the first supporting units and that support the first vibrator such that the first vibrator can vibrate in an X-axis direction among three axial directions including X, Y, and Z axes that are perpendicular to each other, an angular-velocity-detecting vibrator; angular-velocity-detecting supporting beams that connect the angular-velocity-detecting vibrator to the first vibrator and that support the angular-velocity-detecting vibrator such that the angular-velocity-detecting vibrator can be displaced in the Y-axis direction or the Z-axis direction, a vibration generator to enable the first vibrator to vibrate in the X-axis direction, an angular-velocity-detecting displacement detector to detect the amount of displacement when the angular-velocity-detecting vibrator is displaced in the Y-axis direction or the Z-axis direction in a state in which the first vibrator is vibrating in the X-axis direction, second supporting units provided on the substrate, a second vibrator facing the substrate with a gap therebetween, second supporting beams that connect the second vibrator to the second supporting units and that support the second vibrator such that the second vibrator can be displaced in a direction that is substantially perpendicular to the Z axis and that is inclined with respect to the X axis and the Y axis; an acceleration-detecting displacement detector that is provided between the first and second vibrators and that detects the amount of displacement when the second vibrator is displaced in the Y-axis direction, third supporting units provided on the substrate, a third vibrator facing the substrate with a gap therebetween, third supporting beams that connect the third vibrator to the third supporting units and that support the third vibrator such that the third vibrator can be displaced in a direction that is substantially perpendicular to the Z axis, that is inclined with respect to the X axis and the Y axis, and that is different from the direction in which the second vibrator is displaced, another acceleration-detecting displacement detector that is arranged between the first and third vibrators and that detects the amount of displacement when the third vibrator is displaced in the Y-axis direction, a vibration monitor arranged to monitor displacement of the first vibrator when the first vibrator vibrates in the X-axis direction, and an acceleration detector arranged to detect first acceleration by performing synchronous detection on the difference between displacement detection signals from the two acceleration-detecting displacement detectors using a monitor signal from the vibration monitor and to detect second acceleration by performing synchronous detection on the sum of displacement detection signals from the two acceleration-detecting displacement detectors using a monitor signal from the vibration monitor.

With this configuration, angular velocity that acts on the angular-velocity-detecting vibrator can be detected by detecting the amount of displacement when the angular-velocity-detecting vibrator is displaced in the Y-axis direction or the Z-axis direction by using the angular-velocity-detecting displacement detectors in a state in which the first vibrator is vibrating in the X-axis direction.

When acceleration in the X-axis direction occurs, a component in an inclined direction in the acceleration acts on the second vibrator, so that the second vibrator is displaced in the direction that is inclined with respect to the X and Y axes in accordance with the component. At this time, one of the acceleration-detecting displacement detectors detects the amount of displacement when the second vibrator is displaced in the Y-axis direction with respect to the first vibrator. Accordingly, when the second vibrator is displaced in an inclined direction in accordance with acceleration in the X-axis direction, the one of the acceleration-detecting displacement detectors detects the amount of displacement in the Y-axis direction in the amount of displacement in this inclined direction.

On the other hand, when acceleration in the X-axis direction occurs, a component in another inclined direction in the acceleration acts on the third vibrator, so that the third vibrator is displaced in another direction inclined with respect to the X and Y axes in accordance with the component. At this time, the other acceleration-detecting displacement detector detects the amount of displacement when the third vibrator is displaced in Y-axis direction with respect to the first vibrator. Accordingly, when the third vibrator is displaced in another inclined direction in accordance with acceleration in the X-axis direction, the other acceleration-detecting displacement detector detects the amount of displacement in the Y-axis direction in the amount of displacement in this inclined direction.

When acceleration in the Y-axis direction occurs, the second vibrator is displaced in accordance with a component in an inclined direction in the acceleration. Thus, when the second vibrator is displaced in the inclined direction in accordance with the acceleration in the Y-axis direction, the one of the acceleration-detecting displacement detector detects the amount of displacement in the Y-axis direction in the amount of displacement with respect to the inclined direction.

Furthermore, when acceleration in the Y-axis direction occurs, the third vibrator is displaced in accordance with a component in another inclined direction in the acceleration. Thus, when the third vibrator is displaced in the inclined direction in accordance with the acceleration in the Y-axis direction, the other acceleration-detecting displacement detector detects the amount of displacement in the Y-axis direction in the amount of displacement with respect to the inclined direction.

When the second and third vibrators are displaced in directions substantially perpendicular to each other, for example, and when acceleration acts in the Y-axis direction, for example, the amount of displacement in the Y-axis direction of one of the second and third vibrators increases, and the amount of displacement in the Y-axis direction of the other of the second and third vibrators decreases. On the other hand, when acceleration acts in the X-axis direction, for example, the amount of displacement in the Y-axis direction of both of the second and third vibrators increases or decreases at the same time.

Therefore, the acceleration detector can preferably detect acceleration in the Y-axis direction, e.g., as a first acceleration, by performing synchronous detection on the difference between displacement detection signals from the two acceleration-detecting displacement detectors using a monitor signal from the vibration monitor. On the other hand, the acceleration detector can preferably detect acceleration in the X-axis direction, e.g., as a second acceleration, by performing synchronous detection on the sum of displacement detection signals from the two acceleration-detecting displacement detectors using a monitor signal from the vibration monitor. Alternatively, acceleration in the X-axis direction can be detected as a first acceleration and acceleration in the Y-axis direction can be detected as a second acceleration by appropriately setting the displacement directions of the second and third vibrators and displacement detection signals from the two acceleration-detecting displacement detectors.

Particularly, in preferred embodiments of the present invention, the second and third vibrators are preferably provided separately from the first vibrator and the angular-velocity-detecting vibrator, and the second and third vibrators are preferably supported using the second and third supporting beams. With this configuration, the second and third vibrators and the second and third supporting beams can be designed independently of the first vibrator, the angular-velocity-detecting vibrator, the first supporting beams, and the angular-velocity-detecting supporting beams. Accordingly, both angular velocity and acceleration can be detected with outstanding sensitivity.

Also, since the acceleration detector preferably performs synchronous detection of the difference between or the sum of displacement detection signals from the two acceleration-detecting displacement detectors using a monitor signal from the vibration monitor, a signal of a frequency component different from the vibration frequency of the first vibrator can be effectively removed. Accordingly, external electrical noise or other interference can be easily removed, and the detection accuracy of acceleration can be improved as compared to a case in which acceleration is detected when the first vibrator is stopped.

An acceleration sensor according to another preferred embodiment of the present invention includes a substrate, first supporting units provided on the substrate, a first vibrator facing the substrate with a gap therebetween, first supporting beams that connect the first vibrator to the first supporting units and that support the first vibrator such that the first vibrator can vibrate in an X-axis direction among three axial directions including X, Y, and Z axes that are substantially perpendicular to each other, a vibration generator to enable the first vibrator to vibrate in the X-axis direction, second supporting units provided on the substrate, a second vibrator facing the substrate with a gap therebetween, second supporting beams that connect the second vibrator to the second supporting units and that support the second vibrator such that the second vibrator can be displaced in the X-axis direction or the Y-axis direction, an acceleration-detecting displacement detector that is provided between the first and second vibrators and that detects the amount of displacement when the second vibrator is displaced in the X-axis direction or the Y-axis direction, a vibration monitor to monitor displacement of the first vibrator when the first vibrator vibrates in the X-axis direction, and an acceleration detector arranged to detect acceleration that acts on the second vibrator by performing synchronous detection on a displacement detection signal from the acceleration-detecting displacement detector using a monitor signal from the vibration monitor.

With this configuration, the vibration generator enables the first vibrator to vibrate in the X-axis direction. If acceleration in the X-axis direction or the Y-axis direction acts in this state, the second vibrator is displaced in the X-axis direction or the Y-axis direction due to the acceleration. At this time, the acceleration-detecting displacement detector detects the amount of displacement when the second vibrator is displaced in the X-axis direction or the Y-axis direction with respect to the first vibrator. The vibration monitor monitors displacement of the first vibrator when the first vibrator vibrates in the X-axis direction. Therefore, the acceleration detector can detect acceleration that acts on the second vibrator by performing synchronous detection on a displacement detection signal from the acceleration-detecting displacement detector using a monitor signal from the vibration monitor.

Particularly, in preferred embodiments of the present invention, the second vibrator is preferably provided separately from the first vibrator, and the second vibrator is supported using the second supporting beams. With this configuration, the second vibrator and the second supporting beams can be designed independently of the first vibrator and the first supporting beams. As a result, the first vibrator and the first supporting beams can preferably have a mass and a rigidity suitable to vibrate, and the second vibrator and the second supporting beams can preferably have a mass and a rigidity suitable to detect acceleration. Accordingly, acceleration can be detected with outstanding sensitivity.

Furthermore, since the acceleration detector preferably performs synchronous detection on a displacement detection signal from the acceleration-detecting displacement detector using a monitor signal from the vibration monitor, a signal of a frequency component different from the vibration frequency of the first vibrator can be effectively removed. Accordingly, external electrical noise or other interference can be easily removed, and the detection accuracy of acceleration can be improved as compared to a case in which acceleration is detected when the first vibrator is stopped.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, composite sensors according to preferred embodiments of the present invention will be described in detail with reference to the drawings.

Figure 1:
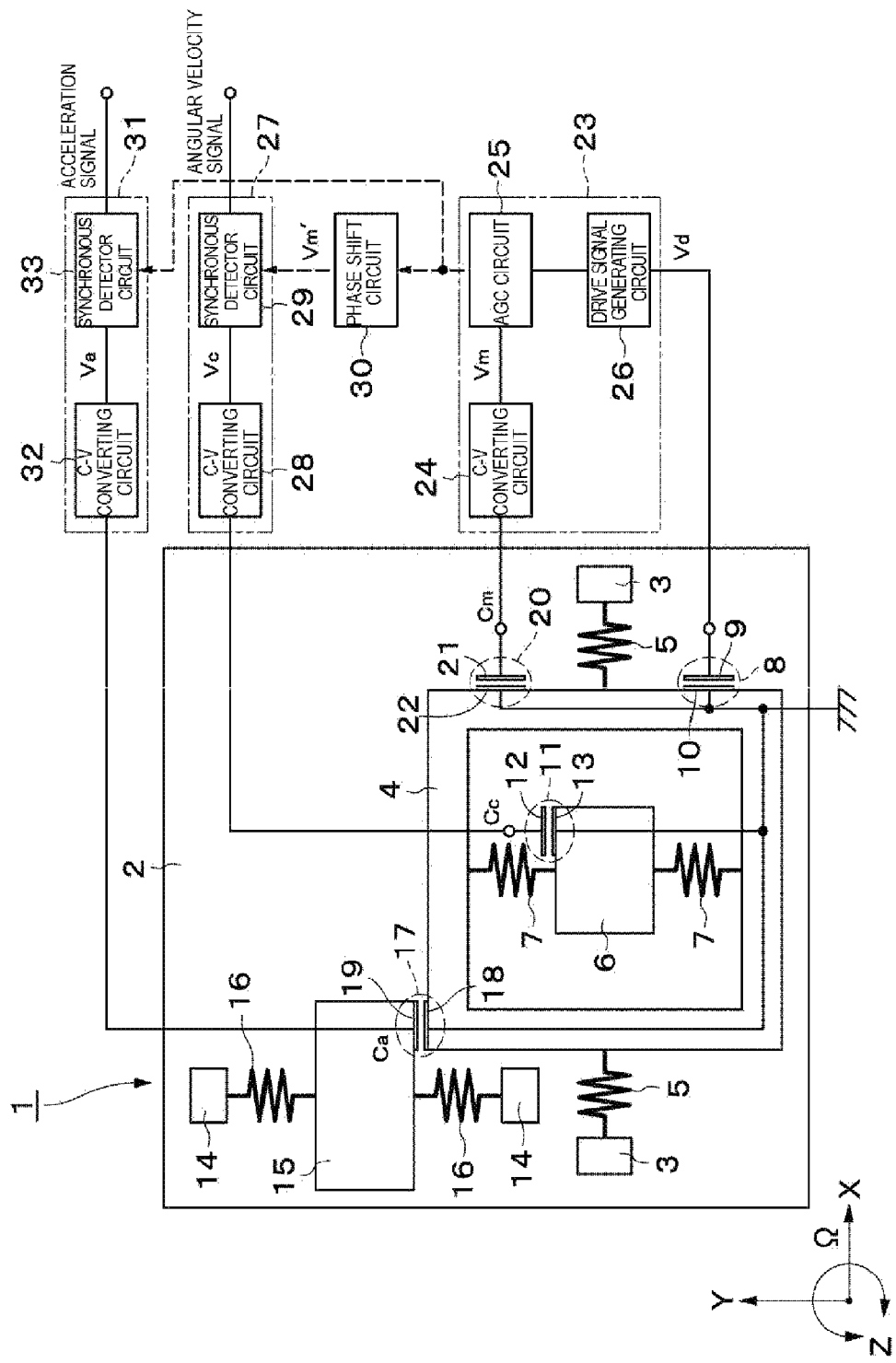
FIG. 1 is a plan view illustrating a composite sensor according to a first preferred embodiment of the present invention.

FIG. 1 illustrates a composite sensor 1 according to a first preferred embodiment of the present invention. In FIG. 1, the composite sensor 1 includes a substrate 2, supporting units 3 and 14, vibrators 4, 6, and 15, supporting beams 5, 7, and 16, a vibration generating unit 8, displacement detecting units 11 and 17, and a vibration monitor unit 20.

The substrate 2 defines a base portion of the composite sensor 1. Preferably, the substrate 2 is made of a glass material or other suitable material, for example, has a substantially rectangular flat plate shape, and horizontally extends in X-axis and Y-axis directions among the X-axis and Y-axis directions that are substantially perpendicular to each other and a Z-axis direction.

By performing etching on a conductive silicon material, having low resistance, for example, provided on the substrate 2, the supporting units 3 and 14, the vibrators 4, 6, and 15, the supporting beams 5, 7, and 16, the vibration generating unit 8, the displacement detecting units 11 and 17, and the vibration monitor unit 20 are formed on the substrate 2.

For example, two supporting units 3 are provided on a surface of the substrate 2. These two supporting units 3 are arranged on both sides of the vibrator 4 in the X-axis direction. Movable-side electrodes 10, 13, 18, and 22 described below are grounded via the supporting units 3, the vibrators 4 and 6, and so on.

The first vibrator 4 is preferably arranged on the surface side of the substrate 2 and faces the substrate 2 with a gap therebetween. The first vibrator 4 has a substantially rectangular frame shape, for example, and has front and rear horizontal frame portions 4A extending in the X-axis direction and right and left vertical frame portions 4B extending in the Y-axis direction, for example.

An external portion of the vibrator 4 is preferably connected to the first supporting units 3 via the first supporting beams 5 described below, and an internal portion of the vibrator 4 is preferably connected to the vibrator 6 described below via the supporting beams 7. These vibrators 4 and 6 are isolated from the substrate 2 in the Z-axis direction and vibrate in a desired vibration direction (X-axis direction).

The first supporting beams 5 connect the first vibrator 4 to the first supporting units 3 and support the first vibrator 4 such that the first vibrator 4 can vibrate in the X-axis direction. The first supporting beams 5 are preferably flexibly deformable in the X-axis direction and are arranged on both sides of the first vibrator 4 in the X-axis direction, for example. Also, the supporting beams 5 support the vibrators 4 and 6 such that the vibrators 4 and 6 can vibrate in the X-axis direction and restrict displacement of the vibrator 4 in the Y-axis direction.

Preferably, the angular-velocity-detecting vibrator 6 is arranged in the first vibrator 4 and is connected to the first vibrator 4. The vibrator 6 preferably has a substantially rectangular plate shape. The vibrator 6 is displaced in a detection direction (Y-axis direction) substantially perpendicular to the vibration direction due to flexible deformation of the second supporting beams 7.

The angular-velocity-detecting supporting beams 7 connect the vibrator 4 to the vibrator 6 and support the vibrator 6 such that the vibrator 6 can be displaced in the Y-axis direction. The supporting beams 7 are preferably flexibly deformable in the Y-axis direction and are arranged on both sides of the vibrator 6 in the Y-axis direction, for example. Also, the supporting beams 7 support the vibrator 6 such that the vibrator 6 can be displaced in the Y-axis direction and restrict displacement of the vibrator 6 in the X-axis direction.

The vibration generating unit 8 (vibration generator) is provided between the substrate 2 and the first vibrator 4 and enables the vibrators 4 and 6 to vibrate in the X-axis direction by using an electrostatic force, for example. The vibration generating unit 8 preferably includes a fixed-side driving electrode 9 provided on the substrate 2 and a movable-side driving electrode 10 provided on the vibrator 4. The driving electrodes 9 and 10 face each other with a gap therebetween. The vibration generating unit 8 generates an electrostatic force between the driving electrodes 9 and 10 when a drive signal Vd is input thereto from a vibration control circuit 23 described below and enables the vibrators 4 and 6 to vibrate in the X-axis direction by using the electrostatic force, for example.

The angular-velocity-detecting displacement detecting unit 11 (angular-velocity-detecting displacement detector) is preferably provided between the substrate 2 and the vibrator 6 and detects the amount of displacement when the vibrator 6 is displaced in the Y-axis direction. The displacement detecting unit 11 preferably includes a fixed-side detecting electrode 12 provided on the substrate 2 and a movable-side detecting electrode 13 provided on the vibrator 6. The detecting electrodes 12 and 13 face each other with a gap therebetween. The movable-side detecting electrode 13 is displaced together with the vibrator 6 in the Y-axis direction. Accordingly, capacitance Cc between the detecting electrodes 12 and 13 changes when the vibrator 6 is displaced in the Y-axis direction, for example.

That is, the displacement detecting unit 11 is preferably defined by a parallel plate capacitor including the fixed-side detecting electrode 12 and the movable-side detecting electrode 13. When an angular velocity Ω about the Z axis acts in a state in which the vibrators 4 and 6 vibrate in the X-axis direction, the vibrator 6 is displaced in the Y-axis direction due to a Coriolis force. Accordingly, the displacement detecting unit 11 detects the amount of displacement when the vibrator 6 is displaced in the Y-axis direction by using the capacitance Cc between the detecting electrodes 12 and 13 and outputs a detection signal according to the angular velocity Ω.

Two second supporting units 14 are preferably provided on the surface of the substrate 2 and are arranged on both sides of the vibrator 15 described below in the Y-axis direction.

The second vibrator 15 is provided on the surface side of the substrate 2 near the first vibrator 4 and faces the substrate 2 with a gap therebetween. The second vibrator 15 has a substantially rectangular plate shape, for example.

The second supporting beams 16 connect the second vibrator 15 to the second supporting units 14 and support the second vibrator 15 such that the second vibrator 15 can vibrate in the Y-axis direction. The second supporting beams 16 are preferably flexibly deformable in the Y-axis direction and are arranged on both sides of the second vibrator 15 in the Y-axis direction. The supporting beams 16 support the vibrator 15 such that the vibrator 15 can vibrate in the Y-axis direction and restrict displacement of the vibrator 15 in the X-axis direction.

Preferably, the acceleration-detecting displacement detecting unit 17 (acceleration-detecting displacement detector) is provided between the first vibrator 4 and the second vibrator 15 and detects the amount of displacement when the second vibrator 15 is displaced in the Y-axis direction. The displacement detecting unit 17 preferably includes the detecting electrode 18 provided on the first vibrator 4 and a detecting electrode 19 provided on the second vibrator 15. The detecting electrodes 18 and 19 face each other with a gap therebetween to define a parallel plate capacitor, for example.

The detecting electrode 18 is displaced together with the first vibrator 4 in the X-axis direction, whereas the detecting electrode 19 is displaced together with the second vibrator 15 in the Y-axis direction. Accordingly, capacitance Ca between the detecting electrodes 18 and 19 changes when the first vibrator 4 is displaced in the X-axis direction. In addition, the capacitance Ca between the detecting electrodes 18 and 19 changes when the second vibrator 15 is displaced in the Y-axis direction. Thus, the displacement detecting unit 17 preferably detects the amount of displacement when the second vibrator 15 is displaced in the Y-axis direction using the capacitance Ca between the detecting electrodes 18 and 19.

The vibration monitor unit 20 (vibration monitor) is disposed between the substrate 2 and the first vibrator 4 and detects the amount of displacement when the first vibrator 4 is displaced in the X-axis direction. Preferably, the vibration monitor unit 20 includes a fixed-side monitor electrode 21 provided on the substrate 2 and a movable-side monitor electrode 22 provided on the vibrator 4, for example. The monitor electrodes 21 and 22 face each other with a gap therebetween to define a parallel plate capacitor, for example.

The movable-side monitor electrode 22 is displaced together with the vibrator 4 in the X-axis direction. Accordingly, capacitance Cm between the monitor electrodes 21 and 22 changes when the vibrator 4 is displaced in the X-axis direction. Thus, the vibration monitor unit 20 monitors the amount of displacement when the first vibrator 4 vibrates in the X-axis direction using the capacitance Cm between the monitor electrodes 21 and 22.

Next, the vibration control circuit 23 to control a vibration state of the vibrator 4 is described. The vibration control circuit 23 preferably controls a drive signal Vd to be output to the vibration generating unit 8 using a monitor signal Vm from the vibration monitor unit 20. The vibration control circuit 23 preferably includes a C-V converting circuit (capacitance-voltage converting circuit) 24, an AGC circuit (automatic gain control circuit) 25, and a drive signal generating circuit 26, for example.

The C-V converting circuit 24 is connected to the vibration monitor unit 20, converts a change in the capacitance Cm of the vibration monitor unit 20 to a change in voltage, and outputs the change in voltage as a monitor signal Vm, for example.

The output side of the C-V converting circuit 24 is connected to the AGC circuit 25. The output side of the AGC circuit 25 connects to the vibration generating unit 8 via the drive signal generating circuit 26. The drive signal generating circuit 26 generates a drive signal Vd and inputs the drive signal Vd to the driving electrode 9 so as to enable the vibrators 4 and 6 to vibrate in the X-axis direction.

The AGC circuit 25 preferably corrects the drive signal Vd using the monitor signal Vm from the C-V converting circuit 24. Accordingly, the AGC circuit 25 can enable the vibrators 4 and 6 to constantly vibrate with substantially the same amplitude even if an ambient temperature changes, for example.

Next, an angular velocity detecting circuit 27 (angular velocity detector) to detect angular velocity Ω is described. The angular velocity detecting circuit 27 performs synchronous detection on a displacement detection signal Vc from the displacement detecting unit 11 using the monitor signal Vm from the vibration monitor unit 20, so as to detect the angular velocity Ω that acts on the angular-velocity-detecting vibrator 6. The angular velocity detecting circuit 27 includes a C-V converting circuit 28 and a synchronous detector circuit 29, for example.

Preferably, the C-V converting circuit 28 has substantially the same configuration as that of the C-V converting circuit 24, converts a change in the capacitance Cc of the displacement detecting unit 11 to a change in voltage, and outputs the change in voltage as a displacement detection signal Vc.

Figure 2:
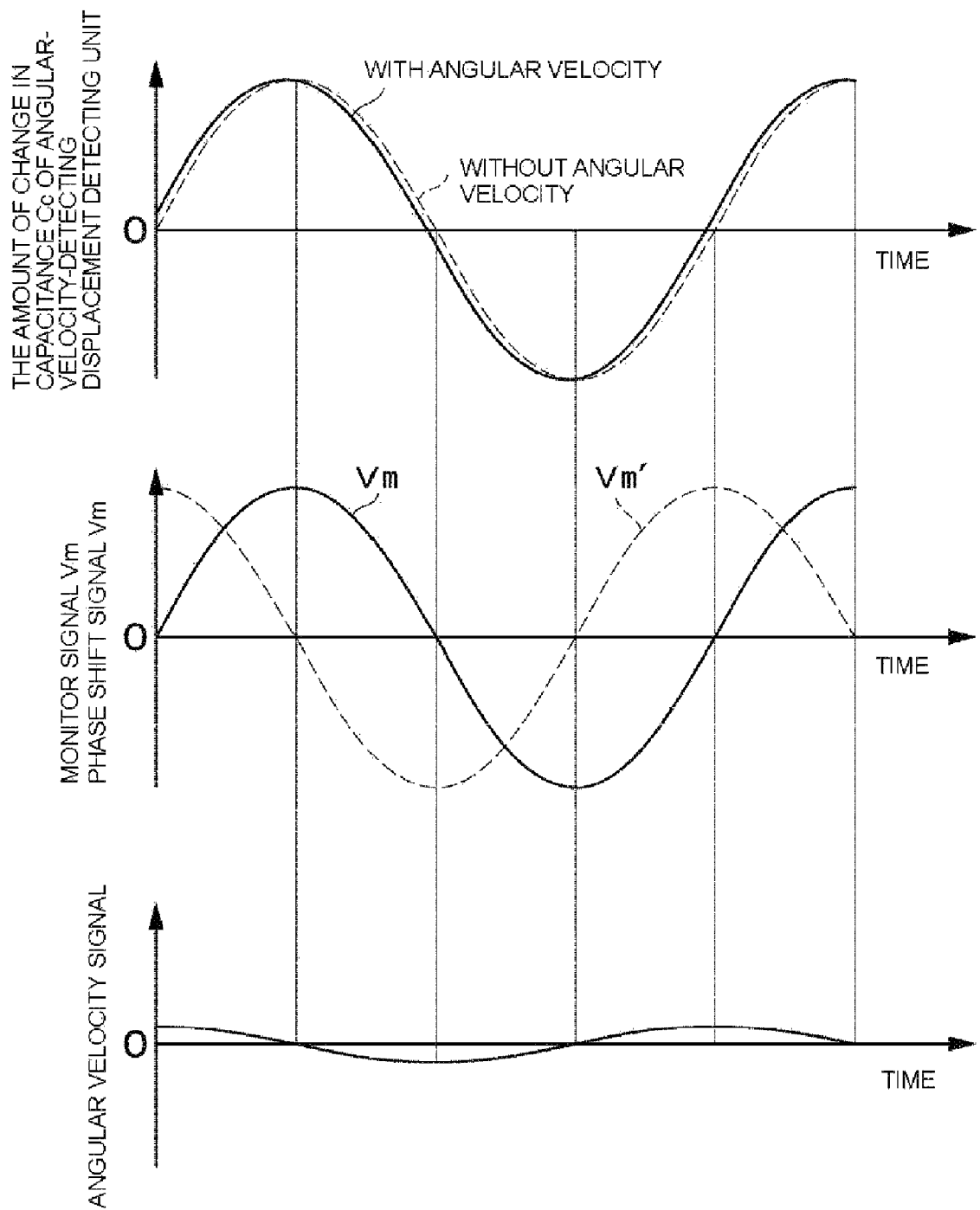
FIG. 2 is a characteristic diagram illustrating an angular velocity signal output from an angular velocity detecting circuit illustrated in FIG. 1.

The input side of the synchronous detector circuit 29 is connected to the C-V converting circuit 28 and is also connected to the AGC circuit 25 via a phase shift circuit 30. The phase shift circuit 30 preferably outputs a phase shift signal Vm' that is generated by shifting the phase of the monitor signal Vm output via the AGC circuit 25 by approximately 90 degrees, for example. At this time, vibration of the vibrator 4 in the X-axis direction and vibration of the vibrator 6 in the Y-axis direction caused by the angular velocity Ω have a phase difference of approximately 90 degrees. Thus, the synchronous detector circuit 29 preferably performs synchronous detection using the phase shift signal Vm' that is generated by shifting the phase of the monitor signal Vm by approximately 90 degrees, for example. Accordingly, the synchronous detector circuit 29 outputs an angular velocity signal according to the angular velocity Ω, as illustrated in FIG. 2.

Next, an acceleration detecting circuit 31 (acceleration detector) to detect acceleration α is described. The acceleration detecting circuit 31 performs synchronous detection on a displacement detection signal Va from the displacement detection unit 17 using the monitor signal Vm from the vibration monitor unit 20 so as to detect acceleration α that acts on the vibrator 15. The acceleration detecting circuit 31 preferably includes a C-V converting circuit 32 and a synchronous detector circuit 33, for example.

The C-V converting circuit 32 preferably has substantially the same configuration as that of the C-V converting circuit 24, converts a change in the capacitance Ca of the displacement detecting unit 17 to a change in voltage, and outputs the change in voltage as a displacement detection signal Va.

Figure 3:
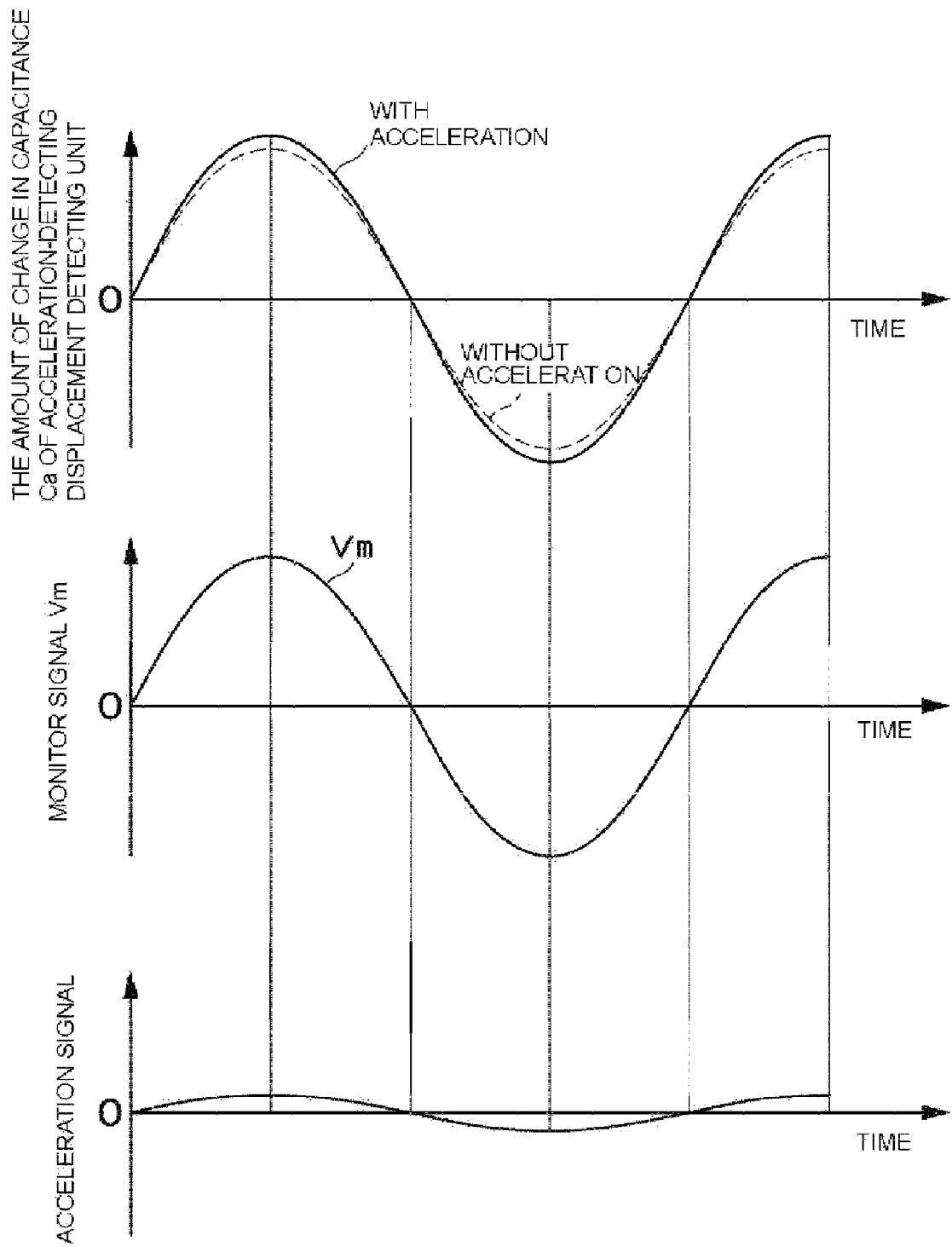
FIG. 3 is a characteristic diagram illustrating an acceleration signal output from an acceleration detecting circuit illustrated in FIG. 1.

The input side of the synchronous detector circuit 33 is connected to the C-V converting circuit 32 and is also connected to the AGC circuit 25. At this time, if the vibrator 15 is displaced due to the acceleration α, the capacitance Ca of the displacement detecting unit 17 changes in synchronization with vibration of the vibrator 4 in the X-axis direction in accordance with the amount of displacement of the vibrator 15. Thus, the synchronous detector circuit 33 preferably performs synchronous detection using the monitor signal Vm, for example. Accordingly, the synchronous detector circuit 33 outputs an acceleration signal according to the acceleration α, as illustrated in FIG. 3.

A cover (not illustrated) is preferably provided on the surface of the substrate 2 such that the cover accommodates the vibrators 4, 6, and 15, and other components of the composite sensor. Vacuum-sealing can be achieved with the cover, such that air resistance to the vibrators 4, 6, and 15 is reduced.

The composite sensor 1 according to this preferred embodiment of the present invention has the above-described configuration. Hereinafter, the operation thereof is described.

When the drive signal Vd is output to the vibration generating unit 8, an electrostatic force in the X-axis direction is generated in the vibration generating unit 8, so that the vibrators 4 and 6 vibrate in the X-axis direction.

Accordingly, the capacitance Cm of the vibration monitor unit 20 changes in accordance with the vibration frequency of the vibrators 4 and 6, and the monitor signal Vm is output from the C-V converting circuit 24 to the AGC circuit 25. Then, the AGC circuit 25 outputs the drive signal Vd corrected in accordance with the monitor signal Vm to the vibration generating unit 8 so as to perform feedback control on the vibration state of the vibrators 4 and 6. Accordingly, the vibrators 4 and 6 constantly vibrate with substantially the same amplitude even if an ambient temperature changes.

If the angular velocity Ω about the Z axis is applied to the composite sensor 1 while the vibrators 4 and 6 are vibrating in the X-axis direction in the above-described manner, a Coriolis force F in the Y-axis direction expressed by the following expression 1 is applied to the vibrators 4 and 6.

Expression 1

$F = 2 \times M \times \Omega \times v$, in which

M: mass of vibrators 4 and 6;

Ω: angular velocity about Z axis; and v: velocity of vibrators 4 and 6 in the X-axis direction.

Therefore, the vibrator 6 is displaced in the Y-axis direction in accordance with the angular velocity Ω, so that the capacitance Cc of the angular-velocity-detecting displacement detecting unit 11 changes. At this time, the C-V converting circuit 28 converts the change in the capacitance Cc to a displacement detection signal Vc. Then, the synchronous detector circuit 29 detects a signal that is synchronized with the phase shift signal Vm' from the displacement detection signal Vc. Accordingly, the angular velocity detecting circuit 27 outputs an angular velocity signal according to the angular velocity Ω to the outside, as illustrated in FIG. 2. The vibrator 4 is not displaced by the Coriolis force F because the vibrator 4 does not have freedom of movement in the Y-axis direction.

On the other hand, if acceleration α in the Y-axis direction is applied to the composite sensor 1 while the vibrator 4 is vibrating in the X-axis direction, the vibrator 15 is displaced in the Y-axis direction in accordance with the acceleration α. At this time, the capacitance Ca of the acceleration-detecting displacement detecting unit 17 changes, and thus, the C-V converting circuit 32 converts the change in the capacitance Ca to a displacement detection signal Va. Then, the synchronous detector circuit 33 detects a signal that is synchronized with the monitor signal Vm from the displacement detection signal Va. Accordingly, the acceleration detecting circuit 31 outputs an acceleration signal according to the acceleration α to the outside, as illustrated in FIG. 3.

Accordingly, in this preferred embodiment of the present invention, if angular velocity Ω about the Z axis acts in a state in which the first vibrator 4 is vibrating in the X-axis direction, the vibrator 6 is displaced in the Y-axis direction due to a Coriolis force. Thus, the angular-velocity-detecting displacement detecting unit 11 detects the amount of displacement of the vibrator 6 in the Y-axis direction, and the angular velocity detecting circuit 27 performs synchronous detection on the displacement detection signal Vc from the displacement detecting unit 11 using the monitor signal Vm (phase shift signal Vm') from the vibration monitor unit 20. Accordingly, the angular velocity detecting circuit 27 can output an angular velocity signal according to the angular velocity Ω.

If acceleration α in the Y-axis direction acts, the second vibrator 15 is displaced in the Y-axis direction due to the acceleration α. At this time, the acceleration-detecting displacement detecting unit 17 detects the amount of displacement when the second vibrator 15 is displaced in the Y-axis direction with respect to the first vibrator 4. Then, the acceleration detecting circuit 31 performs synchronous detection on the displacement detection signal Va from the displacement detecting unit 17 using the monitor signal Vm from the vibration monitor unit 20. Accordingly, the acceleration detecting circuit 31 can output an acceleration signal according to the acceleration α.

Particularly, in this preferred embodiment of the present invention, the vibrator 15 is provided separately from the vibrators 4 and 6, and the vibrator 15 is supported using the supporting beams 16. With this configuration, the vibrator 15 and the supporting beams 16 can be designed independently of the vibrators 4 and 6 and the supporting beams 5 and 7. As a result, the vibrators 4 and 6 and the supporting beams 5 and 7 can have a mass and a rigidity suitable for detecting angular velocity Ω, and the vibrator 15 and the supporting beams 16 can have a mass and a rigidity suitable for detecting acceleration α. Accordingly, both angular velocity Ω and acceleration α can be detected with high sensitivity.

Furthermore, the acceleration detecting circuit 31 performs synchronous detection on the displacement detection signal Va from the acceleration-detecting displacement detecting unit 17 using the monitor signal Vm from the vibration monitor unit 20, so that a signal of a frequency component different from the vibration frequency of the first vibrator 4 can be effectively removed. Thus, external electrical noise and other interference can be easily removed, and the detection accuracy of the acceleration α can be improved as compared to detecting acceleration in a state in which the first vibrator 4 is stopped.

Figure 4:
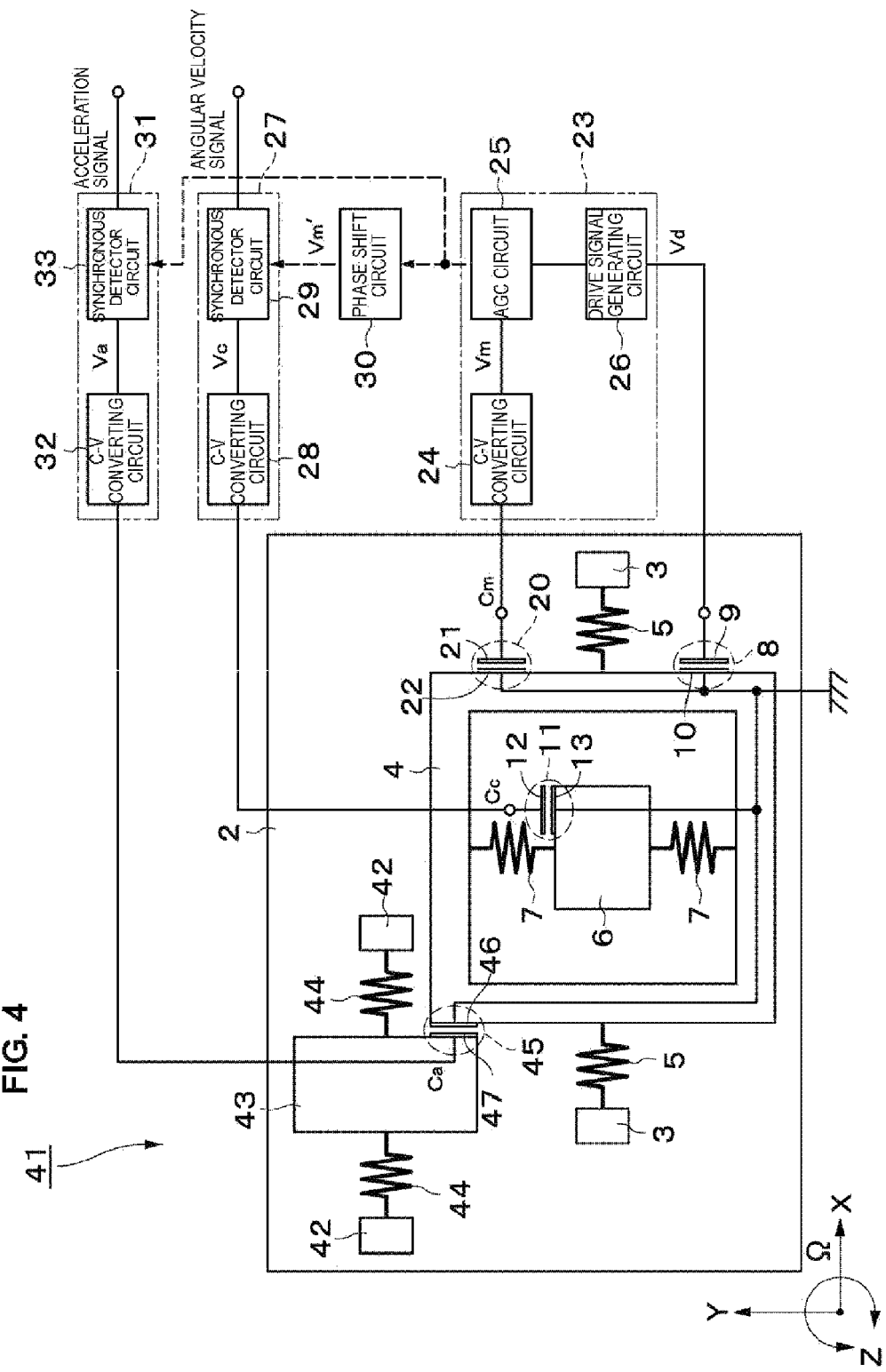
FIG. 4 is a plan view illustrating a composite sensor according to a second preferred embodiment of the present invention.

Next, FIG. 4 illustrates a second preferred embodiment of the present invention. One of the unique features of this preferred embodiment of the present invention is that a second vibrator is arranged such that it can be displaced in the X-axis direction, which is substantially the same direction as the vibration direction of a first vibrator. In this preferred embodiment of the present invention, the same elements as those in the first preferred embodiment are denoted by the same reference numerals, and the corresponding description is omitted.

A composite sensor 41 preferably includes the substrate 2, supporting units 3 and 42, vibrators 4, 6, and 43, supporting beams 5, 7, and 44, the vibration generating unit 8, displacement detecting units 11 and 45, and the vibration monitor unit 20.

The two second supporting units 42 are disposed on the surface of the substrate 2. These two second supporting units 42 are preferably arranged on both sides of the vibrator 43 described below in the X-axis direction.

The second vibrator 43 is disposed on the surface side of the substrate 2 near the first vibrator 4 and faces the substrate 2 with a gap therebetween. The second vibrator 43 preferably has a substantially rectangular plate shape, for example.

The second supporting beams 44 connect the second vibrator 43 to the second supporting units 42 and support the second vibrator 43 such that the second vibrator 43 can vibrate in the X-axis direction. The second supporting beams 44 are preferably flexibly deformable in the X-axis direction and are arranged on both sides of the second vibrator 43 in the X-axis direction. The supporting beams 44 support the vibrator 43 such that the vibrator 43 can vibrate in the X-axis direction and restrict displacement of the vibrator 43 in the Y-axis direction.

The acceleration-detecting displacement detecting unit 45 (acceleration-detecting displacement detector) is preferably arranged between the first vibrator 4 and the second vibrator 43 and detects the amount of displacement when the second vibrator 43 is displaced in the X-axis direction. The displacement detecting unit 45 preferably includes a detecting electrode 46 provided on the first vibrator 4 and a detecting electrode 47 provided on the second vibrator 43. The detecting electrodes 46 and 47 face each other with a gap therebetween to define a parallel plate capacitor, for example. The displacement detecting unit 45 is connected to the acceleration detecting circuit 31.

The detecting electrode 46 is displaced together with the first vibrator 4 in the X-axis direction, and the detecting electrode 47 is displaced together with the second vibrator 43 in the X-axis direction. Accordingly, the capacitance Ca between the detecting electrodes 46 and 47 changes when the first and second vibrators 4 and 43 are displaced in the X-axis direction. Thus, the displacement detecting unit 45 detects the amount of displacement when the second vibrator 43 is displaced in the X-axis direction using the capacitance Ca between the detecting electrodes 46 and 47.

Accordingly, in this preferred embodiment of the present invention having the above-described configuration, substantially the same operation, advantages and effects as those in the first preferred embodiment can be obtained. Particularly, in this preferred embodiment, the second vibrator 43 is arranged such that the second vibrator 43 can be displaced in the X-axis direction, which is the same as the vibration direction of the first vibrator 4, and thus acceleration in the vibration direction of the first vibrator 4 can be detected.

Figure 5:
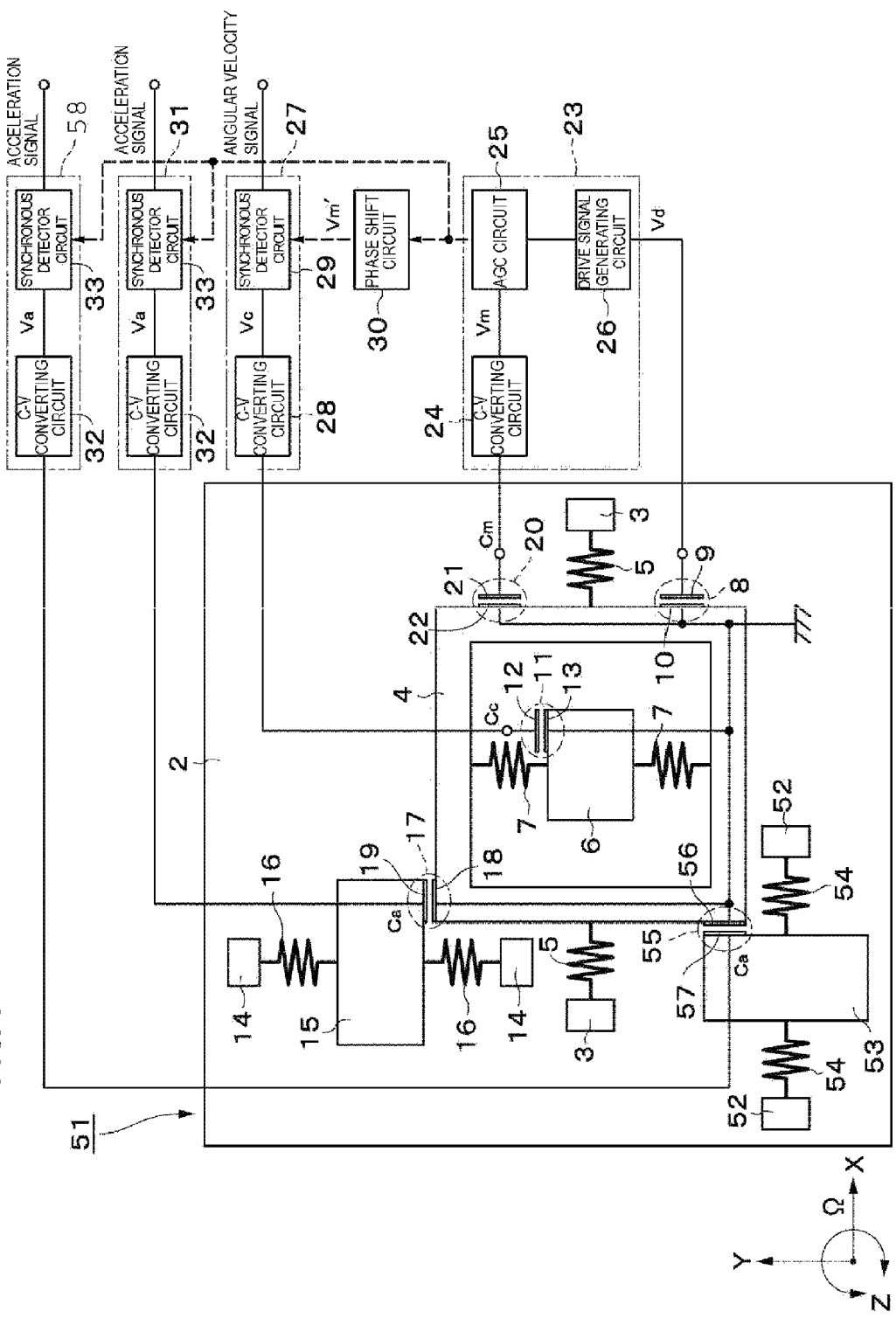
FIG. 5 is a plan view illustrating a composite sensor according to a third preferred embodiment of the present invention.

Next, FIG. 5 illustrates a third preferred embodiment of the present invention. One of the unique features of this preferred embodiment is that a second vibrator is arranged such that it can be displaced in the Y-axis direction and that a third vibrator is arranged such that it can be displaced in the X-axis direction. In this preferred embodiment of the present invention, the same elements as those in the first preferred embodiment are denoted by the same reference numerals, and the corresponding description is omitted.

A composite sensor 51 preferably includes the substrate 2, supporting units 3, 14, and 52, vibrators 4, 6, 15, and 53, supporting beams 5, 7, 16, and 54, the vibration generating unit 8, displacement detecting units 11, 17, and 55, and the vibration monitor unit 20.

The two third supporting units 52 are disposed on the surface of the substrate 2. The two third supporting units 52 are arranged on both sides of the vibrator 53 described below in the X-axis direction.

The third vibrator 53 is arranged on the surface side of the substrate 2 near the first vibrator 4 and faces the substrate 2 with a gap therebetween. The third vibrator 53 is disposed at a location different from that of the second vibrator 15 and preferably has a substantially rectangular plate shape, for example.

The third supporting beams 54 connect the third vibrator 53 to the third supporting units 52 and support the third vibrator 53 such that the third vibrator 53 can vibrate in the X-axis direction. The third supporting beams 54 are preferably flexibly deformable in the X-axis direction and are arranged on both sides of the third vibrator 53 in the X-axis direction, for example. The supporting beams 54 support the vibrator 53 such that the vibrator 53 can vibrate in the X-axis direction and restrict displacement of the vibrator 53 in the Y-axis direction.

The acceleration-detecting displacement detecting unit 55 (acceleration-detecting displacement detector) is arranged between the first vibrator 4 and the third vibrator 53 and detects the amount of displacement when the third vibrator 53 is displaced in the X-axis direction. The displacement detecting unit 55 preferably includes a detecting electrode 56 provided on the first vibrator 4 and a detecting electrode 57 provided on the third vibrator 53. The detecting electrodes 56 and 57 face each other with a gap therebetween to define a parallel plate capacitor. The displacement detecting unit 55 is connected to an acceleration detecting circuit 58 having substantially the same configuration as that of the acceleration detecting circuit 31.

Accordingly, in this preferred embodiment of the present invention having the above-described configuration, substantially the same operation, advantages and effects as those in the first preferred embodiment can be obtained. Particularly, in this preferred embodiment, the second vibrator 15 is arranged such that it can be displaced in the Y-axis direction and the third vibrator 53 is arranged such that it can be displaced in the X-axis direction. With this configuration, accelerations in two axial directions substantially perpendicular to each other can be detected at the same time.

Figure 6:
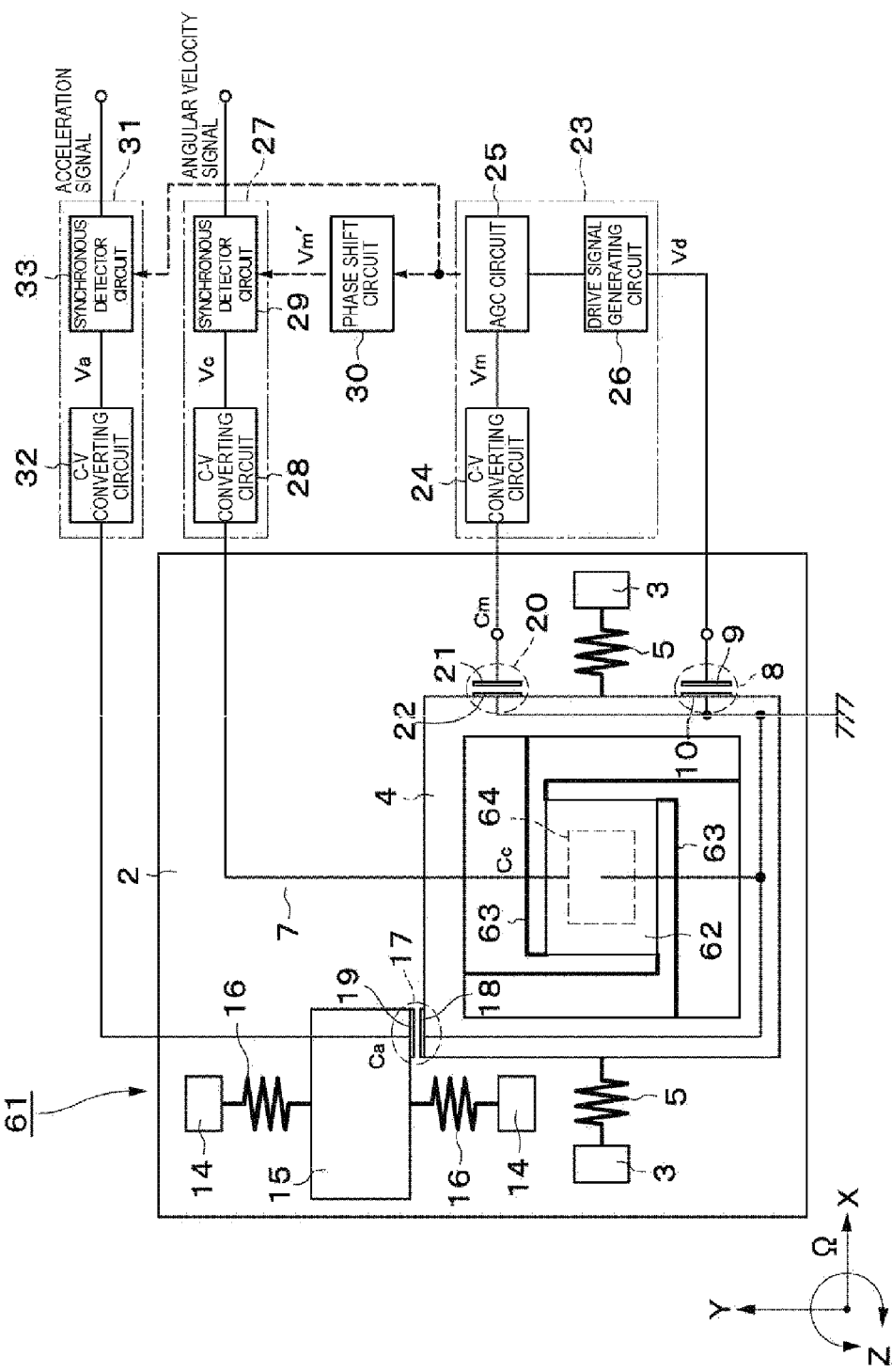
FIG. 6 is a plan view illustrating a composite sensor according to a fourth preferred embodiment of the present invention.

Next, FIG. 6 illustrates a fourth preferred embodiment of the present invention. One of the unique features of this preferred embodiment is that an angular-velocity-detecting vibrator is arranged such that it can be displaced in the Z-axis direction so as to detect angular velocity Ω about the Y axis. In this preferred embodiment, the same elements as those in the first preferred embodiment are denoted by the same reference numerals, and the corresponding description is omitted.

A composite sensor 61 preferably includes the substrate 2, the supporting units 3 and 14, vibrators 4, 62, and 15, supporting beams 5, 63, and 16, the vibration generating unit 8, displacement detecting units 64 and 17, and the vibration monitor unit 20.

The angular-velocity-detecting vibrator 62 is preferably arranged such that it can be displaced in the Z-axis direction by the angular-velocity-detecting supporting beams 63 extending from its four corners. The angular-velocity-detecting displacement detecting unit 64 including a parallel plate capacitor, for example, is provided between the angular-velocity-detecting vibrator 62 and the substrate 2. The displacement detecting unit 64 is connected to the angular velocity detecting circuit 27.

Accordingly, in this preferred embodiment of the present invention having the above-described configuration, substantially the same operation, advantages and effects as those in the first preferred embodiment can be obtained. Particularly, in this preferred embodiment, the angular-velocity-detecting vibrator 62 is arranged such that it can be displaced in the Z-axis direction, and thus angular velocity Ω about the Y axis can be detected by using the displacement detecting unit 64.

Next, FIGS. 7 to 12 illustrate a fifth preferred embodiment of the present invention. One of the unique features of this preferred embodiment is that a plurality of first vibrators are arranged in the Y-axis direction, that first supporting beams connect the plurality of first vibrators with each other, and that a vibration generating unit enables the first vibrators adjacent to each other to vibrate in opposite phases to each other.

In FIGS. 7-12, a composite sensor 71 preferably includes a substrate 72, supporting units 73, 98, and 101, mass units 74, 78, 82, 83, 99, and 102, supporting beams 77, 81, 84, 100, and 103, vibration generating units 86 and 89, displacement detecting units 92, 95, 104, and 107, and vibration monitor units 110 and 113.

Preferably, the substrate 72 is made of a silicon material, a glass material, or other suitable material, for example, has a substantially flat plate shape, horizontally extends along the X axis and Y axis among the X axis and Y axis that are substantially perpendicular to each other and the Z axis, and is disposed vertically to the Z axis.

By performing etching, for example, on a conductive silicon material or other suitable material having low resistance provided on the substrate 72, the supporting units 73, 98, and 101, the mass units 74, 78, 82, 83, 99, and 102, the supporting beams 77, 81, 84, 100, and 103, the vibration generating units 86 and 89, the displacement detecting units 92, 95, 104, and 107, and the vibration monitor units 110 and 113 are formed on the substrate 72.

The central supporting units 73 define first supporting units and are arranged on both sides in the X-axis direction on the substrate 72. Each of the central supporting units 73 preferably includes a base portion 73A that is fixed on the substrate 72 and that extends in the Y-axis direction, and three arm portions 73B that are arranged on the base portion 73A and that are connected to nodes 84A of the connecting supporting beam 84 at locations separated from the substrate 72.

The respective arm portions 73B preferably hold the mass units 74, 78, 82, and 83, on the supporting beams 77, 81, and 84, such that they are separated from the substrate 72. In addition, the arm portions 73B hold the respective mass units at the locations of the nodes 84A (nodes of vibration) of the connecting supporting beams 84. With this configuration, vibrations are canceled at the locations of the nodes 84A and propagation of the vibrations to the substrate 72 can be suppressed.

The first central mass unit 74 preferably faces the substrate 72 with a gap therebetween. In addition, the first central mass unit 74 and the second central mass unit 78 are disposed at a middle position among the four mass units 74, 78, 82, and 83 arranged in the Y-axis direction. The central mass unit 74 preferably includes an outer frame 75 having a substantially rectangular frame shape and defining a first vibrator, an inner frame 76 disposed in the inner side of the outer frame 75, having a substantially rectangular frame shape, and defining an angular-velocity-detecting vibrator, and four angular-velocity-detecting supporting beams 77 provided between four corners of the inner frame 76 and the outer frame 75.

The outer frame 75 prevents flexible deformation of the connecting supporting beams 84 described below from propagating to the inner frame 76 as displacement in the Y-axis direction (detection direction) when the central mass unit 74 vibrates in the X-axis direction (vibration direction). In addition, the angular-velocity-detecting supporting beams 77 preferably extend in the X-axis direction and are flexibly deformable in the Y-axis direction, support the inner frame 76 such that it can be displaced in the Y-axis direction, and restrict displacement of the inner frame 76 in the X-axis direction.

The second central mass unit 78 preferably includes an outer frame 79 (first vibrator), an inner frame 80 (angular-velocity-detecting vibrator), and angular-velocity-detecting supporting beams 81, substantially similar to the central mass unit 74. The inner frame 80 can be displaced in the Y-axis direction when the angular-velocity-detecting supporting beams 81 are flexibly deformed.

The first and second outer mass units 82 and 83 are preferably arranged on the outer sides of the central mass units 74 and 78 in the Y-axis direction and define first vibrators, respectively. The outer mass units 82 and 83 are preferably defined by linear mass units extending in the X-axis direction, and both ends thereof in the longitudinal direction are connected to the connecting supporting beams 84.

The connecting supporting beams 84 are preferably arranged on both sides of the mass units 74, 78, 82, and 83 in the X-axis direction and constitute first supporting beams. Each of the connecting supporting beams 84 is preferably a small-width beam having a spring property, linearly extends in the y-axis direction, and is flexibly deformable in the X-axis direction, for example. In addition, at middle portions in the longitudinal direction of each connecting supporting beam 84, the outer frames 75 and 79 of the mass units 74 and 78 are preferably connected via wide connecting portions 85 having high rigidity, and the outer mass units 82 and 83 are preferably connected on both sides of the connecting supporting beams 84 in the longitudinal direction.

With this configuration, the four mass units 74, 78, 82, and 83 are mutually connected in a ladder pattern to define a connected mass unit, and are supported by the connecting supporting beams 84 while being linearly arranged in the Y-axis direction such that the four mass units can vibrate in the X-axis direction. Furthermore, these mass units 74, 78, 82, and 83 are preferably disposed substantially symmetrically with reference to the center of gravity G of the entire mass unit.

Figure 7:
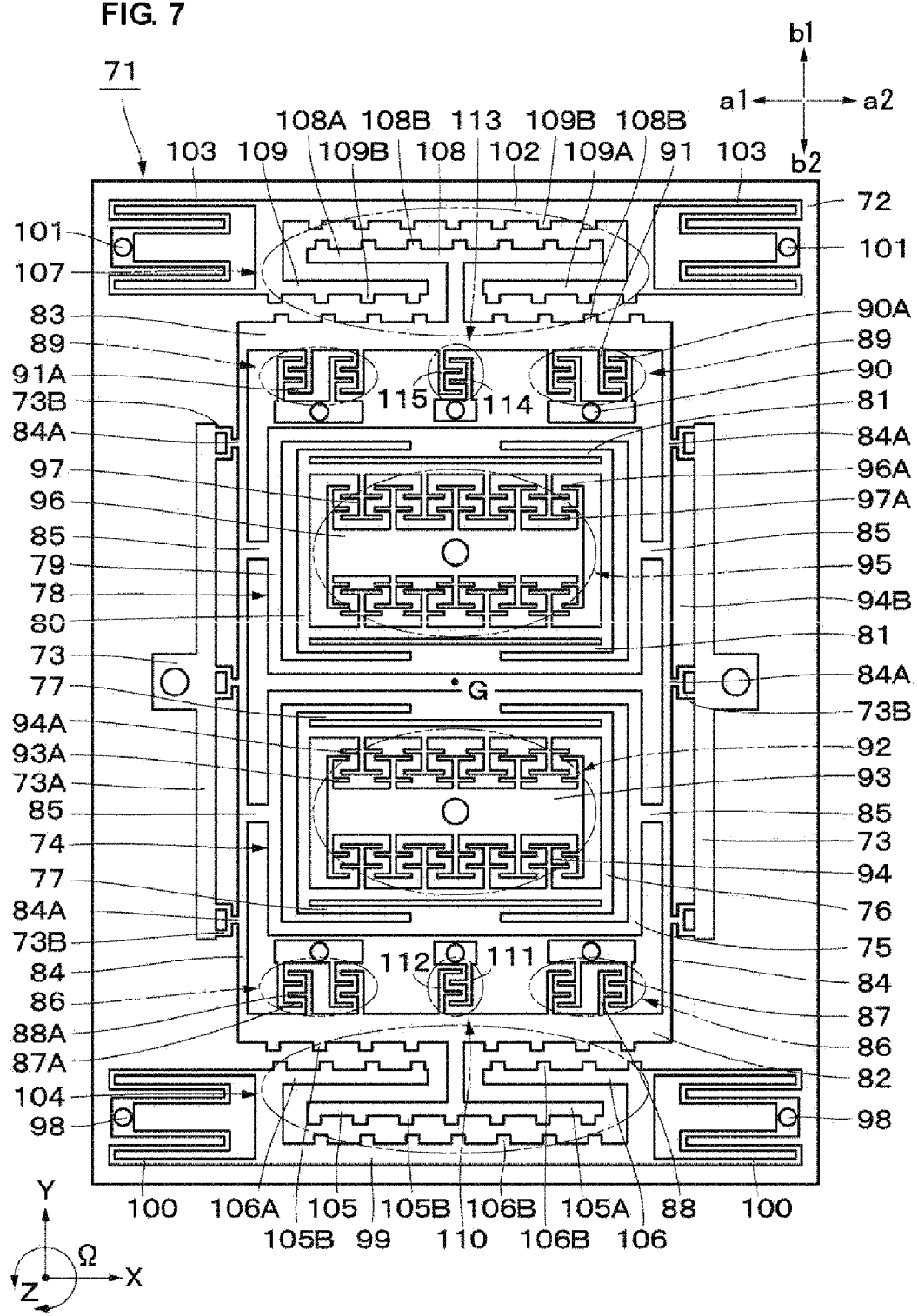
FIG. 7 is a plan view illustrating a composite sensor according to a fifth preferred embodiment of the present invention.
Figure 11:
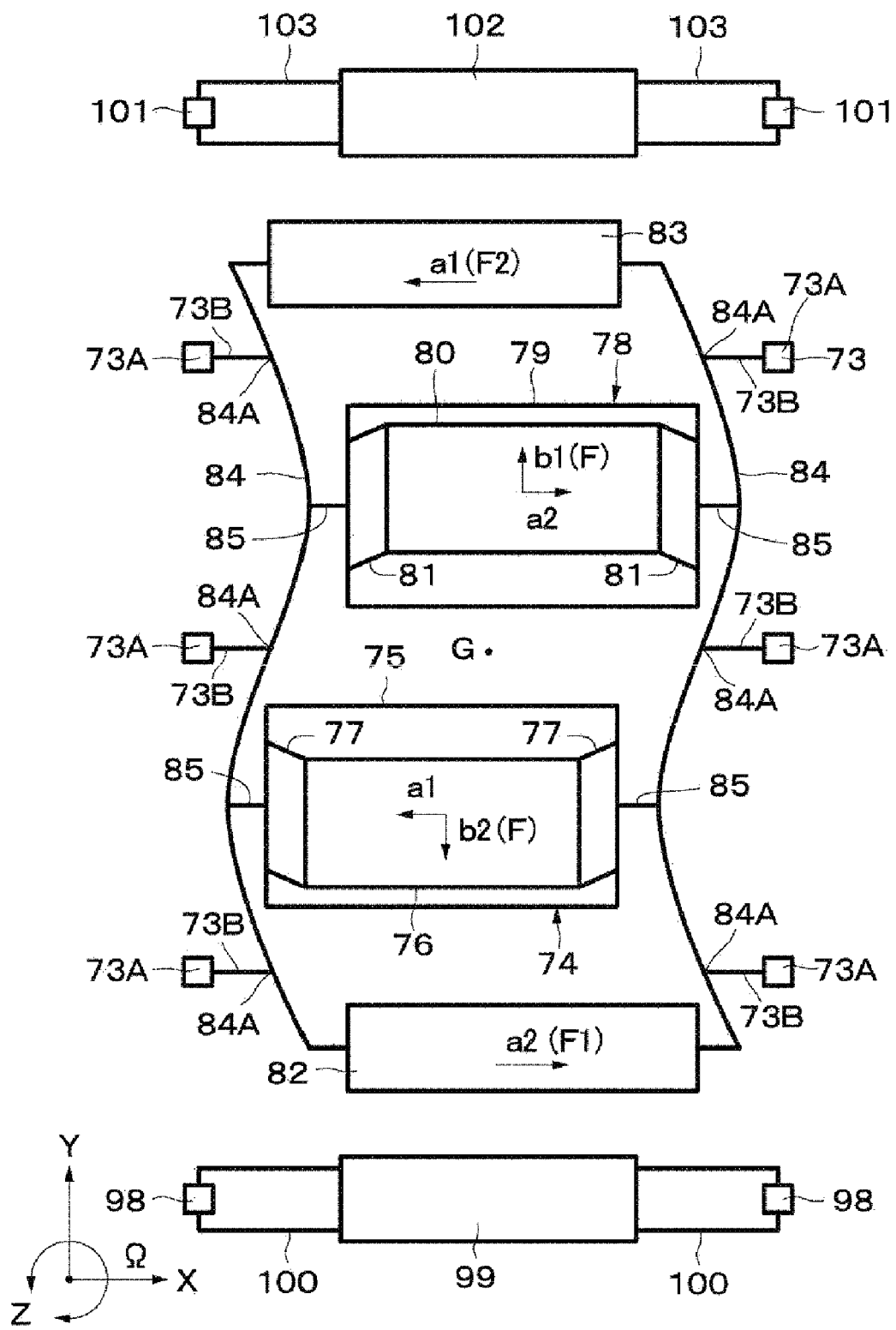
FIG. 11 is a schematic illustration illustrating a state in which angular velocity acts on the composite sensor illustrated in FIG. 7.

When a drive signal is applied to the vibration generating units 86 and 89 described below, the mass units 74 and 83 and the mass units 78 and 82 adjacent to each other vibrate in the X-axis direction in opposite phases to each other (with a phase difference of approximately 180 degrees) while maintaining the center of gravity G of the entire mass unit at substantially a constant position, as illustrated in FIGS. 7 and 11. That is, when the mass units 74 and 83 vibrate in the direction indicated by an arrow a1 along the X-axis direction, the mass units 78 and 82 vibrate in the opposite direction, that is, in the direction indicated by an arrow a2.

A vibration mode in which the adjacent mass units vibrate in opposite phases to each other in the above-described manner is determined to be a normal vibration mode when the composite sensor 71 operates. In this vibration mode, the mass units 74 and 83 and the mass units 78 and 82 can stably vibrate at symmetric positions with the center of gravity G being the approximate center. In addition, propagation of vibration to the substrate 72 can be minimized by well-balanced vibration of those mass units around the center of gravity G. In the normal vibration mode, each connecting supporting beam 84 vibrates to while being flexibly deformed in a substantially S shape in the X-axis direction. At the approximate middle portions in its longitudinal direction, the three nodes 84A define nodes of vibration and substantially maintaining a constant position are provided.

The first vibration generating units 86 (vibration generators) are preferably arranged between the substrate 72 and the first outer mass unit 82 and enable the first outer mass unit 82 to vibrate in the X-axis direction by using an electrostatic force. The two vibration generating units 86 are preferably arranged while being separated from each other in the X-axis direction. Each of the vibration generating units 86 preferably includes a fixed-side driving electrode 87 provided on the substrate 72 and a movable-side driving electrode 88 provided on the outer mass unit 82.

The fixed-side driving electrode 87 is preferably defined by a comb electrode having a plurality of electrode plates 87A, for example. In addition, the movable-side driving electrode 88 is preferably defined by a comb electrode having a plurality of electrode plates 88A, for example. The respective electrode plates 87A and 88A are engaged with each other with a gap therebetween in the Y-axis direction.

The second vibration generating units 89 (vibration generators) are arranged between the substrate 72 and the second outer mass unit 83 and enable the second outer mass unit 83 to vibrate in the X-axis direction using an electrostatic force. The two vibration generating units 89 are preferably arranged while being separated from each other in the X-axis direction. Each of the vibration generating units 89 preferably includes a fixed-side driving electrode 90 provided on the substrate 72 and a movable-side driving electrode 91 provided on the outer mass unit 83.

The fixed-side driving electrode 90 is preferably defined by a comb electrode having a plurality of electrode plates 90A, for example. In addition, the movable-side driving electrode 91 is preferably defined by a comb electrode having a plurality of electrode plates 91A, for example. The respective electrode plates 90A and 91A are engaged with each other with a gap therebetween in the Y-axis direction.

The vibration generating units 86 and 89 generate an electrostatic force when being supplied with a drive signal Vd from a vibration control circuit 116 described below and enable the outer mass units 82 and 83 to vibrate in the X-axis direction using the electrostatic force as a driving force. In this case, when the vibration generating unit 86 generates a driving force F1 in the direction indicated by the arrow a2, the vibration generating unit 89 generates a driving force F2 in the direction indicated by the arrow a1 of the opposite direction (opposite phase).

The first angular-velocity-detecting displacement detecting unit 92 (angular-velocity-detecting displacement detector) is arranged between the substrate 72 and the central mass unit 74 and detects the amount of displacement when the inner frame 76 is displaced in the Y-axis direction. The displacement detecting unit 92 preferably includes a fixed-side detecting electrode 93 provided on the substrate 72 and a movable-side detecting electrode 94 provided on the inner frame 76.

The fixed-side detecting electrode 93 preferably includes a plurality of electrode plates 93A extending in the X-axis direction with gaps in the Y-axis direction, and is disposed inside the inner frame 76 of the first central mass unit 74. On the other hand, the movable-side detecting electrode 94 is preferably provided on the inner frame 76 of the central mass unit 74 corresponding to the fixed-side detecting electrode 93 and includes a plurality of electrode plates 94A engaging with the respective electrode plates 93A of the fixed-side detecting electrode 93 with gaps in the Y-axis direction. Accordingly, the electrode plates 93A and 94A define a parallel plate capacitor, for example.

When the inner frame 76 is displaced in the Y-axis direction due to angular velocity Ω about the Z axis, the displacement detecting unit 92 detects the amount of displacement as angular velocity Ω based on a change in capacitance Cc1 between the detecting electrodes 93 and 94.

The second angular-velocity-detecting displacement detecting unit 95 (angular-velocity-detecting displacement detector) is provided between the substrate 72 and the central mass unit 78 and detects the amount of displacement when the inner frame 80 is displaced in the Y-axis direction. The displacement detecting unit 95 preferably includes a fixed-side detecting electrode 96 provided on the substrate 72 and a movable-side detecting electrode 97 provided on the inner frame 80, almost like the displacement detecting unit 92.

The fixed-side detecting electrode 96 preferably includes a plurality of electrode plates 96A extending in the X-axis direction with gaps in the Y-axis direction, and is disposed inside the inner frame 80 of the second central mass unit 78. On the other hand, the movable-side detecting electrode 97 is preferably provided on the inner frame 80 of the central mass unit 78 corresponding to the fixed-side detecting electrode 96 and includes a plurality of electrode plates 97A engaging with the respective electrode plates 96A of the fixed-side detecting electrode 96 with gaps in the Y-axis direction. Accordingly, the electrode plates 96A and 97A define a parallel plate capacitor, for example.

When the inner frame 80 is displaced in the Y-axis direction due to angular velocity Ω about the Z axis, the displacement detecting unit 95 detects the amount of displacement as angular velocity Ω based on a change in capacitance Cc2 between the detecting electrodes 96 and 97.

In the first displacement detecting unit 92, the capacitance Cc1 between the detecting electrodes 93 and 94 increases when the inner frame 76 of the central mass unit 74 is displaced in the direction indicated by an arrow b1 along the Y-axis direction, and the capacitance Cc1 decreases when the inner frame 76 is displaced in the direction indicated by an arrow b2. On the other hand, in the second displacement detecting unit 95, the capacitance Cc2 between the detecting electrodes 96 and 97 decreases when the inner frame 80 of the central mass unit 78 is displaced in the direction indicated by the arrow b1, and the capacitance Cc2 increases when the inner frame 80 is displaced in the direction indicated by the arrow b2.

The two first outer supporting units 98 preferably define second supporting units and are arranged on the surface of the substrate 72 on the outer side of the first outer mass unit 82 in the Y-axis direction with the center of gravity G being the center. The two outer supporting units 98 are placed on both sides of the unconnected mass unit 99 described below in the X-axis direction.

The first unconnected mass unit 99 defines a second vibrator, is provided on the surface side of the substrate 72 while being positioned near the outer mass unit 82, and faces the substrate 72 with a gap therebetween. The first unconnected mass unit 99 is preferably defined by a C-shaped frame, for example.

The first outer supporting beams 100 define second supporting beams, connect the unconnected mass unit 99 to the outer supporting units 98, and support the unconnected mass unit 99 such that it can vibrate in the Y-axis direction. The outer supporting beams 100 are preferably folded in the X-axis direction and have a spring property of being flexibly deformable in the Y-axis direction. Two outer supporting beams 100 are disposed on each of both sides of the unconnected mass unit 99 in the X-axis direction, that is, a total of four outer supporting beams 100 are provided. With this configuration, the outer supporting beams 100 support the unconnected mass unit 99 such that it can vibrate in the Y-axis direction and restrict displacement of the unconnected mass unit 99 in the X-axis direction.

On the opposite side in the Y-axis direction of the first outer supporting units 98, the first unconnected mass unit 99, and the first outer supporting beams 100, with the mass units 74, 78, 82, and 83 being arranged between the both sides, the second outer supporting units 101, the second unconnected mass unit 102, and the second outer supporting beams 103 are preferably provided. In this case, the second outer supporting units 101, the second unconnected mass unit 102, and the second outer supporting beams 103 have substantially the same configuration as that of the first outer supporting unit 98, the first unconnected mass unit 99, and the first outer supporting beams 100, and define the second supporting units, the second vibrator, and the second supporting beams, respectively. Thus, the unconnected mass unit 102 preferably connects to the outer supporting units 101 via the outer supporting beams 103 and is supported such that it can vibrate in the Y-axis direction.

The unconnected mass units 99 and 102 are arranged on opposite sides to each other in the Y-axis direction with respect to the outer mass units 82 and 93. Thus, when acceleration α acts in the Y-axis direction, the unconnected mass units 99 and 102 are displaced in opposite directions to each other with respect to the outer mass units 82 and 83. That is, when the unconnected mass unit 99 approaches the outer mass unit 82, the unconnected mass unit 102 retreats from the outer mass unit 83. On the other hand, when the unconnected mass unit 99 retreats from the outer mass unit 82, the unconnected mass unit 102 approaches the outer mass unit 83.

Figure 8:
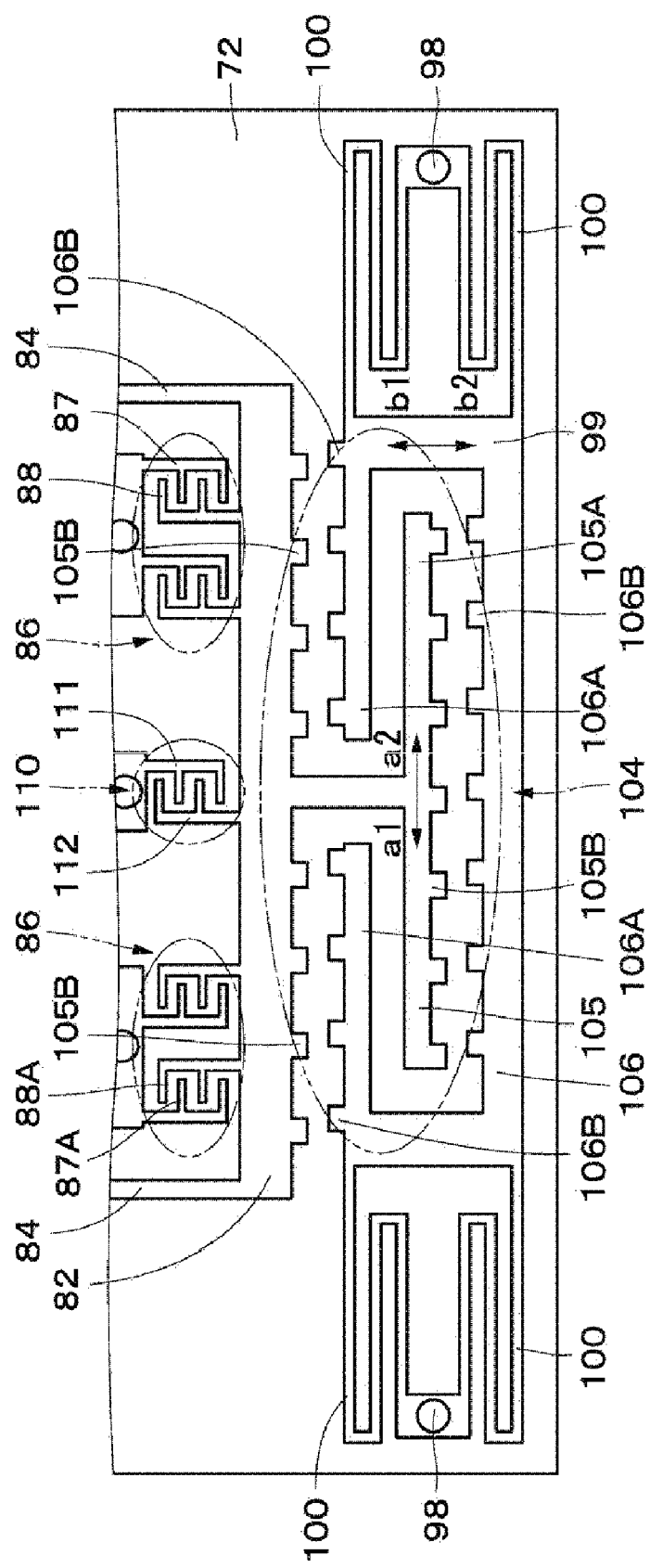
FIG. 8 is an enlarged plan view of a main portion illustrating an enlarged unconnected mass unit illustrated in FIG. 7.

The first acceleration-detecting displacement detecting unit 104 (acceleration-detecting displacement detector) is preferably arranged between the first outer mass unit 82 and the first unconnected mass unit 99 and detects the amount of displacement when the unconnected mass unit 99 is displaced in the Y-axis direction. Here, the displacement detecting unit 104 preferably includes a detecting electrode 105 provided on the outer mass unit 82 and a detecting electrode 106 provided on the unconnected mass unit 99, as illustrated in FIG. 8.

The detecting electrode 105 preferably includes a T-shaped arm portion 105A and a plurality of electrode portions 105B provided on the arm portion 105A and the outer mass unit 82, for example. A base end of the arm portion 105A is connected to the outer mass unit 82, whereas the top end thereof is inserted into the unconnected mass unit 99 having a frame shape. The respective electrode portions 105B protrude toward the unconnected mass unit 99 in the direction b2 in the Y-axis direction illustrated in FIG. 7.

On the other hand, the detecting electrode 106 preferably includes arm portions 106A inserted between the outer mass unit 82 and the arm portion 105A and a plurality of electrode portions 106B provided on the arm portions 106A and inside of the unconnected mass unit 99. The respective electrode portions 106B are arranged at the positions corresponding to the electrode portions 105B of the detecting electrode 105. The respective electrode portions 106B protrude toward the outer mass unit 82 in the direction b1 in the Y-axis direction illustrated in FIG. 7. The electrode portions 105B and 106B face each other with a gap therebetween in the Y-axis direction and form a parallel plate capacitor.

Figure 9:
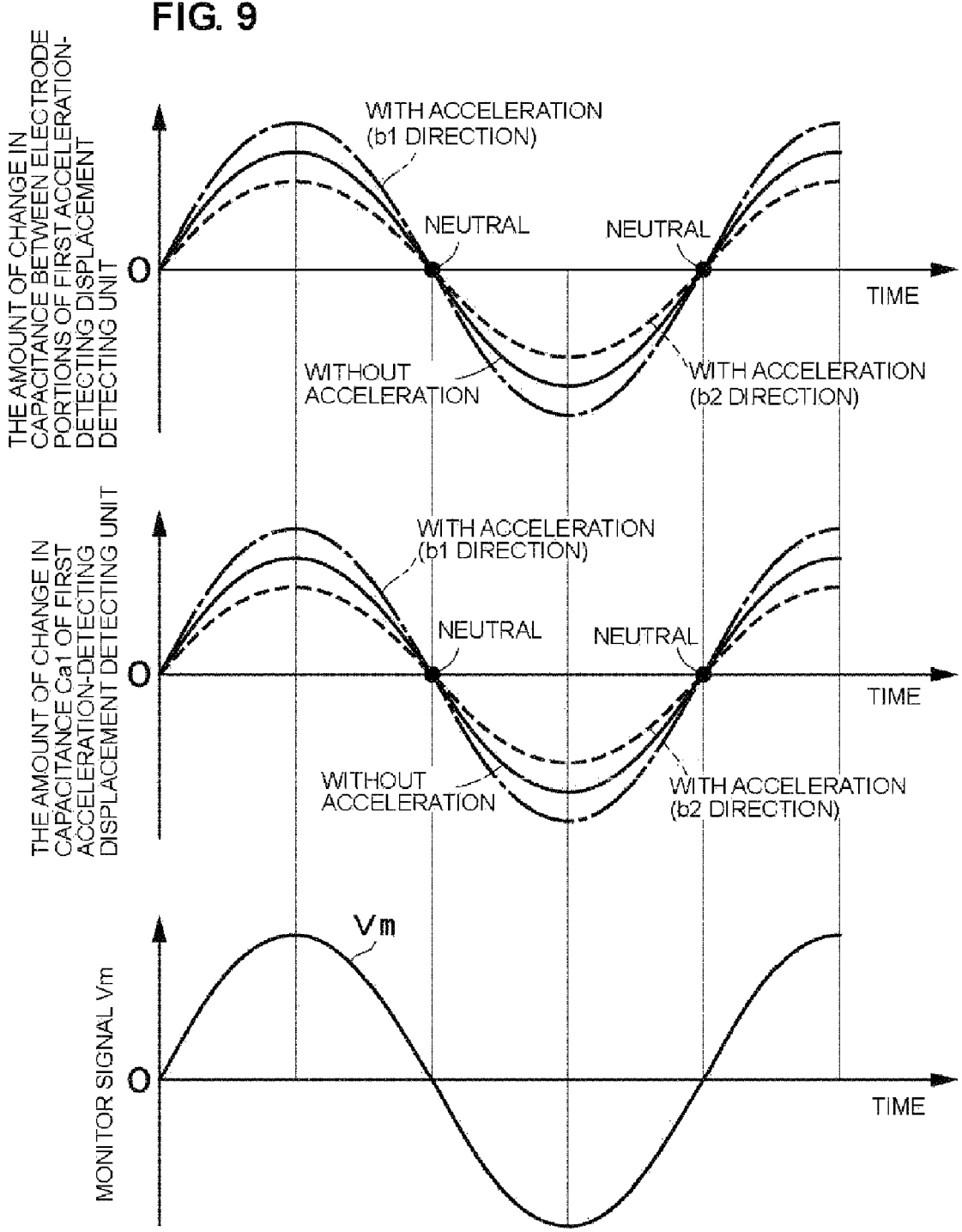
FIG. 9 is a characteristic diagram illustrating the amount of change in capacitance detected by an acceleration-detecting displacement detector illustrated in FIG. 8.

The detecting electrode 105 is preferably displaced together with the outer mass unit 82 in the X-axis direction. Accordingly, when the outer mass unit 82 is displaced in the X-axis direction, the area at which the detecting electrodes 105 and 106 face each other changes, and thus, capacitance Ca1 between the detecting electrodes 105 and 106 changes according to the area. The electrode portions 105B and 106B are mutually staggered in the X-axis direction so that about half of the end surfaces thereof partially face each other when the outer mass unit 82 is in a neutral state. When the outer mass unit 82 is displaced in the direction a1 illustrated in FIG. 7 due to the vibration generating units 86, the area at which the electrode portions 105B and 106B face each other decreases, for example. On the other hand, when the outer mass unit 82 is displaced in the direction a2 illustrated in FIG. 7 due to the vibration generating units 86, the area at which the electrode portions 105B and 106B face each other increases, for example. Accordingly, when the outer mass unit 82 vibrates in the X-axis direction, the capacitance Ca1 between the detecting electrodes 105 and 106 changes in accordance with the vibration cycle (drive cycle) of the outer mass unit 82, as illustrated in FIG. 9.

On the other hand, the detecting electrode 106 is displaced together with the unconnected mass unit 99 in the Y-axis direction. When the unconnected mass unit 99 is displaced in the Y-axis direction, the distance between the detecting electrodes 105 and 106 changes, and thus, the capacitance Ca1 between the detecting electrodes 105 and 106 also changes in accordance the distance. Thus, the displacement detecting unit 104 detects the amount of displacement when the unconnected mass unit 99 is displaced in the Y-axis direction using the capacitance Ca1 between the detecting electrodes 105 and 106.

The second acceleration-detecting displacement detecting unit 107 (acceleration-detecting displacement detector) is preferably arranged between the second outer mass unit 83 and the second unconnected mass unit 102, as illustrated in FIG. 7, and detects the amount of displacement when the unconnected mass unit 102 is displaced in the Y-axis direction. The displacement detecting unit 107 preferably includes a detecting electrode 108 provided on the outer mass unit 83 and a detecting electrode 109 provided on the unconnected mass unit 102, similar to the displacement detecting unit 104.

With this configuration, the detecting electrode 108 preferably includes a T-shaped arm portion 108A inserted into the unconnected mass unit 102 and a plurality of electrode portions 108B provided on the arm portion 108A and the outer mass unit 83, for example. The respective electrode portions 108B protrude toward the unconnected mass unit 102 in the direction b1 in the Y-axis direction illustrated in FIG. 7.

On the other hand, the detecting electrode 109 preferably includes arm portions 109A inserted between the outer mass unit 83 and the arm portion 108A and a plurality of electrode portions 109B provided on the arm portions 109A and inside of the unconnected mass unit 102. In this case, the respective electrode portions 109B are disposed at positions corresponding to the electrode portions 108B of the detecting electrode 108. The respective electrode portions 109B protrude toward the outer mass unit 83 in the direction b2 in the Y-axis direction illustrated in FIG. 7. The electrode portions 108B and 109B face each other with a gap therebetween in the Y-axis direction and define a parallel plate capacitor, for example. With this configuration, the displacement detecting unit 107 detects the amount of displacement when the unconnected mass unit 102 is displaced in the Y-axis direction by using capacitance Ca2 between the detecting electrodes 108 and 109.

As with the electrode portions 105B and 106B, the electrode portions 108B and 109B are preferably mutually staggered in the X-axis direction so that about half of the end surfaces thereof partially face each other when the outer mass unit 83 is in a neutral state. When the outer mass unit 83 is displaced in the direction a1 illustrated in FIG. 7 due to the vibration generating units 89, the area at which the electrode portions 108B and 109B face each other increases. On the other hand, when the outer mass unit 83 is displaced in the direction a2 illustrated in FIG. 7 due to the vibration generating units 89, the area at which the electrode portions 108B and 109B face each other decreases. Accordingly, when the outer mass unit 83 vibrates in the X-axis direction, the capacitance Ca2 between the detecting electrodes 108 and 109 changes in accordance with the vibration cycle (drive cycle) of the outer mass unit 83.

In the first displacement detecting unit 104, the capacitance Ca1 between the detecting electrodes 105 and 106 increases when the unconnected mass unit 99 is displaced in the direction b1 along the Y-axis direction, and the amplitude also increases. The capacitance Ca1 decreases when the unconnected mass unit 99 is displaced in the direction b2, and the amplitude also decreases. On the other hand, in the second displacement detecting unit 107, the capacitance Ca2 between the detecting electrodes 108 and 109 decreases when the unconnected mass unit 102 is displaced in the direction b1, and the amplitude also decreases. The capacitance Ca2 increases when the unconnected mass unit 102 is displaced in the direction b2, and the amplitude also increases.

The first vibration monitor unit 110 (vibration monitor) is arranged between the substrate 72 and the first outer mass unit 82 and detects the amount of displacement when the outer mass unit 82 is displaced in the X-axis direction. The vibration monitor unit 110 preferably includes a fixed-side monitor electrode 111 provided on the substrate 72 and a movable-side monitor electrode 112 provided on the outer mass unit 82. The monitor electrodes 111 and 112 are preferably defined by comb electrodes and engage each other with a gap therebetween, for example.

The second vibration monitor unit 113 (vibration monitor) is arranged between the substrate 72 and the second outer mass unit 83 and detects the amount of displacement when the outer mass unit 83 is displaced in the X-axis direction. The vibration monitor unit 113 preferably includes a fixed-side monitor electrode 114 provided on the substrate 72 and a movable-side monitor electrode 115 provided on the outer mass unit 83. The monitor electrodes 114 and 115 are preferably defined by comb electrodes and engage each other with a gap therebetween, for example.

In the first vibration monitor unit 110, capacitance Cm1 between the monitor electrodes 111 and 112 decreases when the outer mass unit 82 is displaced in the direction a1 along the X-axis direction, and the capacitance Cm1 increases when the outer mass unit 82 is displaced in the direction a2. On the other hand, in the second vibration monitor unit 113, capacitance Cm2 between the monitor electrodes 114 and 115 increases when the outer mass unit 83 is displaced in the direction a1, and the capacitance Cm2 decreases when the outer mass unit 83 is displaced in the direction a2.

Figure 10:
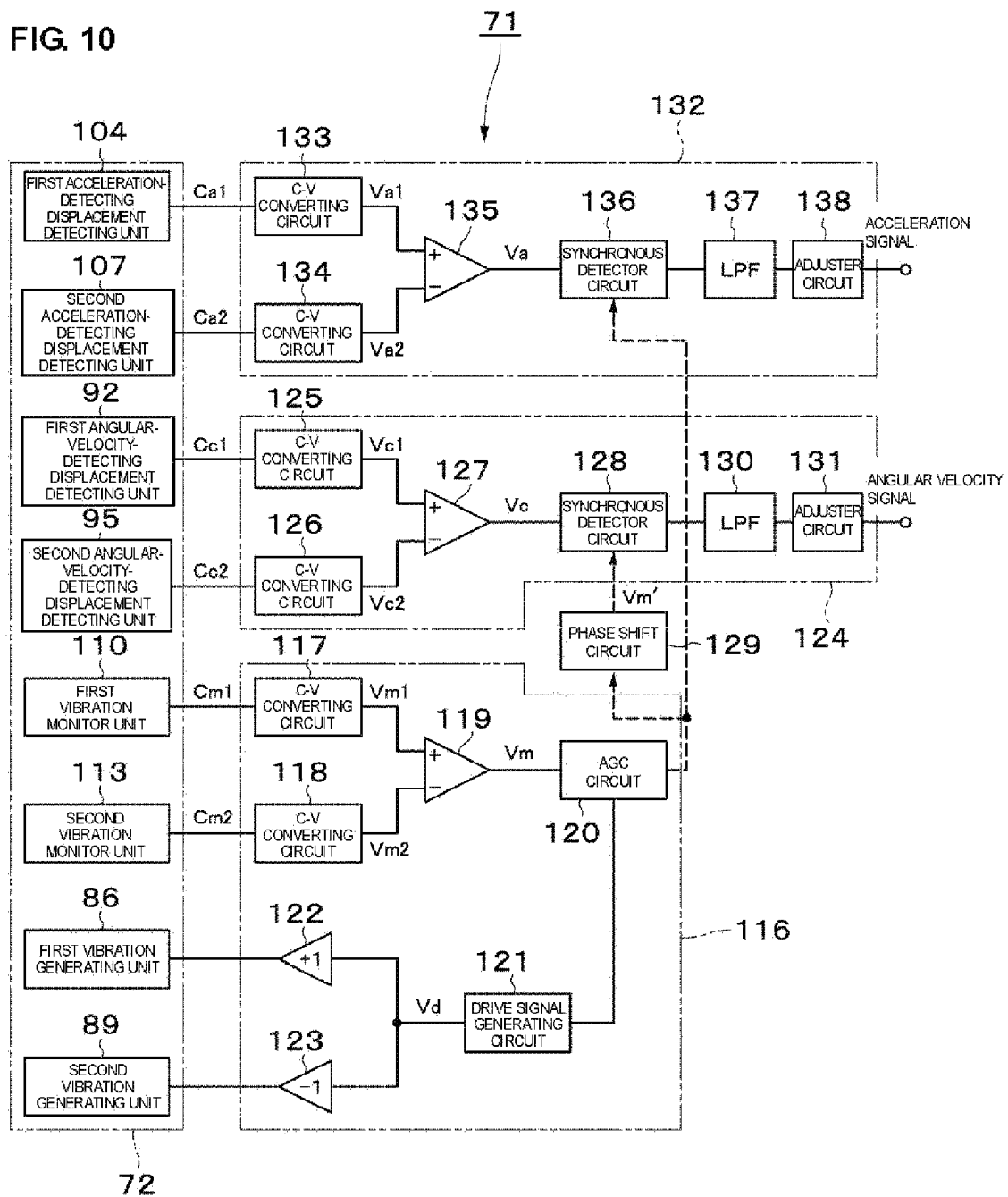
FIG. 10 is a circuit configuration diagram illustrating a vibration control circuit, an angular velocity detecting circuit, and an acceleration detecting circuit of the composite sensor illustrated in FIG. 7.

Next, the vibration control circuit 116 to control the vibration state of the mass units 74, 78, 82, and 83 is described with reference to FIG. 10. The vibration control circuit 116 controls a drive signal Vd to be output to the vibration generating units 86 and 89 by using a monitor signal Vm from the vibration monitor units 110 and 113. The vibration control circuit 116 preferably includes C-V converting circuits 117 and 118, a differential amplifier 119, an AGC circuit 120, and a drive signal generating circuit 121.

The C-V converting circuits 117 and 118 connect to the output sides of the vibration monitor units 110 and 113, respectively. The C-V converting circuits 117 and 118 convert changes in the capacitance Cm1 and Cm2 of the vibration monitor units 110 and 113 to changes in voltages and output the changes in voltages as preliminary monitor signals Vm1 and Vm2, respectively. The differential amplifier 119 is connected to the output sides of the C-V converting circuits 117 and 118.

When the mass units 74 and 83 and the mass units 78 and 82 are vibrating in opposite phases to each other, the two preliminary monitor signals Vm1 and Vm2 have opposite phases to each other. Thus, the two preliminary monitor signals Vm1 and Vm2 are differentially amplified by the differential amplifier 119, so that a final monitor signal Vm is output to the AGC circuit 120.

Preferably, the output side of the AGC circuit 120 is connected to the drive signal generating circuit 121 to output the drive signal Vd. The AGC circuit 120 adjusts gain so that the monitor signal Vm is maintained substantially constant. The drive signal generating circuit 121 connects to the first vibration generating unit 86 via an amplifier 122 and also connects to the second vibration generating unit 89 via an inverting amplifier 123. With this configuration, the drive signal generating circuit 121 inputs drive signals Vd having opposite phases to each other to the vibration generating units 86 and 89, so that the vibration generating units 86 and 89 enable the mass units 74 and 83 and the mass units 78 and 82 to vibrate in opposite phases to each other.

Next, an angular velocity detecting circuit 124 (angular velocity detector) to detect angular velocity $\Omega$ is described. The angular velocity detecting circuit 124 performs synchronous detection on displacement detection signals Vc from the displacement detecting units 92 and 95 by using the monitor signal Vm from the vibration monitor units 110 and 113 and detects angular velocity $\Omega$ that acts on the inner frames 76 and 80. The angular velocity detecting circuit 124 includes C-V converting circuits 125 and 126, a differential amplifier 127, and a synchronous detector circuit 128.

The C-V converting circuits 125 and 126 are connected to the output sides of the displacement detecting units 92 and 95, respectively. The C-V converting circuits 125 and 126 convert changes in the capacitances Cc1 and Cc2 of the displacement detecting units 92 and 95 to changes in voltages, and output the changes in voltages as preliminary displacement detection signals Vc1 and Vc2, respectively. The differential amplifier 127 connects to the output sides of the C-V converting circuits 125 and 126.

Here, when angular velocity $\Omega$ acts in a state in which the mass units 74 and 78 are vibrating in opposite phases to each other, the inner frames 76 and 80 are displaced in opposite directions to each other with respect to the Y-axis direction (see FIG. 11). At this time, the two preliminary displacement detection signals Vc1 and Vc2 have opposite phases to each other. Thus, the two preliminary displacement detection signals Vc1 and Vc2 are differentially amplified by the differential amplifier 127, so that a final displacement detection signal Vc is output to the synchronous detector circuit 128.

The input side of the synchronous detector circuit 128 is connected to the differential amplifier 127, and is also connected to the AGC circuit 120 via the phase shift circuit 129. The output side of the synchronous detector circuit 128 is connected to a low pass filter (LPF) 130 to extract an angular velocity signal, and the output side of the LPF 130 is connected to an adjuster circuit 131 to adjust gain and offset. The phase shift circuit 129 outputs a phase shift signal Vm', generated by shifting the phase of the monitor signal Vm output via the AGC circuit 120 by about 90 degrees, for example. Accordingly, the synchronous detector circuit 128 performs synchronous detection on the displacement detection signal Vc by using the phase shift signal Vm', and outputs an angular velocity signal according to the angular velocity Ω via the LPF 130 and the adjuster circuit 131.

Next, an acceleration detecting circuit 132 (acceleration detector) to detect acceleration α is described. The acceleration detecting circuit 132 performs synchronous detection on a displacement detection signal Va from the displacement detecting units 104 and 107 using the monitor signal Vm from the vibration monitor units 110 and 113 and detects acceleration α that acts on the mass units 99 and 102. The acceleration detecting circuit 132 preferably includes C-V converting circuits 133 and 134, a differential amplifier 135, and a synchronous detector circuit 136.

The C-V converting circuits 133 and 134 are connected to the output sides of the displacement detecting units 104 and 107, respectively. The C-V converting circuits 133 and 134 convert changes in the capacitances Ca1 and Ca2 of the displacement detecting units 104 and 107 to changes in voltages, and output the changes in voltages as preliminary displacement detection signals Va1 and Va2, respectively. The differential amplifier 135 connects to the output sides of the C-V converting circuits 133 and 134.

Figure 12:
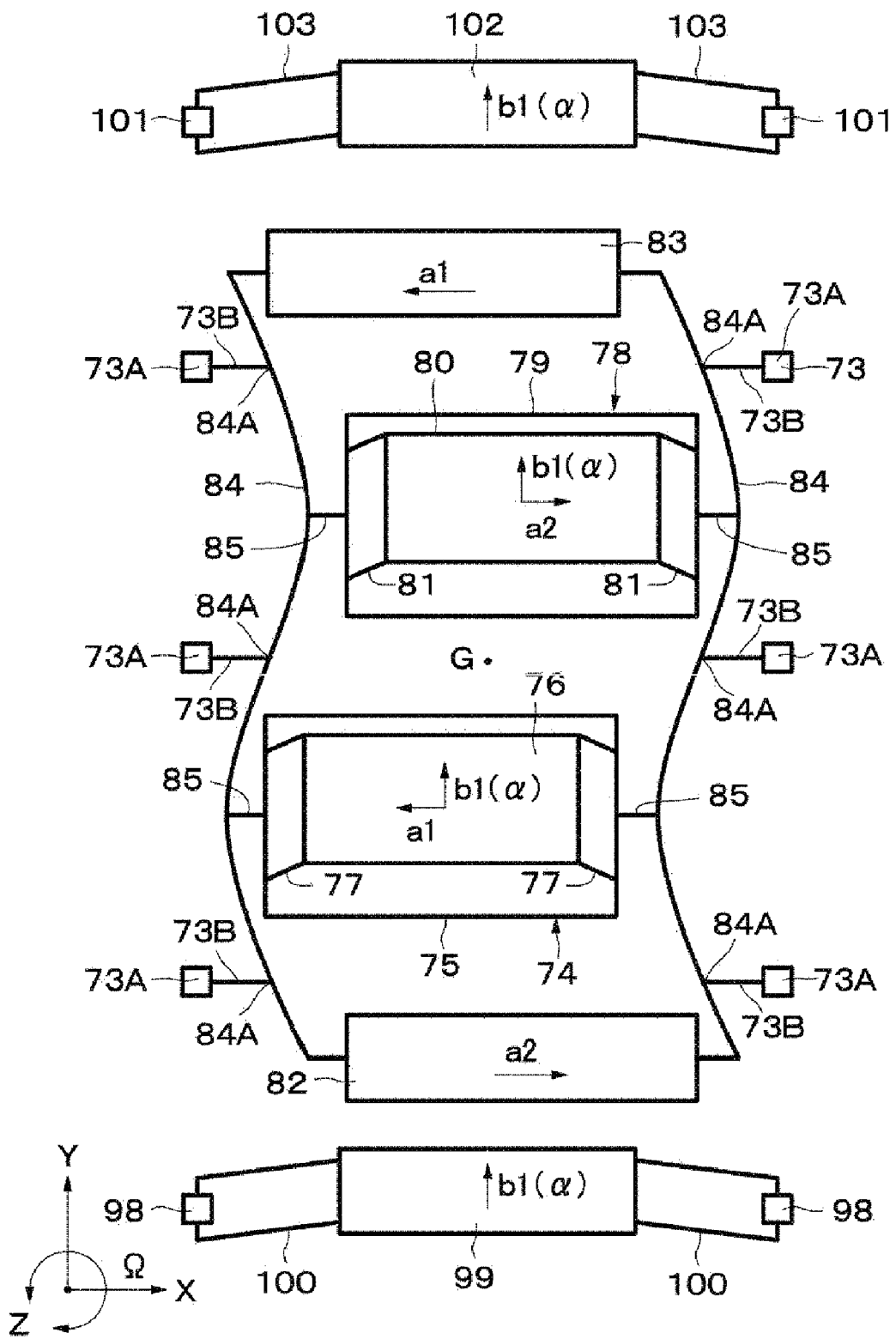
FIG. 12 is a schematic illustration illustrating a state in which acceleration acts on the composite sensor illustrated in FIG. 7.

When acceleration α acts in the Y-axis direction, the unconnected mass units 99 and 102 are displaced in opposite directions to each other with respect to the outer mass units 82 and 83 (see FIG. 12). At this time, the two preliminary displacement detection signals Va1 and Va2 have opposite phases to each other. Thus, the two preliminary displacement detection signals Va1 and Va2 are differentially amplified by the differential amplifier 135, so that a final displacement detection signal Va is output to the synchronous detector circuit 136.

The input side of the synchronous detector circuit 136 is connected to the differential amplifier 135, and is also connected to the AGC circuit 120. The output side of the synchronous detector circuit 136 is connected to a low pass filter (LPF) 137 to extract an acceleration signal, and the output side of the LPF 137 is connected to an adjuster circuit 138 to adjust gain and offset. In this case, if the unconnected mass units 99 and 102 are displaced due to acceleration α, the capacitances Ca1 and Ca2 of the displacement detecting units 104 and 107 change in accordance with the amount of displacement of the unconnected mass units 99 and 102, in synchronization with vibration in the X-axis direction of the mass units 74, 78, 82, and 83. Thus, the synchronous detector circuit 136 performs synchronous detection on the displacement detection signal Va using the monitor signal Vm, and outputs an acceleration signal according to the acceleration α via the LPF 137 and the adjuster circuit 138.

The composite sensor 71 according to this preferred embodiment of the present invention has the above-described configuration. The operation thereof is described below.

First, upon output of the drive signal Vd to the vibration generating units 86 and 89, an electrostatic force in the X-axis direction is generated in the vibration generating units 86 and 89, and the mass units 74, 78, 82, and 83 vibrate in the X-axis direction. At this time, the vibration generating units 86 and 89 enable the mass units 74 and 83 and the mass units 78 and 82 adjacent to each other to vibrate in opposite phases to each other. The vibration control circuit 116 controls the drive signal Vd by using the monitor signal Vm from the vibration monitor units 110 and 113 so as to enable the mass units 74, 78, 82, and 83 to constantly vibrate with substantially the same amplitude.

If angular velocity Ω about the Z axis is applied to the composite sensor 71 while the mass units 74 and 83 are vibrating in the X-axis direction, a Coriolis force F in the Y-axis direction is applied to the inner frames 76 and 80, as in the first preferred embodiment of the present invention.

At this time, the inner frames 76 and 80 are displaced in the Y-axis direction according to the angular velocity Ω. Accordingly, the capacitances Cc1 and Cc2 of the angular-velocity-detecting displacement detecting units 92 and 95 change, so that the C-V converting circuits 125 and 126 convert the changes in the capacitances Cc1 and Cc2 to preliminary displacement detection signals Vc1 and Vc2. At this time, since the mass units 74 and 78 are vibrating in opposite phases to each other along the X-axis direction, the preliminary displacement detection signals Vc1 and Vc2 have opposite phases to each other. Thus, the differential amplifier 127 calculates the difference between the preliminary displacement detection signals Vc1 and Vc2 and outputs a final displacement detection signal Vc. Then, the synchronous detector circuit 128 detects a signal synchronous with the phase shift signal Vm' from the displacement detection signal Vc. Accordingly, the angular velocity detecting circuit 124 outputs an angular velocity signal according to the angular velocity Ω to the outside.

On the other hand, if acceleration α in the Y-axis direction is applied to the composite sensor 71 while the mass units 82 and 83 are vibrating in the X-axis direction, the unconnected mass units 99 and 102 are displaced in the Y-axis direction in accordance with the acceleration α. Accordingly, the capacitances Ca1 and Ca2 of the acceleration-detecting displacement detecting units 104 and 107 change, so that the C-V converting circuits 133 and 134 convert the changes in the capacitances Ca1 and Ca2 to preliminary displacement detection signals Va1 and Va2. At this time, since the unconnected mass units 99 and 102 are disposed in positions opposite to each other along the Y-axis direction with respect to the mass units 82 and 83, the preliminary displacement detection signals Va1 and Va2 have opposite phases to each other. Thus, the differential amplifier 135 calculates the difference between the preliminary displacement detection signals Va1 and Va2 and outputs a final displacement detection signal Va. Then, the synchronous detector circuit 136 detects a signal that is synchronous with the monitor signal Vm from the displacement detection signal Va. Accordingly, the acceleration detecting circuit 132 outputs an acceleration signal according to the acceleration α to the outside.

Accordingly, in this preferred embodiment of the present invention, the angular velocity Ω and the acceleration α can be detected as in the first preferred embodiment of the present invention.

In addition, the unconnected mass units 99 and 102 are provided independently of the mass units 74, 78, 82, and 83, and the unconnected mass units 99 and 102 are supported using the outer supporting beams 100 and 103. With this configuration, the unconnected mass units 99 and 102 and the outer supporting beams 100 and 103 can be designed independently of the mass units 74, 78, 82, and 83 and the supporting beams 77, 81, and 84. Accordingly, both the angular velocity Ω and the acceleration α can be detected with outstanding sensitivity.

Furthermore, the acceleration detecting circuit 132 performs synchronous detection on the displacement detection signal Va from the acceleration-detecting displacement detecting units 104 and 107 using the monitor signal Vm from the vibration monitor units 110 and 113. With this configuration, a signal of a frequency component different from the vibration frequency of the mass units 74, 78, 82, and 83 can be removed. Accordingly, external electrical noise and other interference can be easily removed and detection accuracy of acceleration α can be improved.

Particularly, in this preferred embodiment, the mass units 74 and 78 adjacent to each other in the Y-axis direction vibrate in opposite phases to each other. At this time, the inner frames 76 and 80 of the mass units 74 and 78 are displaced in opposite directions to each other due to a Coriolis force F when angular velocity Ω acts thereon, and are displaced in the same direction due to an inertial force when acceleration α. At this time, the angular-velocity-detecting displacement detecting units 92 and 95 detect displacement in the Y-axis direction of the inner frames 76 and 80, and the differential amplifier 127 calculates the difference between the preliminary displacement detection signals Vc1 and Vc2 from the displacement detecting units 92 and 95. Accordingly, since the angular velocity detecting circuit 124 detects the angular velocity Ω using the displacement detection signal Vc from the differential amplifier 127, an acceleration component in the preliminary displacement detection signals Vc1 and Vc2 can be offset and removed, so that the angular velocity Ω can be detected with improved accuracy by separating it from the acceleration α.

Since the unconnected mass units 99 and 102 are arranged on opposite sides to each other in the Y-axis direction with respect to the mass units 82 and 83, the unconnected mass units 99 and 102 are displaced in opposite directions to each other with respect to the mass units 82 and 83 when acceleration α acts thereon. At this time, the acceleration-detecting displacement detecting units 104 and 107 detect displacement in the Y-axis direction of the unconnected mass units 99 and 102, and the differential amplifier 135 calculates the difference between the preliminary displacement detection signals Va1 and Va2 from the displacement detecting units 104 and 107. Accordingly, the final displacement detection signal Va output from the differential amplifier 135 can be significantly changed, and the detection sensitivity of the acceleration α can be improved.

Furthermore, the acceleration-detecting displacement detecting unit 104 includes a pair of electrode portions 105B and 106B that are arranged between the mass unit 82 and the unconnected mass unit 99 and that face each other. The pair of electrode portions 105B and 106B are mutually staggered in the X-axis direction so that they partially face each other in a neutral state where vibration of the mass unit 82 stops. Likewise, a pair of electrode portions 108B and 109B of the acceleration-detecting displacement detecting unit 107 are mutually staggered in the X-axis direction so that they partially face each other in a neutral state where vibration of the mass unit 83 stops.

With this configuration, the area at which the electrode portions 105B and 106B face each other decreases when the mass unit 82 is displaced in the direction a1 of the X axis. At this time, the mass unit 83 is displaced in the direction a2 of the X axis, and thus the area at which the electrode portions 108B and 109B face each other also decreases. On the other hand, the area at which the electrode portions 105B and 106B face each other increases when the mass unit 82 is displaced in the direction a2 of the X axis. At this time, the mass unit 83 is displaced in the direction a1 of the X axis, and thus the area at which the electrode portions 108B and 109B face each other also increases.

Accordingly, the area at which the electrode portions 105B and 106B face each other and the area at which the electrode portions 108B and 109B face each other change in synchronization with the vibration cycle of the mass units 82 and 83, and thus the capacitance between the electrode portions 105B and 106B and the capacitance between the electrode portions 108B and 109B can be synchronous with the vibration cycle of the mass units 82 and 83. As a result, the displacement detection signal Va that is synchronized with the vibration cycle of the mass units 82 and 83 can be obtained based on changes in the capacitances Ca1 and Ca2 of the displacement detection units 104 and 107, and thus, the synchronous detector circuit 136 can perform synchronous detection on the displacement detection signal Va using the monitor signal Vm and output an acceleration signal according to the acceleration α.

Figure 13:
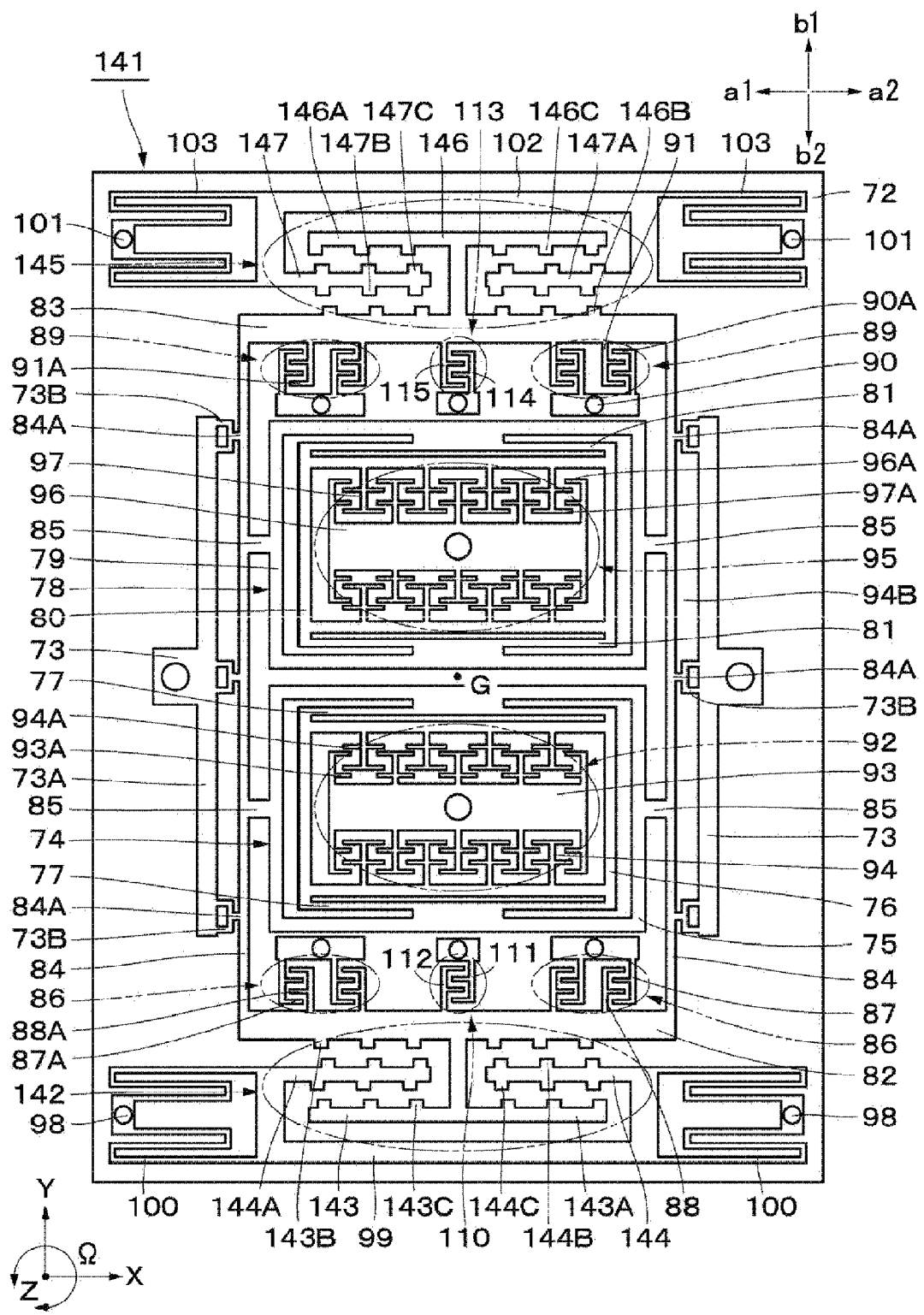
FIG. 13 is a plan view illustrating a composite sensor according to a sixth preferred embodiment of the present invention.
Figure 14:
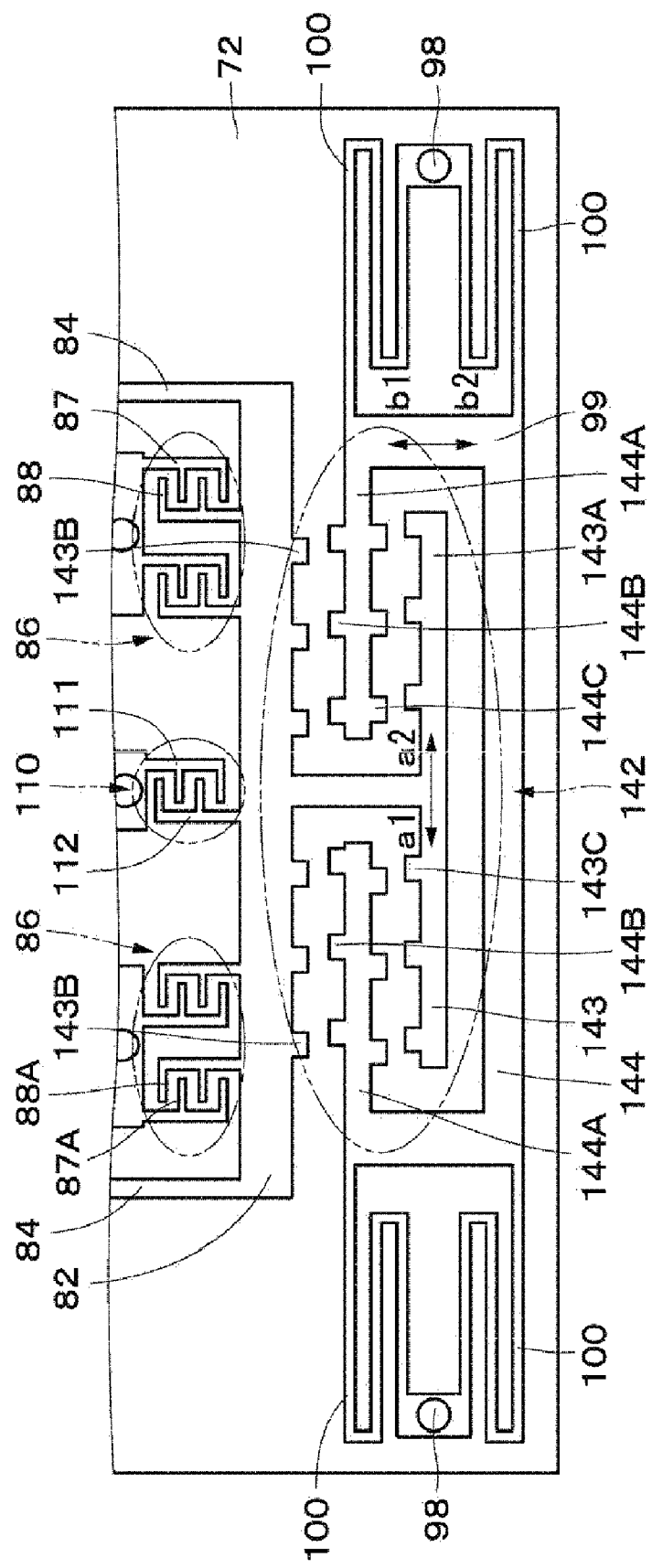
FIG. 14 is an enlarged plan view of a main portion illustrating an enlarged unconnected mass unit illustrated in FIG. 13.
Figure 15:
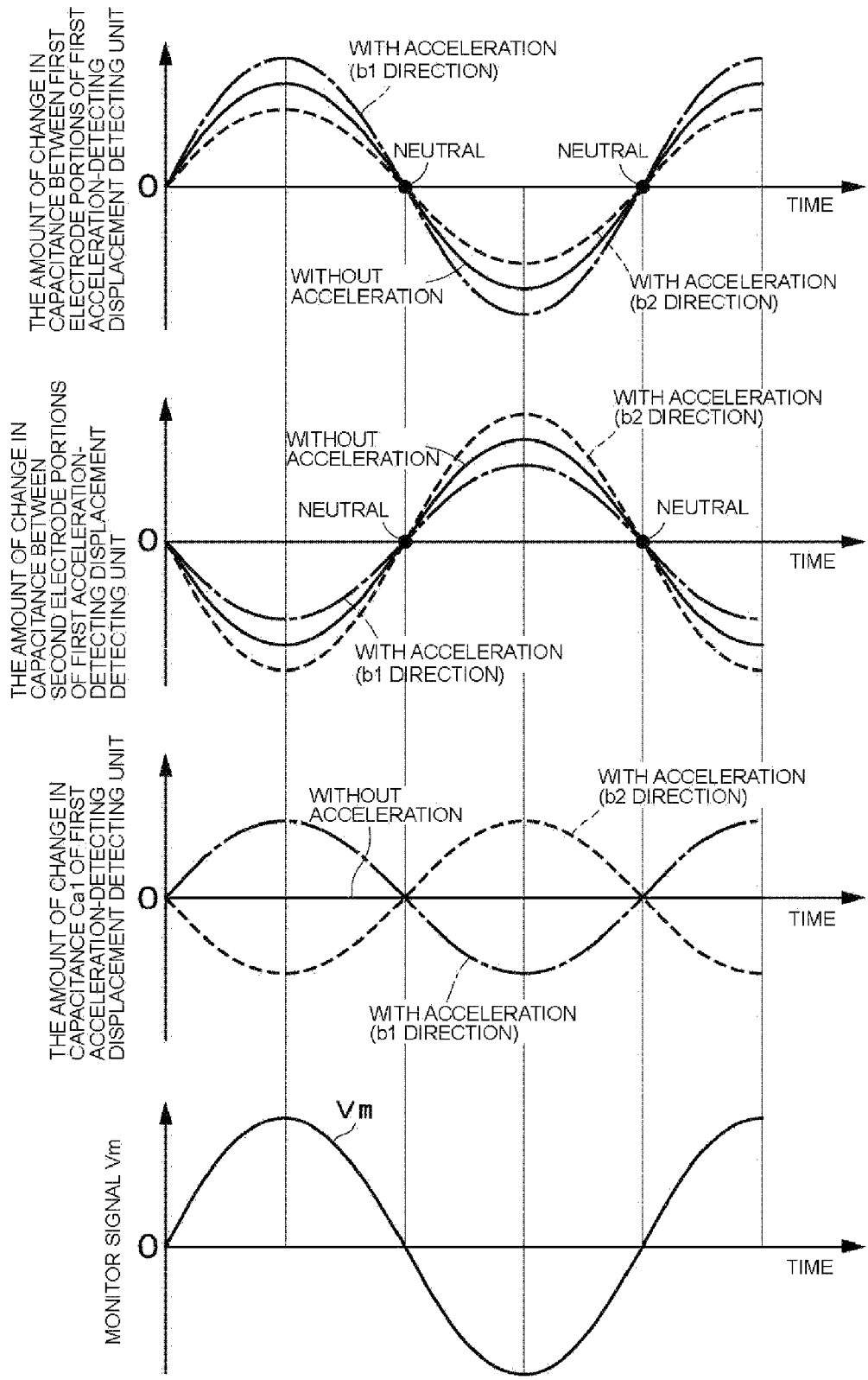
FIG. 15 is a characteristic diagram illustrating the amount of change in capacitance detected by an acceleration-detecting displacement detecting unit illustrated in FIG. 14.
Figure 16:
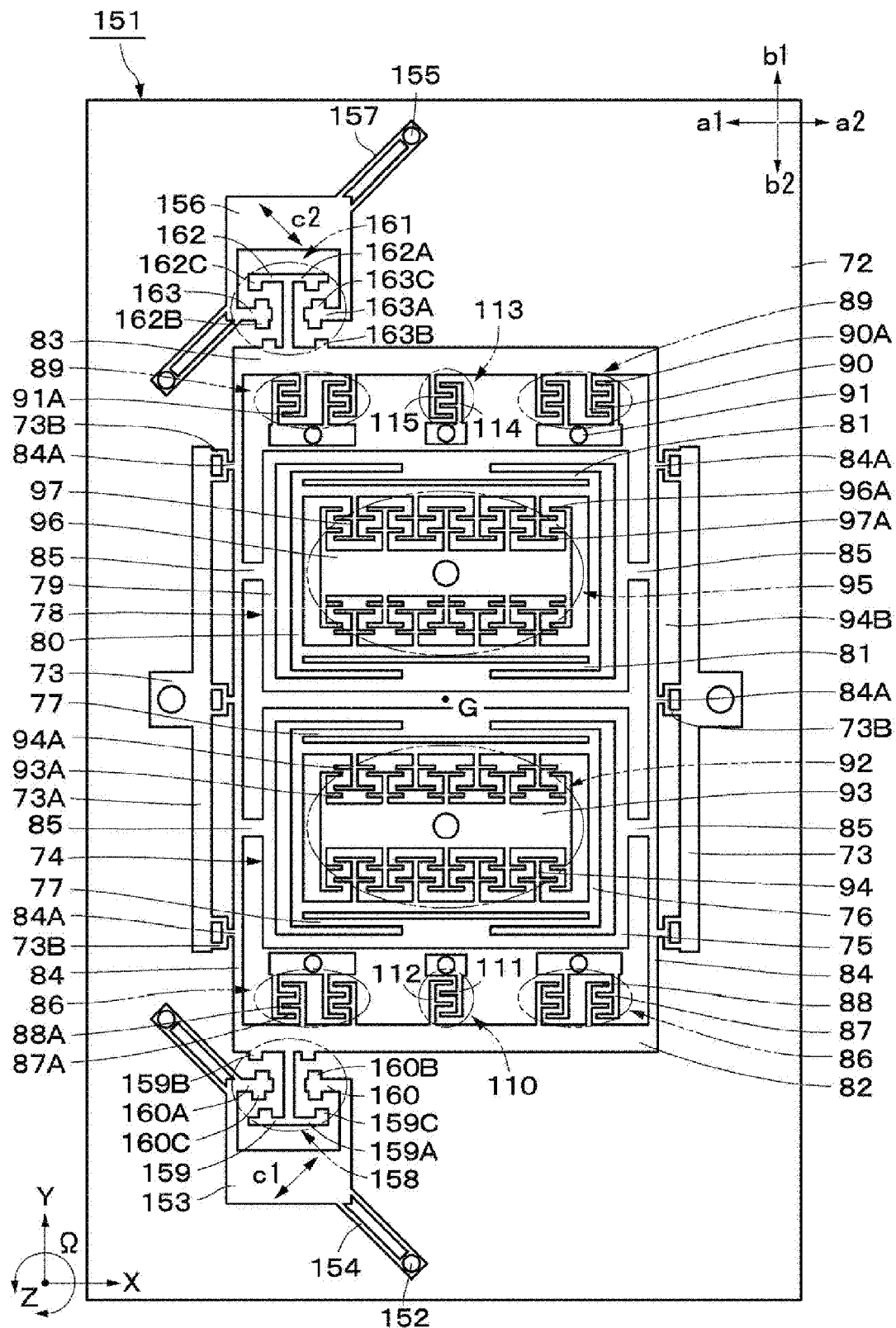
FIG. 16 is a plan view illustrating a composite sensor according to a seventh preferred embodiment of the present invention.
Figure 17:
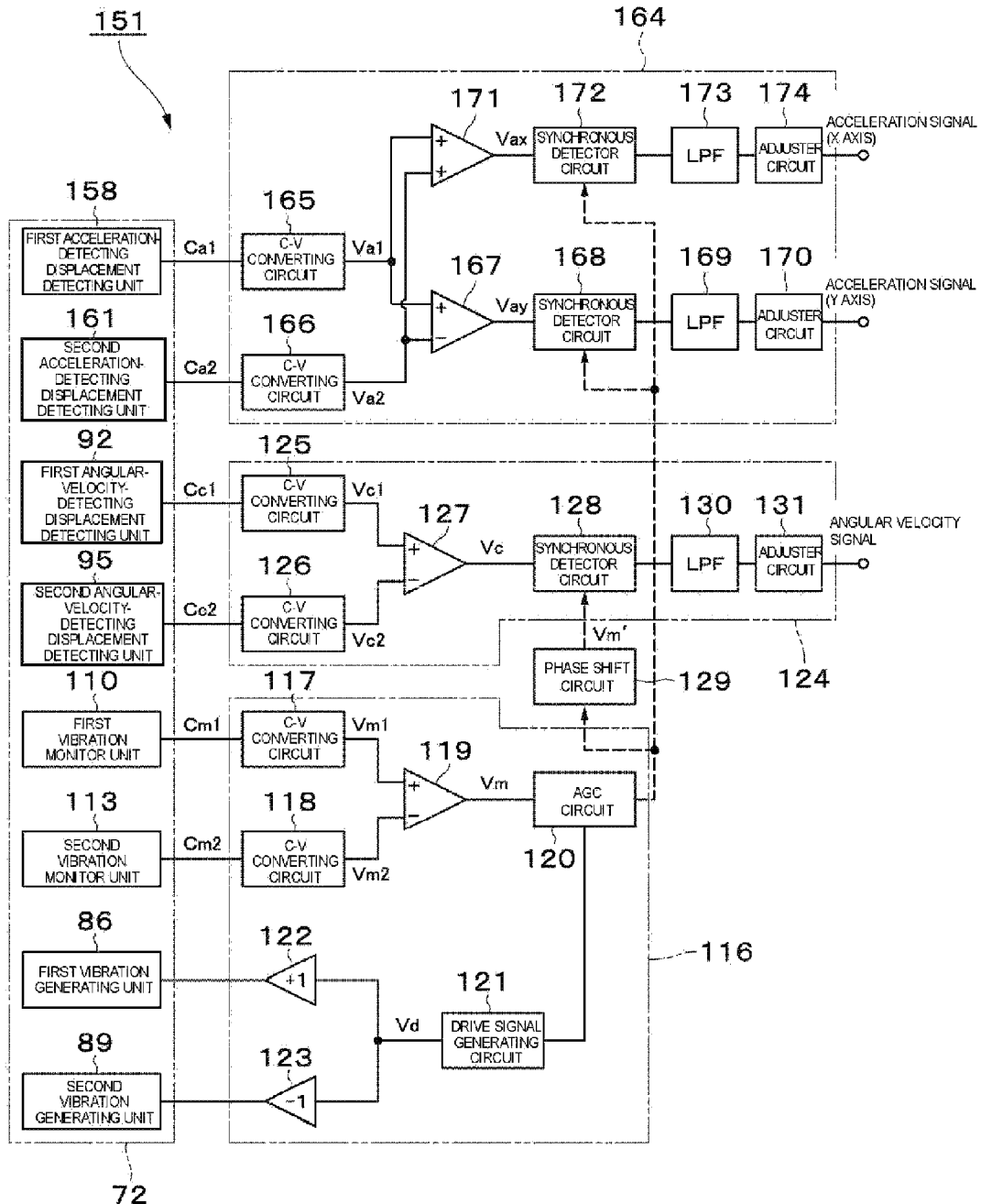
FIG. 17 is a circuit configuration diagram illustrating a vibration control circuit, an angular velocity detecting circuit, and an acceleration detecting circuit of the composite sensor illustrated in FIG. 16.

Next, FIGS. 13 to 15 illustrate a sixth preferred embodiment of the present invention. One of the unique features of this preferred embodiment is that an acceleration-detecting displacement detecting unit cancels changes in capacitance when a first vibrator vibrates. In this preferred embodiment, the same elements as those in the fifth preferred embodiment are denoted by the same reference numerals, and the corresponding description is omitted.

A composite sensor 141 preferably includes the substrate 72, the supporting units 73, 98, and 101, the mass units 74, 78, 82, 83, 99, and 102, the supporting beams 77, 81, 84, 100, and 103, the vibration generating units 86 and 89, displacement detecting units 92, 95, 142, and 145, and the vibration monitor units 110 and 113.

The first acceleration-detecting displacement detecting unit 142 (acceleration-detecting displacement detect unit) is arranged between the first outer mass unit 82 and the first unconnected mass unit 99 and detects the amount of displacement when the unconnected mass unit 99 is displaced in the Y-axis direction. The displacement detecting unit 142 preferably includes a detecting electrode 143 provided on the outer mass unit 82 and a detecting electrode 144 provided on the unconnected mass unit 99, as illustrated in FIG. 14.

The detecting electrode 143 preferably includes a T-shaped arm portion 143A, a plurality of first electrode portions 143B provided on the outer mass unit 82, and a plurality of second electrode portions 143C provided on the arm 143A, for example. In this case, a base end of the arm 143A is connected to the outer mass unit 82, whereas the top end thereof is inserted into the unconnected mass unit 99 having a frame shape.

The respective first electrode portions 143B protrude toward arm portions 144A described below connected to the unconnected mass unit 99 in the direction b2 illustrated in FIG. 13. Furthermore, the respective second electrode portions 143C protrude toward the arm portions 144A connected to the unconnected mass unit 99 in the direction b1 illustrated in FIG. 13, the opposite direction of the first electrode portions 143B. The number of the first electrode portions 143B and the number of the second electrode portions 143C are substantially the same.

On the other hand, the detecting electrode 144 preferably includes the arm portions 144A inserted between the outer mass unit 82 and the arm portion 143A, a plurality of first electrode portions 144B provided on the portion facing the outer mass unit 82 of the arm portions 144A, and a plurality of second electrode portions 144C provided on the portion facing the arm 143A of the detecting electrode 143 of the arm portions 144A. In this case, the respective first electrode portions 144B are arranged at the locations corresponding to the first electrode portions 143B of the detecting electrode 143.

The respective first electrode portions 144B preferably protrude toward the outer mass unit 82 in the direction b1 in the Y-axis direction illustrated in FIG. 13. Furthermore, the respective second electrode portions 144C preferably protrude toward the arm portion 143A of the detecting electrode 143 in the direction b2 in the Y-axis direction illustrated in FIG. 13. The first electrode portions 143B and 144B face each other with a gap therebetween in the Y-axis direction so as to define a parallel plate capacitor. Similarly, the second electrode portions 143C and 144C face each other with a gap therebetween in the Y-axis direction so as to define a parallel plate capacitor.

The first electrode portions 143B and 144B are mutually staggered in the X-axis direction so that about half of the end surfaces thereof partially face each other when the first outer mass unit 82 is in a neutral state. Specifically, the first electrode portions 143B are staggered in the direction a1 in the X-axis direction with respect to the first electrode portions 144B.

On the other hand, the second electrode portions 143C and 144C are mutually staggered in the X-axis direction so that about half of the end surfaces thereof partly face each other when the first outer mass unit 82 is in a neutral state, as the first electrode portions 143B and 144B. Specifically, the second electrode portions 143C are staggered in the direction a2, which is the opposite direction of the first electrode portions 143B, with respect to the second electrode portions 144C. In addition, the distance between the first electrode portions 143B and 144B and the distance between the second electrode portions 143C and 144C are set so that both distances are substantially equal to each other when the unconnected mass unit 99 stops with no act of acceleration α.

The detecting electrode 143 is displaced together with the outer mass unit 82 in the X-axis direction. Accordingly, when the outer mass unit 82 is displaced in the X-axis direction, the area at which the first electrode portions 143B and 144B face each other changes, and the area at which the second electrode portions 143C and 144C face each other changes. The first electrode portions 143B and 144B and the second electrode portions 143C and 144C are mutually staggered in opposite directions in the X-axis direction. Thus, when the area at which the first electrode portions 143B and 144B face each other increases, the area at which the second electrode portions 143C and 144C face each other decreases. On the other hand, when the area at which the first electrode portions 143B and 144B face each other decreases, the area at which the second electrode portions 143C and 144C face each other increases.

As a result, when the unconnected mass unit 99 stops when no acceleration occurs, the capacitance of the first electrode portions 143B and 144B and the capacitance of the second electrode portions 143c and 144C change in opposite phases to each other. That is, the change in the capacitance of the first electrode portions 143B and 144B is substantially canceled by the change in the capacitance of the second electrode portions 143C and 144C. Thus, when the unconnected mass unit 99 stops, the amount of change in the capacitance Ca1 between the detecting electrodes 143 and 144, which is the sum of the capacitance of the first electrode portions 143B and 144B and the capacitance of the second electrode portions 143C and 144C, does not substantially change and is maintained substantially constant as indicated by a solid line in FIG. 15.

On the other hand, when the unconnected mass unit 99 is displaced in the Y-axis direction due to acceleration, the distance between the first electrode portions 143B and 144B and the distance between the second electrode portions 143C and 144C change in the opposite directions to each other. That is, when the distance between the first electrode portions 143B and 144B increases, the distance between the second electrode portions 143C and 144C decreases. On the other hand, when the distance between the first electrode portions 143B and 144B decreases, the distance between the second electrode portions 143C and 144C increases. Since the capacitance of the first electrode portions 143B and 144B and the capacitance of the second electrode portions 143C and 144C change in opposite phases to each other, the capacitance Ca1 between the detecting electrodes 143 and 144 changes in accordance with the difference between the capacitance of the first electrode portions 143B and 144B and the capacitance of the second electrode portions 143c and 144C. As a result, when the unconnected mass unit 99 is displaced in the Y-axis direction (direction b1 or b2) due to acceleration α, the capacitance Ca1 between the detecting electrodes 143 and 144 changes in accordance with the vibration cycle (drive cycle) of the outer mass unit 82, and the amplitude has a value according to the amount of displacement of the unconnected mass unit 99, as indicated by a chain line and a broken line in FIG. 15. Thus, the displacement detecting unit 142 detects the amount of displacement when the unconnected mass unit 99 is displaced in the Y-axis direction by using the capacitance Ca1 between the detecting electrodes 143 and 144.

The second acceleration-detecting displacement detecting unit 145 (acceleration-detecting displacement detector) is disposed between the second outer mass unit 83 and the second unconnected mass unit 102 and detects the amount of displacement when the unconnected mass unit 102 is displaced in the Y-axis direction. Here, the displacement detecting unit 145 includes a detecting electrode 146 provided on the outer mass unit 83 and a detecting electrode 147 provided on the unconnected mass unit 102, substantially similar to the displacement detecting unit 142 (see FIG. 13).

The detecting electrode 146 preferably includes a T-shaped arm portion 146A, a plurality of first electrode portions 146B provided on the outer mass unit 83, and a plurality of second electrode portions 146C provided on the arm portion 146A. In this case, a base end of the arm portion 146A is connected to the outer mass unit 83, whereas the top end thereof is inserted into the unconnected mass unit 102 having a frame shape.

The respective first electrode portions 146B preferably protrude toward an arm portions 147A described below connected to the unconnected mass unit 102 in the direction b1 illustrated in FIG. 13. Furthermore, the respective second electrode portions 146C preferably protrude toward the arm portions 147A connected to the unconnected mass unit 102 in the direction b2 illustrated in FIG. 13, the opposite direction of the first electrode portions 146B. The number of the first electrode portions 146B and the number of the second electrode portions 146C are substantially the same.

On the other hand, the detecting electrode 147 includes the arm portions 147A inserted between the outer mass unit 83 and the arm portion 146A, a plurality of first electrode portions 147B provided on the portion facing the outer mass unit 83 of the arm portions 147A, and a plurality of second electrode portions 147C provided on the portion facing the arm portion 146A of the detecting electrode 146 of the arm portions 147A. In this case, the respective first electrode portions 147B are arranged at the locations corresponding to the first electrode portions 146B of the detecting electrode 146.

The respective first electrode portions 147B preferably protrude toward the outer mass unit 83 in the direction b2 in the Y-axis direction illustrated in FIG. 13. Furthermore, the respective second electrode portions 147C preferably protrude toward the arm portion 146A of the detecting electrode 146 in the direction b1 in the Y-axis direction illustrated in FIG. 13. The first electrode portions 146B and 147B face each other with a gap therebetween in the Y-axis direction so as to define a parallel plate capacitor. Likewise, the second electrode portions 146C and 147C face each other with a gap therebetween in the Y-axis direction so as to define a parallel plate capacitor.

The first electrode portions 146B and 147B are mutually staggered in the X-axis direction so that about half of the end surfaces thereof partially face each other when the second outer mass unit 83 is in a neutral state. Specifically, the first electrode portions 146B are staggered in the direction a2 in the X-axis direction with respect to the first electrode portions 147B.

On the other hand, the second electrode portions 146C and 147C are mutually staggered in the X-axis direction so that about half of the end surfaces thereof partially face each other when the second outer mass unit 83 is in a neutral state, similar to the first electrode portions 146B and 147B. Specifically, the second electrode portions 146C are staggered in the direction a1, which is the opposite direction of the first electrode portions 146B, with respect to the second electrode portions 147C. In addition, the distance between the first electrode portions 146B and 147B and the distance between the second electrode portions 146C and 147C are set so that both distances are substantially equal to each other when the unconnected mass unit 102 stops with no force of acceleration being applied.

In the second displacement detecting unit 145, when the unconnected mass unit 102 stops with no force of acceleration, the capacitance Ca2 between the detecting electrodes 146 and 147 does not substantially change and is maintained substantially constant, similar to the first displacement detecting unit 142. On the other hand, when the unconnected mass unit 102 is displaced in the Y-axis direction due to acceleration, the capacitance Ca2 between the detecting electrodes 146 and 147 changes in accordance with the vibration cycle (drive cycle) of the outer mass unit 83, and the amplitude thereof has a value according to the amount of displacement of the unconnected mass unit 102. Furthermore, the first displacement detecting unit 142 and the second displacement detecting unit 145 output signals of opposite phases to each other when the unconnected mass units 99 and 102 are displaced in the same direction along the Y-axis direction due to acceleration.

In this preferred embodiment of the present invention having the above-described configuration, substantially the same operation, advantages and effects as those in the first and fifth preferred embodiments can be obtained. Particularly, in this preferred embodiment, the first acceleration-detecting displacement detecting unit 142 includes the first electrode portions 143B and 144B and the second electrode portions 143C and 144C. In the first electrode portions 143B and 144B and the second electrode portions 143C and 144C, increases and decreases in capacitance change oppositely to each other when the outer mass unit 83 is displaced, and also increases and decreases in capacitance change oppositely to each other when the unconnected mass unit 99 is displaced. The second displacement detecting unit 145 preferably has substantially the same configuration as that of the first displacement detecting unit 142.

With this configuration, in the first displacement detecting unit 142, for example, the capacitance Ca1 between the detecting electrodes 143 and 144 does not substantially change and is maintained at a substantially constant value when the unconnected mass unit 102 stops when no acceleration occurs. On the other hand, when the unconnected mass unit 99 is displaced in the Y-axis direction due to acceleration, the capacitance Ca1 between the detecting electrodes 143 and 144 changes in accordance with the vibration cycle of the outer mass unit 82, and the amplitude thereof has a value according to the amount of displacement of the unconnected mass unit 99. Also, the second displacement detecting unit 145 can obtain substantially the same output as that of the first displacement detecting unit 142.

When signals of the same cycles as those of the outer mass units 82 and 83 are synchronously detected from outputs of the displacement detecting units 142 and 145, an acceleration signal after synchronous detection includes an offset component based on vibration of the outer mass units 82 and 83. However, in this preferred embodiment, the offset component included in the acceleration signal can be advantageously reduced. Thus, signal processing can be simplified and the ratio of an acceleration component to the offset component can be increased, so that the detection accuracy of acceleration can be improved.

In addition, on both sides of the arm portions 144A and 147A in the Y-axis direction, the first electrode portions 143B, 144B, 146B, and 147B and the second electrode portions 143C, 144C, 146C, and 147C are provided, respectively. Thus, compared to the case in which only one of the first electrode portions 143B, 144B, 146B, and 147B and one of the second electrode portions 143C, 144C, 146C, and 147C is provided, the capacitance Ca1 between the detecting electrodes 143 and 144 and the capacitance Ca2 between the detecting electrodes 146 and 147 change with approximately twice the amplitude, so that the detection sensitivity of acceleration can be improved. Furthermore, the number of the first electrode portions 143B, 144B, 146B, and 147B and the second electrode portions 143C, 144C, 146C, and 147C per unit area may be increased to twice or more, and thus a device can be miniaturized when the sensitivity is the same.

Furthermore, in order to detect the capacitance Ca1 between the detecting electrodes 143 and 144 and the capacitance Ca2 between the detecting electrodes 146 and 147, a detecting voltage must be applied between the detecting electrodes 143 and 144 and between the detecting electrodes 146 and 147. Due to this voltage, an electrostatic force acts between the detecting electrodes 143 and 144 and between the detecting electrodes 146 and 147. Therefore, the electrostatic force may cause displacement of the unconnected mass units 99 and 102 and the detection accuracy of acceleration may be decreased.

In this preferred embodiment, on both sides of the arm portions 144A and 147A in the Y-axis direction, the first electrode portions 143B, 144B, 146B, and 147B and the second electrode portions 143C, 144C, 146C, and 147C are provided, respectively. With this configuration, even if a voltage is applied to detect the capacitances Ca1 and Ca2, the electrostatic force due to the voltage can be canceled out. As a result, degradation of a detection characteristic of acceleration due to the electrostatic force is minimized.

Next, FIGS. 16 to 19 illustrate a seventh preferred embodiment of the present invention. One of the unique features of this preferred embodiment is that second and third vibrators are arranged such that they can be displaced in directions different from each other and in inclined directions with respect to the X axis and the Y axis and that acceleration in the X-axis direction and the Y-axis direction can be detected using the second and third vibrators. In this preferred embodiment of the present invention, the same elements as those in the fifth preferred embodiment are denoted by the same reference numerals, and the corresponding description is omitted.

A composite sensor 151 preferably includes the substrate 72, supporting units 73, 152, and 155, mass units 74, 78, 82, 83, 153, and 156, supporting beams 77, 81, 84, 154, and 157, the vibration generating units 86 and 89, displacement detecting units 92, 95, 158, and 161, and the vibration monitor units 110 and 113.

The two first outer supporting units 152 define second supporting units and are arranged on the surface of the substrate 72 on the outer side in the Y-axis direction of the first outer mass unit 82, with the center of gravity G of the entire mass unit being the approximate center. These two outer supporting units 152 are preferably arranged on both sides of the unconnected mass unit 153 described below in the direction orthogonal to a direction c1, which is inclined by about 45 degrees with respect to the X axis and the Y axis.

The first unconnected mass unit 153 defines a second vibrator, provided on the surface side of the substrate 72 near the outer mass unit 82, and faces the substrate 72 with a gap therebetween. The first unconnected mass unit 153 is preferably defined by a C-shaped frame.

The first outer supporting beams 154 define second supporting beams, connect the unconnected mass unit 153 to the outer supporting units 152, and support the unconnected mass unit 153 such that the unconnected mass unit 153 can vibrate in the direction c1, which is inclined by about 45 degrees with respect to the X axis and the Y axis. Specifically, the outer supporting beams 154 extend in a direction c2 substantially perpendicular to the direction c1 and have a spring property that is preferably flexibly deformable in the direction c1. Accordingly, the outer supporting beams 154 support the unconnected mass unit 153 such that it can vibrate in the direction c1 and restricts displacement of the unconnected mass unit 153 in the direction c2.

On the opposite side in the Y-axis direction of the first outer supporting units 152, the first unconnected mass unit 153, and the first outer supporting beams 154, the second outer supporting units 155, the second unconnected mass unit 156, and the second outer supporting beams 157 are preferably provided, with the mass units 74, 78, 82, and 83 being arranged between the both sides. In this case, the second outer supporting units 155, the second unconnected mass unit 156, and the second outer supporting beams 157 have substantially the same configuration as that of the first outer supporting units 152, the first unconnected mass unit 153, and the first outer supporting beams 154, and define third supporting units, a third vibrator, and third supporting beams, respectively.

The outer supporting beams 157 extend in the direction substantially perpendicular to the direction c2 (direction c1) and preferably have a spring property that is flexibly deformable in the direction c2. Accordingly, the outer supporting beams 157 support the unconnected mass unit 156 such that it can vibrate in the direction c2 substantially to the vibration direction of the unconnected mass unit 153, and restrict displacement of the unconnected mass unit 156 in the direction c1.

The unconnected mass units 153 and 156 are arranged on opposite sides to each other in the Y-axis direction with respect to the outer mass units 82 and 83. Thus, when acceleration α1 acts in the Y-axis direction, the unconnected mass units 153 and 156 are displaced in opposite directions to each other with respect to the outer mass units 82 and 83. That is, when the unconnected mass unit 153 approaches the outer mass unit 82, the unconnected mass unit 156 retreats from the outer mass unit 83. On the other hand, when the unconnected mass unit 153 retreats from the outer mass unit 82, the unconnected mass unit 156 approaches the outer mass unit 83 (see FIG. 18).

On the other hand, when acceleration α2 acts in the X-axis direction, the unconnected mass units 153 and 156 are displaced in the same direction with respect to the outer mass units 82 and 83. That is, when the unconnected mass unit 153 approaches the outer mass unit 82, the unconnected mass unit 156 approaches the outer mass unit 83. On the other hand, when the unconnected mass unit 153 gets away from the outer mass unit 82, the unconnected mass unit 156 gets away from the outer mass unit 83 (see FIG. 19).

The first acceleration-detecting displacement detecting unit 158 (acceleration-detecting displacement detector) is arranged between the first outer mass unit 82 and the first unconnected mass unit 153 and detects the amount of displacement when the unconnected mass unit 153 is displaced in the Y-axis direction. Here, the displacement detecting unit 158 has substantially the same configuration as that of the displacement detecting unit 142 according to the sixth preferred embodiment and preferably includes a detecting electrode 159 provided on the outer mass unit 82 and a detecting electrode 160 provided on the unconnected mass unit 153. Thus, the detecting electrode 159 includes an arm portion 159A, first electrode portions 159B, and second electrode portions 159C. The detecting electrode 160 includes arm portions 160A, first electrode portions 160B, and second electrode portions 160C. The first electrode portions 159B and 160B face each other to define a parallel plate capacitor. In addition, the second electrode portions 159C and 160C face each other to define a parallel plate capacitor.

The second acceleration-detecting displacement detecting unit 161 (another acceleration-detecting displacement detecting unit) is provided between the second outer mass unit 83 and the second unconnected mass unit 156 and detects the amount of displacement when the unconnected mass unit 156 is displaced in the Y-axis direction. The displacement detecting unit 161 has substantially the same configuration as that of the displacement detecting unit 145 according to the sixth preferred embodiment and includes a detecting electrode 162 provided on the outer mass unit 83 and a detecting electrode 163 provided on the unconnected mass unit 156. Thus, the detecting electrode 162 includes an arm portion 162A, first electrode portions 162B, and second electrode portions 162C. The detecting electrode 163 includes arm portions 163A, first electrode portions 163B, and second electrode portions 163C. The first electrode portions 162B and 163B face each other to define a parallel plate capacitor. Also, the second electrode portions 162C and 163C face each other to define a parallel plate capacitor.

Next, an acceleration detecting circuit 164 (acceleration detector) to detect accelerations α1 and α2 is described. The acceleration detecting circuit 164 performs synchronous detection on displacement detection signals Vay and Vax from the displacement detecting units 158 and 161 using a monitor signal Vm from the vibration monitor units 110 and 113 and detects accelerations α1 and α2 that act on the mass units 153 and 156. The acceleration detecting circuit 164 preferably includes C-V converting circuits 165 and 166, a differential amplifier 167, a summing amplifier 171, and synchronous detector circuits 168 and 172.

The C-V converting circuits 165 and 166 are connected to the output sides of the displacement detecting units 158 and 161, respectively. The C-V converting circuits 165 and 166 convert changes in capacitances Ca1 and Ca2 of the displacement detecting units 158 and 161 to changes in voltages, and output the changes in voltages as preliminary displacement detection signals Va1 and Va2, respectively. On the output sides of the C-V converting circuits 165 and 166, the differential amplifier 167 and the summing amplifier 171 are connected in parallel.

Figure 18:
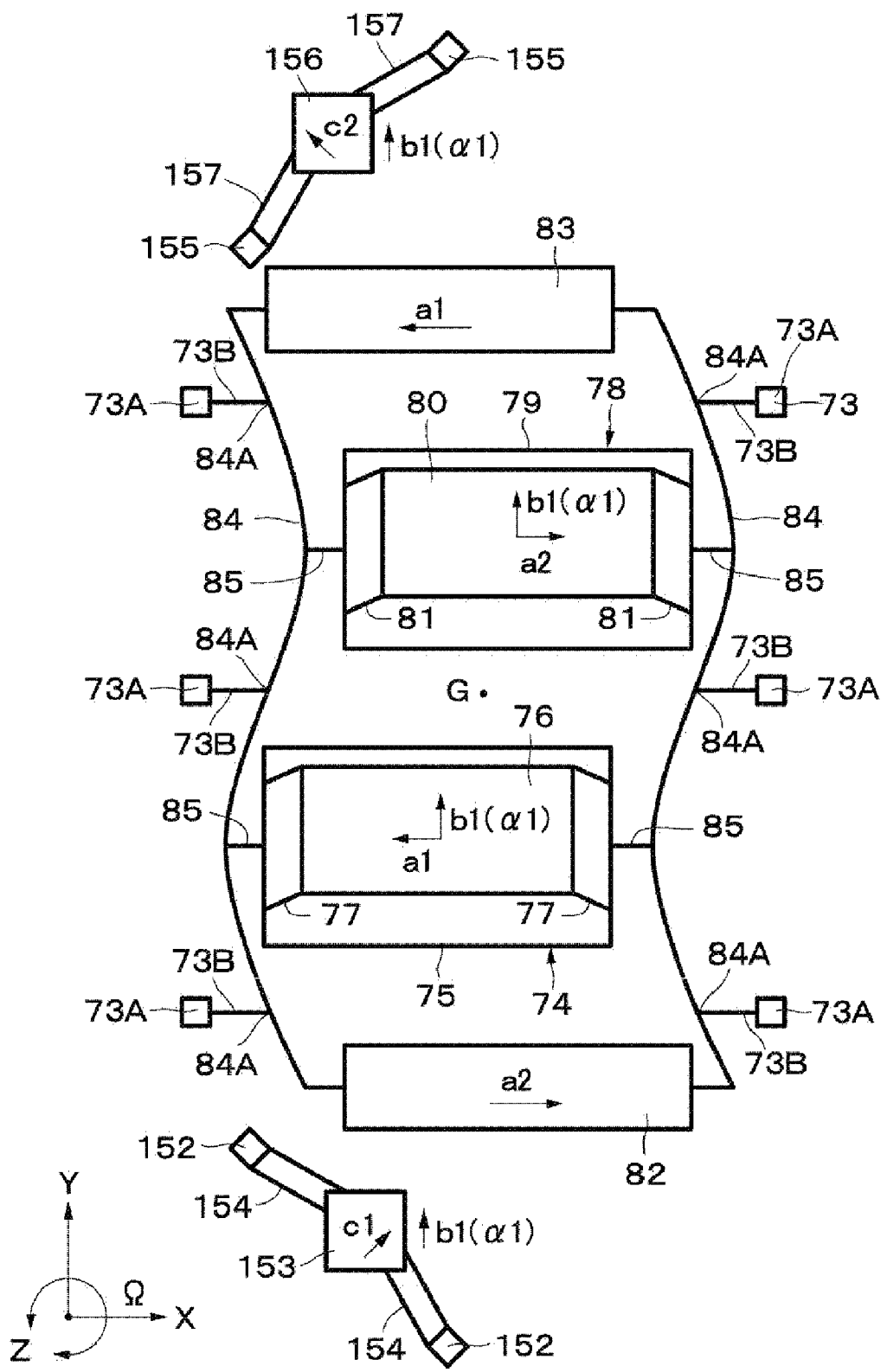
FIG. 18 is a schematic illustration illustrating a state in which acceleration in the Y-axis direction acts on the composite sensor illustrated in FIG. 16.

Here, when acceleration α1 acts in the Y-axis direction, the unconnected mass units 153 and 156 are displaced in opposite directions to each other with respect to the outer mass units 82 and 83 (see FIG. 18). At this time, the two preliminary displacement detection signals Va1 and Va2 have phases opposite to each other. Thus, the two preliminary displacement detection signals Va1 and Va2 are differentially amplified by the differential amplifier 167, so that a final displacement detection signal Vay is output to the synchronous detector circuit 168.

The input side of the synchronous detector circuit 168 is connected to the differential amplifier 167 and is also connected to the AGC circuit 120. The output side of the synchronous detector circuit 168 is connects to a low pass filter (LPF) 169 to extract an acceleration signal, and the output side of the LPF 169 is connected to an adjuster circuit 170 to adjust gain and offset. At this time, when the unconnected mass units 153 and 156 are displaced due to acceleration α1, the capacitances Ca1 and Ca2 of the displacement detecting units 158 and 161 change in accordance with the amount of displacement of the unconnected mass units 153 and 156, in synchronization with vibration in the X-axis direction of the mass units 74, 78, 82, and 83. Thus, the synchronous detector circuit 168 performs synchronous detection on the displacement detection signal Vay using the monitor signal Vm and outputs an acceleration signal according to the acceleration α1 in the Y-axis direction via the LPF 169 and the adjuster circuit 170.

Figure 19:
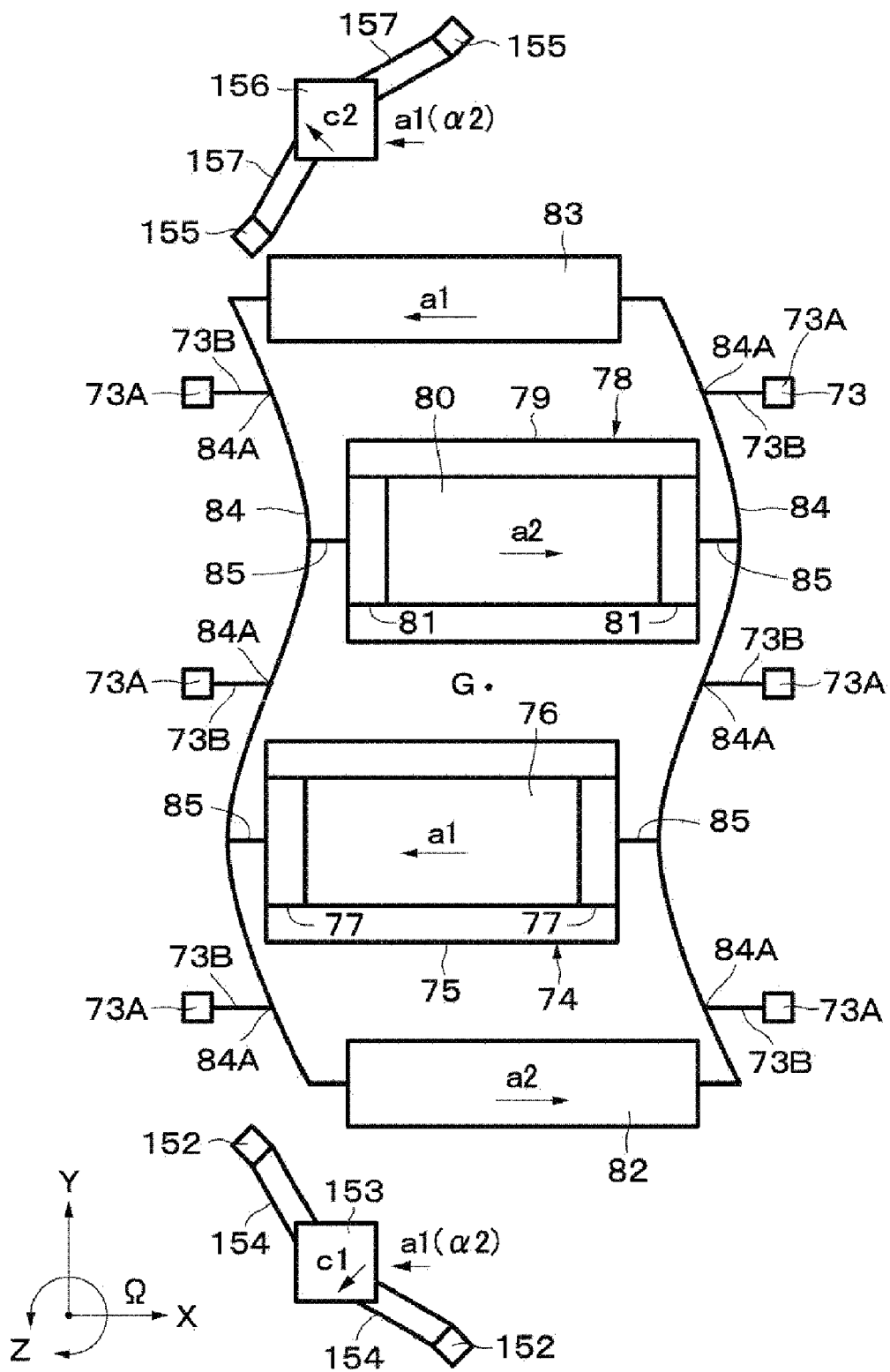
FIG. 19 is a schematic illustration illustrating a state in which acceleration in the X-axis direction acts on the composite sensor illustrated in FIG. 16.

On the other hand, when acceleration α2 acts in the X-axis direction, the unconnected mass units 153 and 156 are displaced in the same direction with respect to the outer mass units 82 and 83 (see FIG. 19). At this time, the two preliminary displacement detection signals Va1 and Va2 have the same phase. Thus, the two preliminary displacement detection signals Va1 and Va2 are added and amplified by the summing amplifier 171, so that a final displacement detection signal Vax is output to the synchronous detector circuit 172.

The input side of the synchronous detector circuit 172 is connected to the summing amplifier 171 and is also connected to the AGC circuit 120. The output side of the synchronous detector circuit 172 is connected to a low pass filter (LPF) 173 to extract an acceleration signal, and the output side of the LPF 173 is connected to an adjuster circuit 174 to adjust gain and offset. At this time, when the unconnected mass units 153 and 156 are displaced due to acceleration α2, the capacitances Ca1 and Ca2 of the displacement detecting units 158 and 161 change in accordance with the amount of displacement of the unconnected mass units 153 and 156, in synchronization with vibration in the X-axis direction of the mass units 74, 78, 82, and 83. Thus, the synchronous detector circuit 172 performs synchronous detection on the displacement detection signal Vax using the monitor signal Vm and outputs an acceleration signal according to the acceleration α2 in the X-axis direction via the LPF 173 and the adjuster circuit 174.

Accordingly, in this preferred embodiment of the present invention having the above-described configuration, substantially the same operation, advantages and effects as those in the first and fifth preferred embodiments are obtained. Particularly, in this preferred embodiment, the unconnected mass units 153 and 156 are arranged such that they can be displaced in directions different from each other and in the directions c1 and c2 inclined with respect to the X axis and the Y axis. The displacement detecting units 158 and 161 detect the amount of displacement in the Y-axis direction of the unconnected mass units 153 and 156. With this configuration, the acceleration α1 in the Y-axis direction (first acceleration) can be detected using the difference between the displacement detection signals Va1 and Va2 from the displacement detecting units 158 and 161. In addition, the acceleration α2 in the X-axis direction (second acceleration) can be detected using the sum of the displacement detection signals Va1 and Va2 from the displacement detecting units 158 and 161. As a result, the accelerations α1 and α2 in the two axial directions substantially perpendicular to each other can be detected at the same time.

Also, since the unconnected mass units 153 and 156 are arranged such that they can be displaced in the directions c1 and c2 inclined with respect to the X axis and the Y axis, the unconnected mass units 153 and 156 can be displaced when either the acceleration α1 in the Y-axis direction or the acceleration α2 in the X-axis direction acts thereon. Thus, even if an acceleration-detecting vibrator that is displaced in the X-axis direction cannot be disposed near the mass units 74, 78, 82, and 83 that vibrate in the X-axis direction, the acceleration α2 in the X-axis direction can be detected.

Figure 20:
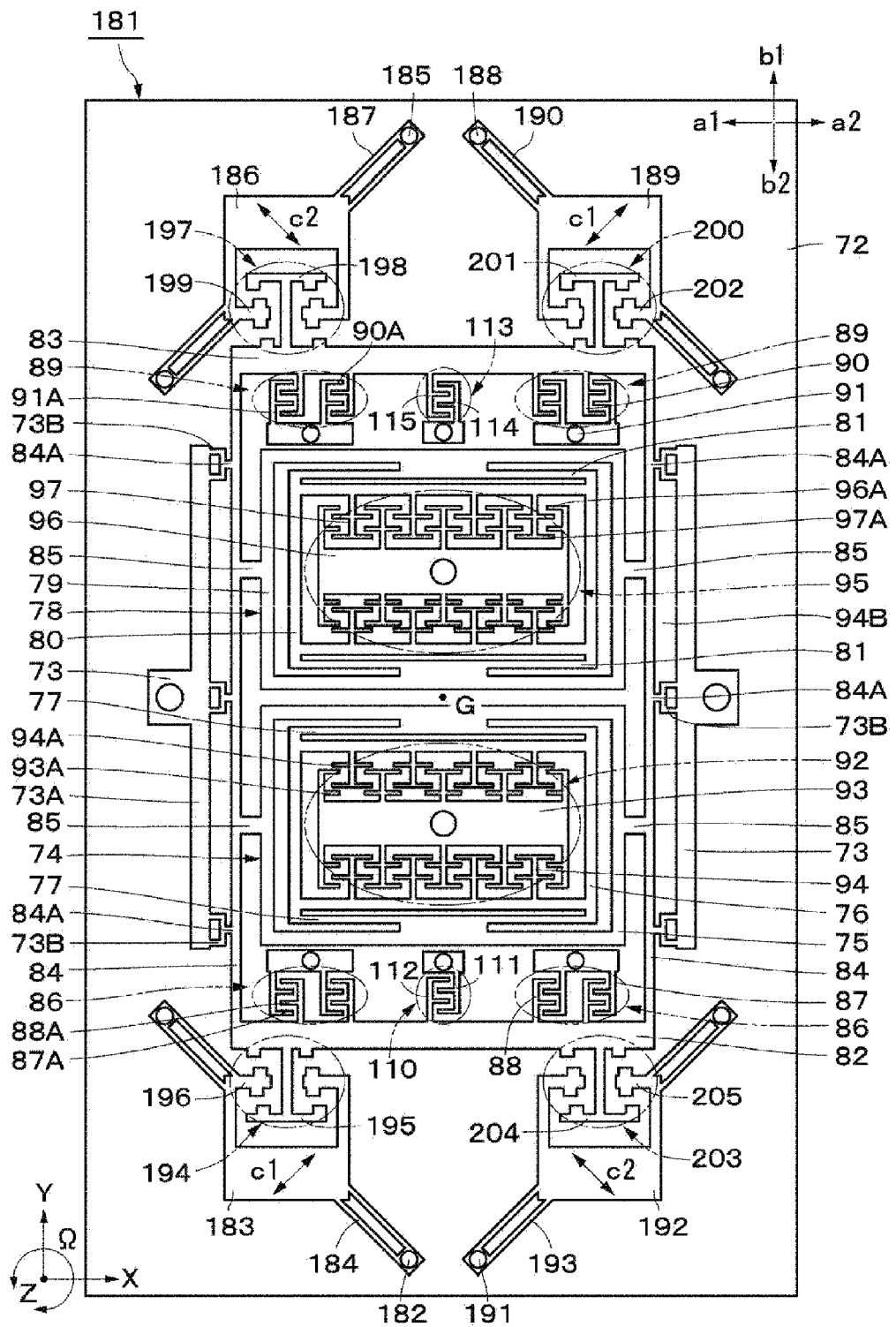
FIG. 20 is a plan view illustrating a composite sensor according to an eighth preferred embodiment of the present invention.
Figure 21:
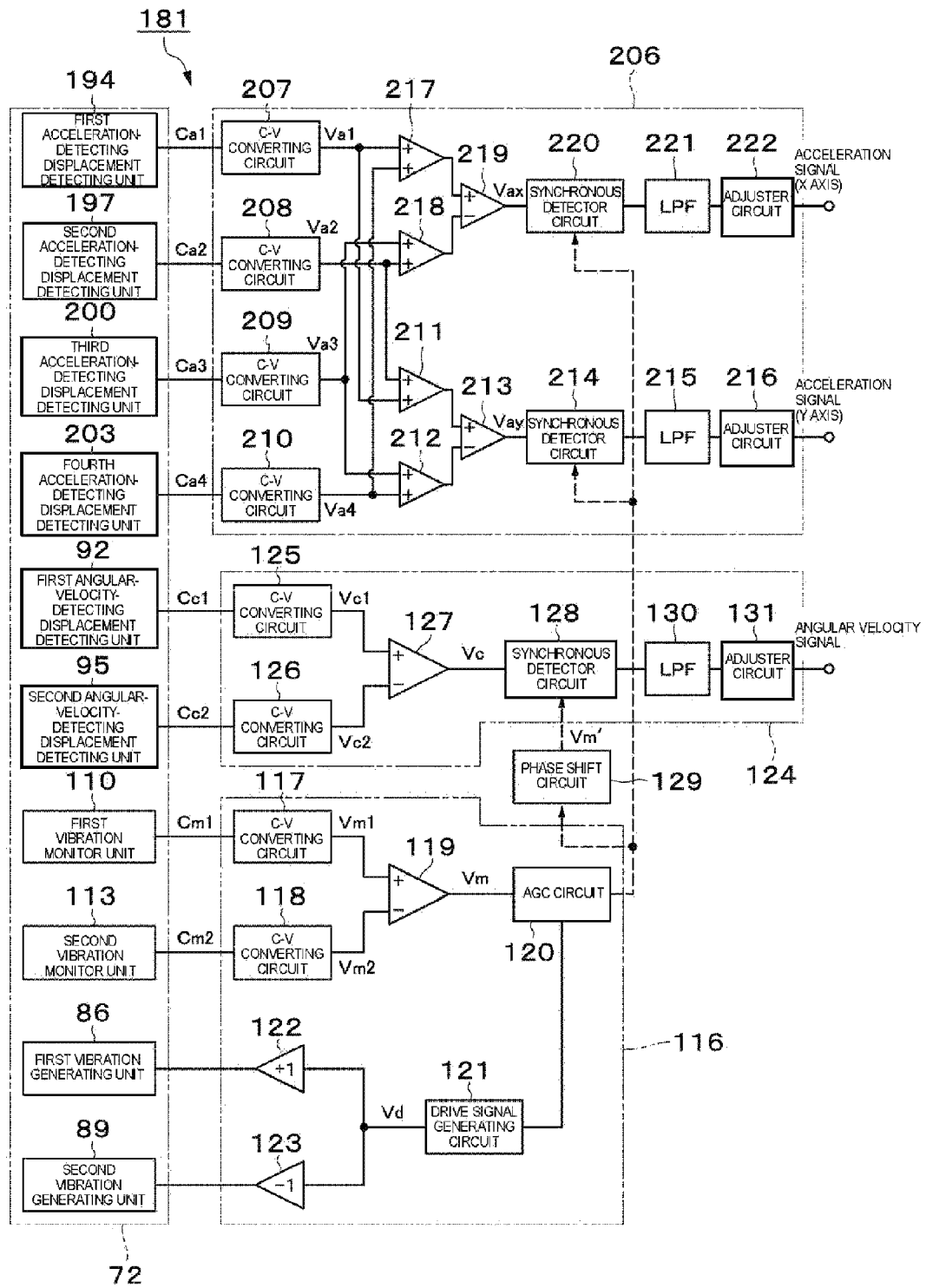
FIG. 21 is a circuit configuration diagram illustrating a vibration control circuit, an angular velocity detecting circuit, and an acceleration detecting circuit of the composite sensor illustrated in FIG. 20.

Next, FIGS. 20 and 21 illustrate an eighth preferred embodiment of the present invention. One of the unique features of this preferred embodiment is that two second vibrators and two third vibrators are provided and that accelerations in the X-axis direction and the Y-axis direction are detected using the four second and third vibrators. In this preferred embodiment, the same elements as those in the fifth preferred embodiment are denoted by the same reference numerals, and the corresponding description is omitted.

A composite sensor 181 preferably includes the substrate 72, supporting units 73, 182, 185, 188, and 191, mass units 74, 78, 82, 83, 183, 186, 189, and 192, supporting beams 77, 81, 84, 184, 187, 190, and 193, the vibration generating units 86 and 89, displacement detecting units 92, 95, 194, 197, 200, and 203, and the vibration monitor units 110 and 113.

The first outer supporting units 182 define second supporting units and have substantially the same configuration as that of the first outer supporting units 152 according to the seventh preferred embodiment. The two first outer supporting units 182 are provided on the surface of the substrate 72 and are arranged on both sides of the unconnected mass unit 183 described below in the direction perpendicular to the direction c1, which is inclined by about 45 degrees with respect to the X axis and the Y axis.

The first unconnected mass unit 183 defines a second vibrator and has substantially the same configuration as that of the first unconnected mass unit 153 according to the seventh preferred embodiment. The first unconnected mass unit 183 is disposed near the outer mass unit 82.

The first outer supporting beams 184 define second supporting beams and have substantially the same configuration as that of the first outer supporting beams 154 according to the seventh preferred embodiment. Thus, the first outer supporting beams 184 support the unconnected mass unit 183 such that it can vibrate in the direction c1 and restrict displacement of the unconnected mass unit 183 in the direction c2.

The second outer supporting units 185 define third supporting units and have substantially the same configuration as that of the second outer supporting units 155 according to the seventh preferred embodiment. The two second outer supporting units 185 are provided on the surface of the substrate 72 and are arranged on both sides of the unconnected mass unit 186 described below in the direction substantially perpendicular to the direction c2, which is inclined by about 45 degrees with respect to the X axis and the Y axis.

The second unconnected mass unit 186 defines a third vibrator and has substantially the same configuration as that of the second unconnected mass unit 155 according to the seventh preferred embodiment. The second unconnected mass unit 186 is disposed near the outer mass unit 83.

The second outer supporting beams 187 define third supporting beams and have substantially the same configuration as that of the second outer supporting beams 157 according to the seventh preferred embodiment. Thus, the second outer supporting beams 187 support the unconnected mass unit 186 such that it can vibrate in the direction c2 and restrict displacement of the unconnected mass unit 186 in the direction c1.

The third outer supporting units 188, the third unconnected mass unit 189, and the third outer supporting beams 190 are provided at a location substantially symmetrical to the location of the first outer supporting units 182, the first unconnected mass unit 183, and the first outer supporting beams 184 with respect to the center of gravity G of the entire mass unit. The third outer supporting units 188, the third unconnected mass unit 189, and the third outer supporting beams 190 define second supporting units, a second vibrator, and second supporting beams, respectively. Thus, the third unconnected mass unit 189 is disposed near the outer mass unit 83 and is arranged such that it can vibrate in the direction c1.

The fourth outer supporting units 191, the fourth unconnected mass unit 192, and the fourth outer supporting beams 193 are arranged at a location substantially symmetrical to the location of the second outer supporting units 185, the second unconnected mass unit 186, and the second outer supporting beams 187 with respect to the center of gravity G of the entire mass unit. The fourth outer supporting units 191, the fourth unconnected mass unit 192, and the fourth outer supporting beams 193 define third supporting units, a third vibrator, and third supporting beams, respectively. Thus, the fourth unconnected mass unit 192 is disposed near the outer mass unit 82 and is arranged such that it can vibrate in the direction c2.

The first displacement detecting unit 194 (acceleration-detecting displacement detector) is arranged between the mass units 82 and 183 and has substantially the same configuration as that of the first displacement detecting unit 158 according to the seventh preferred embodiment. Thus, the first displacement detecting unit 194 preferably includes detecting electrodes 195 and 196 and detects the amount of displacement when the unconnected mass unit 183 is displaced in the Y-axis direction.

The second displacement detecting unit 197 (another acceleration-detecting displacement detector) is arranged between the mass units 83 and 186 and has substantially the same configuration as that of the second displacement detecting unit 161 according to the seventh preferred embodiment. Thus, the second displacement detecting unit 197 includes detecting electrodes 198 and 199 and detects the amount of displacement when the unconnected mass unit 186 is displaced in the Y-axis direction.

The third displacement detecting unit 200 (acceleration-detecting displacement detector) is arranged between the mass units 83 and 189 and has substantially the same configuration as that of the first displacement detecting unit 158 according to the seventh preferred embodiment. Thus, the third displacement detecting unit 200 includes detecting electrodes 201 and 202 and detects the amount of displacement when the unconnected mass unit 189 is displaced in the Y-axis direction.

The fourth displacement detecting unit 203 (another acceleration-detecting displacement detector) is arranged between the mass units 82 and 192 and has substantially the same configuration as that of the second displacement detecting unit 161 according to the seventh preferred embodiment. Thus, the fourth displacement detecting unit 203 preferably includes detecting electrodes 204 and 205 and detects the amount of displacement when the unconnected mass unit 192 is displaced in the Y-axis direction.

Next, an acceleration detecting circuit 206 (acceleration detector) to detect accelerations $\alpha 1$ and $\alpha 2$ is described. The acceleration detecting circuit 206 performs synchronous detection on displacement detection signals Vay and Vax from the displacement detecting units 194, 197, 200, and 203 using a monitor signal Vm from the vibration monitor units 110 and 113 and detects accelerations $\alpha 1$ and $\alpha 2$ that act on the mass units 183, 186, 189, and 192. The acceleration detecting circuit 206 preferably includes C-V converting circuits 207, 208, 209, and 210, summing amplifiers 211, 212, 217, and 218, differential amplifiers 213 and 219, and synchronous detector circuits 214 and 220, for example.

The C-V converting circuits 207, 208, 209, and 210 convert changes in capacitances Ca1, Ca2, Ca3, and Ca4 of the displacement detecting units 194, 197, 200, and 203 to changes in voltages, and output the changes in voltages as preliminary displacement detection signals Va1, Va2, Va3, and Va4, respectively.

The summing amplifier 211 is connected to the output sides of the C-V converting circuits 207 and 208 and adds the preliminary displacement detection signals Va1 and Va2. The summing amplifier 212 is connected to the output sides of the C-V converting circuits 209 and 210 and adds the preliminary displacement detection signals Va3 and Va4. Furthermore, the differential amplifier 213 calculates a final displacement detection signal Vay based on the difference between outputs of the summing amplifiers 211 and 212 and outputs the displacement detection signal Vay to the synchronous detector circuit 214. Accordingly, the synchronous detector circuit 214 performs synchronous detection on the displacement detection signal Vay by using the monitor signal Vm and outputs an acceleration signal according to the acceleration $\alpha 1$ in the Y-axis direction via an LPF 215 and an adjuster circuit 216.

On the other hand, the summing amplifier 217 is connected to the output sides of the C-V converting circuits 207 and 210 and adds the preliminary displacement detection signals Va1 and Va4. The summing amplifier 218 is connected to the output sides of the C-V converting circuits 208 and 209 and adds the preliminary displacement detection signals Va2 and Va3. Furthermore, the differential amplifier 219 calculates a final displacement detection signal Vax based on the difference between outputs of the summing amplifiers 217 and 218 and outputs the displacement detection signal Vax to the synchronous detector circuit 220. Accordingly, the synchronous detector circuit 220 performs synchronous detection on the displacement detection signal Vax by using the monitor signal Vm and outputs an acceleration signal according to the acceleration α2 in the X-axis direction via an LPF 221 and an adjuster circuit 222.

Accordingly, in this preferred embodiment of the present invention having the above-described configuration, substantially the same operation, advantages and effects as those in the first and fifth preferred embodiments are obtained. Particularly, in this preferred embodiment, the unconnected mass units 183 and 189 are arranged such that they can be displaced in the direction c1, the unconnected mass units 186 and 192 are arranged such that they can be displaced in the direction c2, and the amount of displacement in the Y-axis direction of the unconnected mass units 183, 186, 189, and 192 is detected using the displacement detecting units 194, 197, 200, and 203. Thus, by performing calculation of addition and subtraction on the displacement detection signals Va1, Va2, Va3, and Va4 from the displacement detecting units 194, 197, 200, and 203, accelerations α1 and α2 in the Y-axis direction and the X-axis direction can be detected. Furthermore, since calculation of addition and subtraction is performed on the displacement detection signals Va1, Va2, Va3, and Va4 from the displacement detecting units 194, 197, 200, and 203, an effect of a change in temperature is reduced even if the displacement detection signals Va1, Va2, Va3, and Va4 change due to an external temperature, and the detection accuracy of the accelerations α1 and α2 can be improved.

Figure 22:
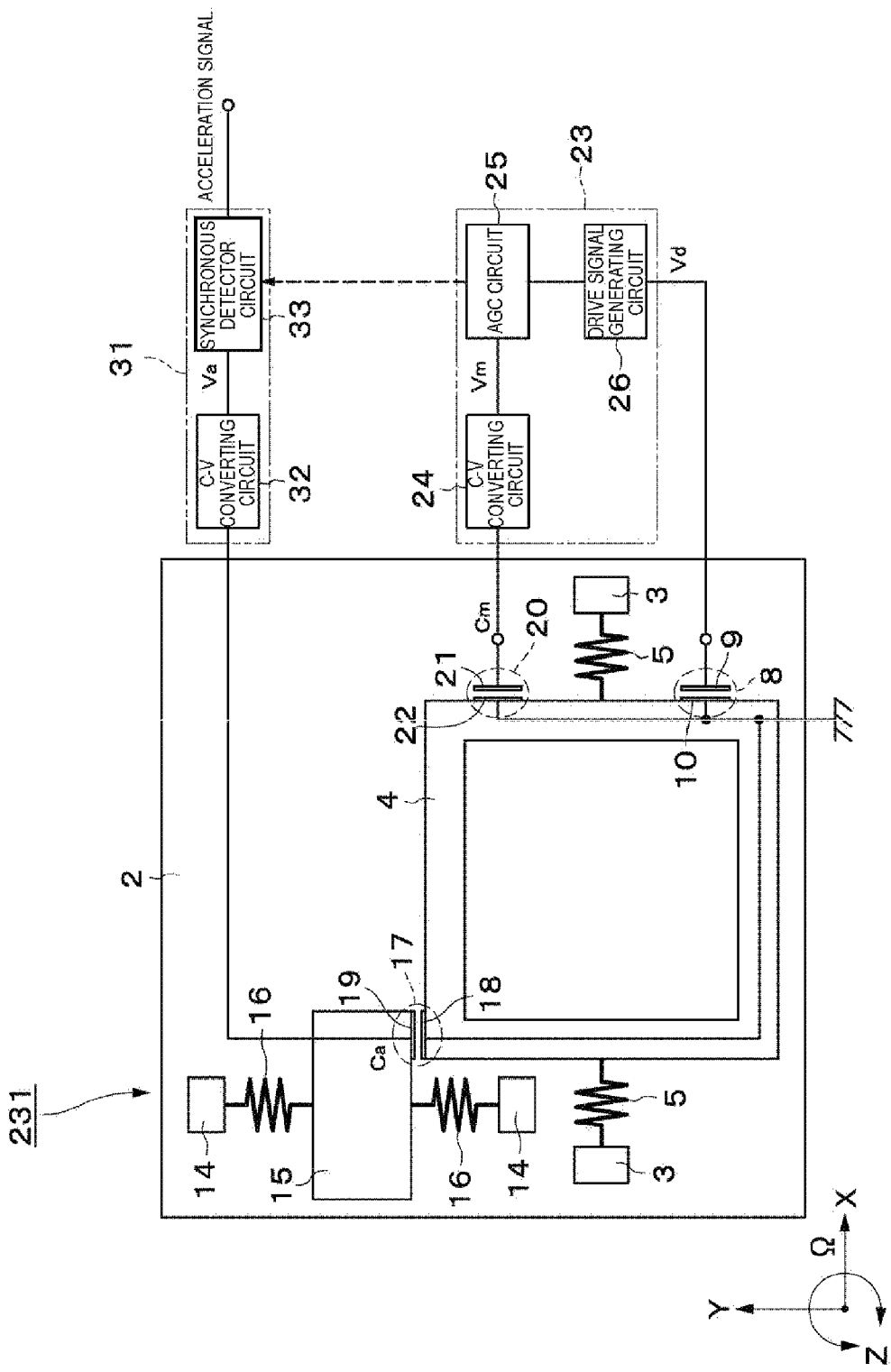
FIG. 22 is a plan view illustrating an acceleration sensor according to a ninth preferred embodiment of the present invention.

Next, FIG. 22 illustrates a ninth preferred embodiment of the present invention. One of the unique features of this preferred embodiment is that a configuration for detecting angular velocity is omitted. In this preferred embodiment, the same elements as those in the first preferred embodiment are denoted by the same reference numerals, and the corresponding description is omitted.

An acceleration sensor 231 preferably includes the substrate 2, the supporting units 3 and 14, the vibrators 4 and 15, the supporting beams 5 and 16, the vibration generating unit 8, the displacement detecting unit 17, and the vibration monitor unit 20. That is, in this preferred embodiment of the present invention, the configuration for detecting angular velocity according to the first preferred embodiment (the vibrator 6, the supporting beams 7, the displacement detecting unit 11, and so on) is omitted.

Accordingly, in this preferred embodiment, acceleration α can be detected with high accuracy as in the first preferred embodiment, although angular velocity cannot be detected.

In the above-described fifth and sixth preferred embodiments, the unconnected mass units 99 and 102 are arranged such that they can be displaced in the Y-axis direction. However, preferred embodiments of the present invention are not limited to this configuration. As in the second preferred embodiment, the unconnected mass units may be arranged such that they can be displaced in the X-axis direction. Alternatively, as in the third preferred embodiment, one of the two unconnected mass units may be arranged such that it can be displaced in the Y-axis direction and the other unconnected mass unit may be arranged such that it can be displaced in the X-axis direction.

In the seventh and eighth preferred embodiments, the displacement detecting units 158, 161, 194, 197, 200, and 203 have substantially the same configuration as that of the displacement detecting units 142 and 145 according to the sixth preferred embodiment, but those displacement detecting units may have substantially the same configuration as that of the displacement detecting units 104 and 107 according to the fifth preferred embodiment.

In the fifth to eighth preferred embodiments, the four mass units 74, 78, 82, and 83 are connected by the connecting supporting beams 84. However, preferred embodiments of the present invention are not limited to this configuration. For example, three or less or five or more mass units may be connected.

Furthermore, in the fifth to eighth preferred embodiments, angular velocity Ω about the Z axis is preferably detected. However, preferred embodiments of the present invention are not limited to this configuration. As in the fourth preferred embodiment, the angular-velocity-detecting vibrator may be arranged such that it can be displaced in the Z-axis direction by the angular-velocity-detecting supporting beams, and angular velocity Ω about the Y axis may be detected.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A composite sensor comprising:
    a substrate;
    first supporting units provided on the substrate;
    a first vibrator facing the substrate with a gap therebetween;
    first supporting beams arranged to connect the first vibrator to the first supporting units and to support the first vibrator such that the first vibrator can vibrate in an X-axis direction among three axial directions including X, Y, and Z axes substantially perpendicular to each other;
    an angular-velocity-detecting vibrator provided to the first vibrator;
    angular-velocity-detecting supporting beams arranged to connect the angular-velocity-detecting vibrator to the first vibrator and to support the angular-velocity-detecting vibrator such that the angular-velocity-detecting vibrator can be displaced in one of the Y-axis direction and the Z-axis direction;
    a vibration generator enabling the first vibrator to vibrate in the X-axis direction;
    an angular-velocity-detecting displacement detector arranged to detect an amount of displacement when the angular-velocity-detecting vibrator is displaced in the one of the Y-axis direction and the Z-axis direction in a state in which the first vibrator is vibrating in the X-axis direction;
    second supporting units provided on the substrate;
    a second vibrator facing the substrate with a gap therebetween;
    second supporting beams connecting the second vibrator to the second supporting units and supporting the second vibrator such that the second vibrator can be displaced in one of the X-axis direction and the Y-axis direction;
    an acceleration-detecting displacement detector provided between the first and second vibrators and being arranged to detect an amount of displacement when the second vibrator is displaced in the one of the X-axis direction and the Y-axis direction;
    a vibration monitor arranged to monitor displacement of the first vibrator when the first vibrator vibrates in the X-axis direction; and
    an acceleration detector arranged to detect acceleration that acts on the second vibrator by performing synchronous detection on a displacement detection signal from the acceleration-detecting displacement detector using a monitor signal from the vibration monitor.

2. The composite sensor according to claim 1, further comprising:
third supporting units provided on the substrate;
a third vibrator facing the substrate with a gap therebetween;
third supporting beams provided between the third vibrator and the third supporting units, the third supporting beams supporting the third vibrator such that the third vibrator can be displaced in a direction different from a direction in which the second vibrator can be displaced among the X-axis direction and the Y-axis direction;
another acceleration-detecting displacement detector arranged to detect an amount of displacement when the third vibrator is displaced in the Y-axis direction or the X-axis direction is provided between the first and third vibrators; and
another acceleration detector arranged to detect acceleration that acts on the third vibrator by performing synchronous detection on a displacement detection signal from the other acceleration-detecting displacement detector using a monitor signal from the vibration monitor.

3. The composite sensor according to claim 1, further comprising:
a plurality of said first vibrators arranged in the Y-axis direction; wherein
the first supporting beams connect the plurality of first vibrators to each other; and
the vibration generator enables the first vibrators adjacent to each other to vibrate in opposite phases to each other.

4. The composite sensor according to claim 1, further comprising:
two of said second vibrators provided so as to be displaced in directions opposite to each other with respect to the first vibrator when acceleration acts; and
two of said acceleration-detecting displacement detectors corresponding to the two second vibrators; wherein
the acceleration detector detects acceleration using a difference between displacement detection signals from the two acceleration-detecting displacement detectors.

5. The composite sensor according to claim 1, wherein
the acceleration-detecting displacement detector includes a pair of electrode portions that are provided between the first and second vibrators and face each other, the capacitance between the electrode portions changing in accordance with displacement of the first and second vibrators; and
the pair of electrode portions are mutually staggered in the X-axis direction so that the electrode portions partially face each other in a neutral state in the first vibrator is stops.

6. The composite sensor according to claim 1, wherein
the acceleration-detecting displacement detector includes a pair of first electrode portions and a pair of second electrode portions that are provided between the first and second vibrators and face each other, the capacitance between the first electrode portions and the capacitance between the second electrode portions changing in accordance with displacement of the first and second vibrators; and
in the pair of first electrode portions and the pair of second electrode portions, increases and decreases in capacitance change oppositely to each other when the first vibrator is displaced, and increases and decreases in capacitance change oppositely to each other when the second vibrator is displaced.

7. The composite sensor according to claim 3, further comprising:
two of said second vibrators provided so as to be displaced in directions opposite to each other with respect to the first vibrator when acceleration acts; and
two of said acceleration-detecting displacement detectors corresponding to the two second vibrators; wherein
the acceleration detector detects acceleration using a difference between displacement detection signals from the two acceleration-detecting displacement detectors.

8. The composite sensor according to claim 3, wherein
the acceleration-detecting displacement detector includes a pair of electrode portions that are provided between the first and second vibrators and face each other, the capacitance between the electrode portions changing in accordance with displacement of the first and second vibrators; and
the pair of electrode portions are mutually staggered in the X-axis direction so that the electrode portions partially face each other in a neutral state in the first vibrator is stops.

9. The composite sensor according to claim 3, wherein
the acceleration-detecting displacement detector includes a pair of first electrode portions and a pair of second electrode portions that are provided between the first and second vibrators and face each other, the capacitance between the first electrode portions and the capacitance between the second electrode portions changing in accordance with displacement of the first and second vibrators; and
in the pair of first electrode portions and the pair of second electrode portions, increases and decreases in capacitance change oppositely to each other when the first vibrator is displaced, and increases and decreases in capacitance change oppositely to each other when the second vibrator is displaced.

10. A composite sensor comprising:
a substrate;
first supporting units provided on the substrate;
a first vibrator facing the substrate with a gap therebetween;
first supporting beams arranged to connect the first vibrator to the first supporting units and to support the first vibrator such that the first vibrator can vibrate in an X-axis direction among three axial directions including X, Y, and Z axes substantially perpendicular to each other;
an angular-velocity-detecting vibrator provided to the first vibrator;
angular-velocity-detecting supporting beams arranged to connect the angular-velocity-detecting vibrator to the first vibrator and to support the angular-velocity-detecting vibrator such that the angular-velocity-detecting vibrator can be displaced in one of the Y-axis direction and the Z-axis direction;
a vibration generator enabling the first vibrator to vibrate in the X-axis direction;
an angular-velocity-detecting displacement detector arranged to detect an amount of displacement when the angular-velocity-detecting vibrator is displaced in one of the Y-axis direction and the Z-axis direction in a state in which the first vibrator is vibrating in the X-axis direction;
second supporting units provided on the substrate;
a second vibrator facing the substrate with a gap therebetween;
second supporting beams arranged to connect the second vibrator to the second supporting units and arranged to support the second vibrator such that the second vibrator can be displaced in a direction that is perpendicular to the Z axis and that is inclined with respect to the X axis and the Y axis;

an acceleration-detecting displacement detector provided between the first and second vibrators and arranged to detect an amount of displacement when the second vibrator is displaced in the Y-axis direction;

third supporting units provided on the substrate;

a third vibrator facing the substrate with a gap therebetween;

third supporting beams arranged to connect the third vibrator to the third supporting units and to support the third vibrator such that the third vibrator can be displaced in a direction that is orthogonal to the Z axis, that is inclined with respect to the X axis and the Y axis, and that is different from a direction in which the second vibrator is displaced;

another acceleration-detecting displacement detector provided between the first and third vibrators and arranged to detect an amount of displacement when the third vibrator is displaced in the Y-axis direction;

a vibration monitor arranged to monitor displacement of the first vibrator when the first vibrator vibrates in the X-axis direction; and an acceleration detector arranged to detect a first acceleration by performing synchronous detection on the difference between displacement detection signals from the two acceleration-detecting displacement detectors using a monitor signal from the vibration monitor and to detect a second acceleration by performing synchronous detection on the sum of displacement detection signals from the two acceleration-detecting displacement detector using a monitor signal from the vibration monitor.

11. An acceleration sensor comprising:

a substrate;

first supporting units provided on the substrate;

a first vibrator facing the substrate with a gap therebetween;

first supporting beams arranged to connect the first vibrator to the first supporting units and to support the first vibrator such that the first vibrator can vibrate in an X-axis direction among three axial directions including X, Y, and Z axes substantially perpendicular to each other;

a vibration generator enabling the first vibrator to vibrate in the X-axis direction;

second supporting units provided on the substrate;

a second vibrator facing the substrate with a gap therebetween;

second supporting beams arranged to connect the second vibrator to the second supporting units and to support the second vibrator such that the second vibrator can be displaced in one of the X-axis direction or the Y-axis direction;

an acceleration-detecting displacement detector provided between the first and second vibrators and arranged to detect an amount of displacement when the second vibrator is displaced in the one of the X-axis direction or the Y-axis direction;

a vibration monitor arranged to monitor displacement of the first vibrator when the first vibrator vibrates in the X-axis direction; and an acceleration detector arranged to detect acceleration that acts on the second vibrator by performing synchronous detection on a displacement detection signal from the acceleration-detecting displacement detector using a monitor signal from the vibration monitor.

* * * * *